(12) United States Patent
Roudebush et al.

(10) Patent No.: US 11,340,510 B1
(45) Date of Patent: May 24, 2022

(54) ELECTROCHROMIC DEVICES WITH NANOSTRUCTURE THIN FILM CATHODES

(71) Applicant: Kinestral Technologies, Inc., South San Francisco, CA (US)

(72) Inventors: John Roudebush, South San Francisco, CA (US); Daniel Giaquinta, South San Francisco, CA (US); Howard Turner, South San Francisco, CA (US); Julian Bigi, South San Francisco, CA (US)

(73) Assignee: HALIO, INC., Hayward, CA (US)

( * ) Notice: Subject to any disclaimer, the term of this patent is extended or adjusted under 35 U.S.C. 154(b) by 357 days.

(21) Appl. No.: 15/970,652

(22) Filed: May 3, 2018

Related U.S. Application Data

(60) Provisional application No. 62/500,982, filed on May 3, 2017.

(51) Int. Cl.
| | | |
|---|---|---|
| *C23C 14/00* | (2006.01) | |
| *G02F 1/155* | (2006.01) | |
| *G02F 1/153* | (2006.01) | |
| *G02F 1/1523* | (2019.01) | |

(52) U.S. Cl.
CPC ............ *G02F 1/155* (2013.01); *G02F 1/1525* (2013.01); *G02F 1/1533* (2013.01); *G02F 2001/1555* (2013.01)

(58) Field of Classification Search
CPC .................................. G02F 1/00; H01L 45/00
See application file for complete search history.

(56) References Cited

U.S. PATENT DOCUMENTS

| | | | |
|---|---|---|---|
| 2005/0175939 A1* | 8/2005 | Perlo ...................... | G02F 1/174 430/322 |
| 2005/0268747 A1* | 12/2005 | Yoshida ................. | H01G 9/042 75/255 |
| 2012/0081774 A1* | 4/2012 | De Paiva Martins .. | G02F 1/163 359/265 |
| 2016/0011481 A1* | 1/2016 | Bergh ................. | G02F 1/13439 359/275 |

FOREIGN PATENT DOCUMENTS

JP     2001179107 A  *  7/2001

OTHER PUBLICATIONS

"Structural and electrical properties of LiNbWO6 ceramics", Tanika Kar, R. N. P. Choudhary, Department of Physics & Meteorology, Indian Institute of Technology, Kharagpur 721 302, India (Year: 1998).*

(Continued)

*Primary Examiner* — David P Turocy
*Assistant Examiner* — Mohammad Mayy
(74) *Attorney, Agent, or Firm* — Womble Bond Dickinson (US) LLP

(57) ABSTRACT

A method of manufacturing a thin film is provided. The method includes providing a plurality of crystalline cathodic electrochromic particles comprising an alkali metal oxide material, size-reducing the crystalline cathodic electrochromic particles by grinding to produce crystalline cathodic electrochromic nanostructures, providing a substrate, and coating the crystalline cathodic electrochromic nanostructures onto the substrate to produce a thin film, wherein the thin film is an electrochromic thin film.

20 Claims, 18 Drawing Sheets

(56) References Cited

OTHER PUBLICATIONS

JP-2001179107-A—google patents (Year: 2001).*
"Synthesis of tungsten oxide nanoparticles by acid precipitation method", Sitthisuntorn Supothin, Panpailin Seeharaj, Sorachon Yoriya, Ceramics International 33, 931-936 (Year: 2007).*
FOR, JP-S58-027130A (Year: 1983).*
"Hydrothermal synthesis of octahedra-based layered niobium oxide and its catalytic activity as a solid acid", Toru Murayama, Junli Chen, Jun Hirata, Keeko Matsumoto and Wataru Ueda, Catal. Sci. Technol., 2014, 4, 4250-4257, (Year: 2014).*
"Dimensional modification of oxyfluoride lattice Preparation and structure of A0ANb2O6F (A Na, K, A Ca, Sr)", Chung-Yul Yoo, Seung-Joo Kim, Journal of Physics and Chemistry of Solids 69,1475-1478. (Year: 2007).*

* cited by examiner

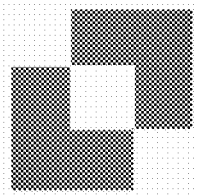
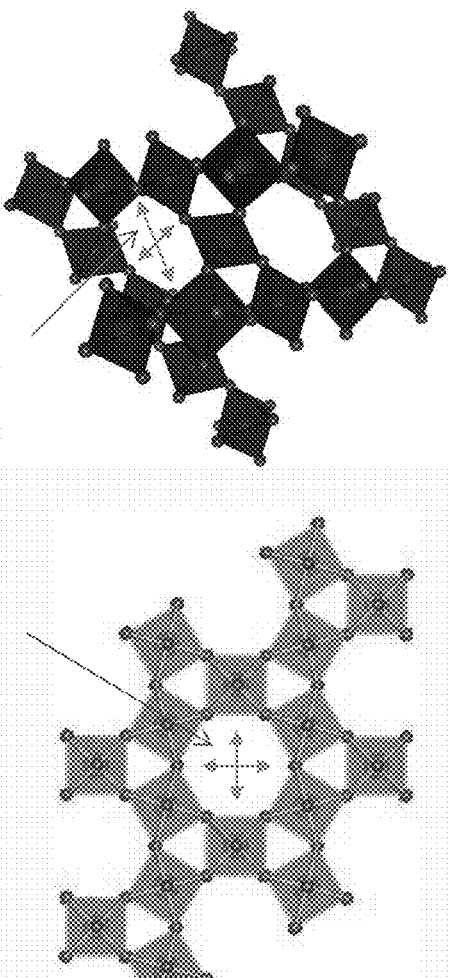
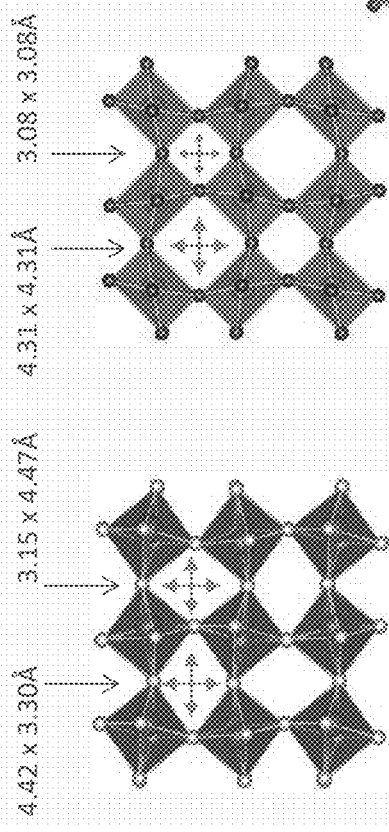
Fig. 1A Monoclinic Perovskite WO₃
Fig. 1B Tetragonal Perovskite WO₃
Fig. 1C Hexagonal WO₃
Fig. 1D Pyrochlore WO₃

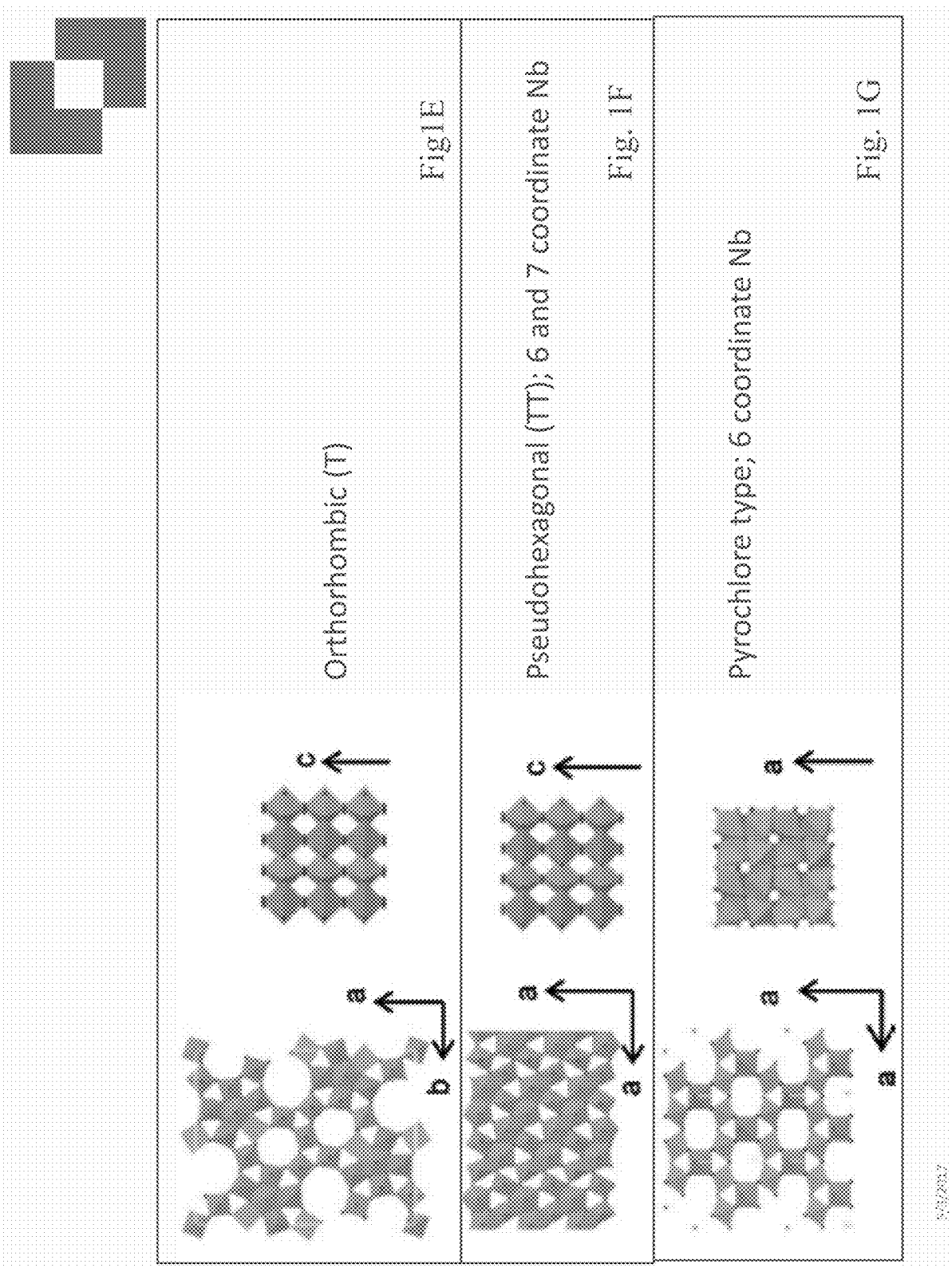

LiNb₃O₈

LiNbWO₆

ELECTROCHROMIC DEVICES WITH NANOSTRUCTURE THIN FILM CATHODES

BACKGROUND

Metal oxide materials are useful for their electrochemical and electrochromic (EC) behavior, and they are widely used in both electrochemical and EC devices. Variables that include synthesis methods, deposition techniques, deposition atmospheres and temperatures in addition to composition are critical to electrochemical and EC performance and there are many different synthesis methods and deposition techniques and compositions of metal oxides that have been used to prepare electrochemical and EC devices.

Commercial switchable glazing devices, also commonly known as smart windows and EC window devices, are well known for use as mirrors in motor vehicles, aircraft window assemblies, sunroofs, skylights, and architectural windows. Such devices may comprise, for example, active inorganic EC layers, organic EC layers, inorganic, ion-conducting layers, organic, ion conducting layers and hybrids of these sandwiched between two conducting layers. When a voltage is applied across these conducting layers the optical properties of a layer or layers in between change. Such optical property changes typically include a modulation of the transmissivity of the visible portion or the solar sub-portion of the electromagnetic spectrum.

The broad adoption of EC window devices in the construction and automotive industries will require a ready supply of low cost, aesthetically appealing, durable products in large area formats. EC window devices based on metal oxides represent the most promising technology for these needs. Typically, such devices comprise two EC materials (a cathode and an anode) separated by an ion-conducting film and sandwiched between two transparent conducting oxide (TCO) layers. In operation, a voltage is applied across the device that causes current to flow in the external circuit, and causes oxidation and reduction of the electrode materials. During this process, charge balance is maintained by mobile cations entering and leaving the electrodes. This facile electrochemical process causes the window to reversibly change from a more bleached (e.g., a relatively greater optical transmissivity) to a more darkened state (e.g., a relatively lesser optical transmissivity).

EC devices often may utilize a combination of two types of EC materials, one of which becomes optically less transmissive (e.g., takes on color) in its electrochemically oxidized state while the other becomes optically less transmissive (e.g., takes on color) in its electrochemically reduced state. Such a device where both anodic and cathodic EC materials can simultaneously darken or bleach may be called a complementary EC device. For example, nickel oxide assumes a dark color in its electrochemically oxidized state and becomes lightly colored by reduction, while tungsten trioxide assumes a blue color in its electrochemically reduced state and becomes colorless by oxidation. When the two are used as separate EC layers separated by an ion conductor layer in a multi-layer stack, the stack may be reversibly cycled between a dark color (when the nickel oxide material is in its electrochemically oxidized state and tungsten trioxide is in its reduced state) and a transparent state (when the nickel oxide material is in its electrochemically reduced state and tungsten trioxide is in its electrochemically oxidized state) by application of an appropriate voltage across the stack.

Some substrates, especially low temperature and other flexible substrates, have previously precluded the use of conventional solid state synthesis methods for the preparation of some crystalline EC materials. For example, mixed metal oxides, including lithium nickel oxides, tellurates, phosphates, pyrophosphates and others may require high temperatures when preparing single phase crystalline materials, especially when using conventional solid state techniques. Regardless of the exact synthetic method however, in some cases the need for high temperatures has taught away both from certain synthesis techniques and implicitly from crystallinity because of the inability of even glass substrates to tolerate the synthesis and processing temperatures commonly required.

Tungsten oxides are well-known EC cathode materials. Crystalline tungsten trioxide films can be deposited directly on a substrate using techniques such as thermal evaporation or sol-gel methods with annealing. Sol-gel methods require high temperatures after deposition to create crystalline tungsten trioxide films with the most desirable EC properties. Physical vapor deposited (e.g., evaporated or sputtered) films are typically amorphous as-deposited unless the substrate is heated, and may also thus require thermal treatments to crystallize the films after deposition. The high temperatures required to crystallize an as-deposited amorphous film produced by physical vapor deposition to form crystalline tungsten trioxide are incompatible with substrates with low melting points (e.g. flexible polymer substrates). The high temperatures and environments required for post-deposition annealing also require more expensive equipment. Additionally, some processing temperatures required for the crystallization of certain tungsten trioxide polymorphs can reach as high as 900° C., which precludes the use of glass substrates if the material is deposited directly onto the substrate before the crystallization step. These techniques all have drawbacks in manufacturing compared to hydrothermal synthesis of crystalline tungsten trioxide particles, followed by size-reduction and coating, especially when targeting crystalline particles of a specific symmetry or structure. Many alternative EC cathode materials behave similarly as tungsten oxides, and high temperatures are required for synthesis of single phase crystalline materials. For example, polymorphs of $Nb_2O_5$ crystallize in structures reminiscent of certain $WO_3$ polymorphs. Like the tungsten oxides, these materials may require unique synthesis methods and sometimes high temperatures and are often difficult to prepare as thin films.

For EC devices containing materials with high synthesis temperatures and where thin films are preferred, substrate stabilities will limit the range of temperatures which may be utilized to prepare materials. In those cases, the temperatures required to crystallize single phase materials precludes the use of certain substrates and/or synthetic methods. For other electrochemical applications that are not thin film based, this is less of an issue. For example, battery materials are often comprised of powders and less commonly thin films. Additionally, the nature of EC devices requires the existence of a highly transmissive state that may be modulated to a less transmissive state through the transfer of electrons and ions. In the case of battery materials, electronic and ionic mobility between particles is commonly facilitated by the use of carbon. This method is less feasible in thin film EC materials where a highly transmissive state is required. Finally, in the preparation of thin film materials, additives such as binders are commonly employed to improve film integrity and film-to-substrate adhesion.

Mixed metal oxides including $LiNbWO_6$ (both polymorphs) and $LiNb_3O_8$ materials have also been studied for electrochemical devices. In certain instances, the addition of a third metal (or more) has been useful to impart characteristics such as low dimensional structure units like layers or tunnels. In other instances, structural stability upon cycling or increases in total capacity may be induced. In still other instances, the addition of a third metal (or more) may be useful to impact optical characteristics such as transmissivity or color.

SUMMARY

Summary of Methods for EC Nanostructure Cathodes

In some embodiments, a method of manufacturing a thin film is described, comprising: providing a plurality of crystalline cathodic electrochromic (EC) particles; size-reducing the crystalline cathodic EC particles by grinding to produce crystalline cathodic EC nanostructures; and coating the crystalline cathodic EC nanostructures onto a substrate to produce an EC thin film.

In some embodiments, the crystalline cathodic EC nanostructures in the above method comprise an alkali metal oxide material comprising one or more metals, wherein the metals are selected from the group consisting of V, W, Nb, Ta, Cr, Mo, Ti, Zr, Hf, Sb, Bi, Sn, and combinations thereof.

In some embodiments, the crystalline cathodic EC nanostructures in the above method are produced via thermal treatment methods selected from the group consisting of hydrothermal methods or high temperature methods, or microwave synthesis, or sol-gel synthesis or ion-exchange. In some embodiments, combinations of the previous methods are possible where hydrothermal methods are combined with higher temperature calcination and ion-exchange. In some embodiments, the temperature range of the thermal treatment is from 150° C. to 300° C., or from 100° C. to 400° C., or from 100° C. to 1000° C., or from 100° C. to 800° C., or from 700° C. to 1000° C., or from 100° C. to 600° C., or above 1000° C., or in other embodiments, the temperature range may comprise whatever temperature is required to create a single phase, crystalline material. Additionally, any other combination of steps required to make a single phase crystalline material known to those of skill in the art may be used to produce the crystalline cathodic EC nanostructures described herein.

FIGS. 1A-1I illustrates some examples of different structure types for crystalline cathodic EC nanostructures. Not to be limited by theory, in a material in which ions are to be repetitively intercalated and de-intercalated, it is desirable to have a structure that is amenable to ion mobility, furthermore, it is desirable to have a crystal structure that can tolerate repetitive ion removal and insertion without undergoing a degradative structural phase transition. In some instances, a reversible phase change may be possible that allows reversible intercalation and de-intercalation without entirely losing EC capabilities although this is less common. For example, tungsten trioxide undergoes reversible structural changes upon insertion of lithium from monoclinic symmetry incrementally to cubic symmetry.

In some embodiments, the EC thin film of the above method does not comprise a binder material. In some embodiments, the EC thin film of the above method is an EC cathode layer in an EC device. In some embodiments, the EC thin film of the above method is a layer in an EC device with a clear state with a CIE-Lab L* in transmission from 70 to 95, b* in transmission from −8 to 8, and a* in transmission from −4 to 4, and a dark state with a CIE-Lab L* in transmission from 0 to 30, b* in transmission from −5 to −2, and a* in transmission from −7 to −5.

In some embodiments, the substrate in the method above comprises a material with a softening point less than 600° C.

In some embodiments, the substrate in the method above comprises a material with a softening point less than 300° C. In some embodiments, the substrate in the method above comprises an electrically conductive layer, and an outer substrate.

Summary of EC Nanostructure Cathode Materials and Crystal Structures

In some embodiments, an electrochromic (EC) multi-layer stack is described comprising: an EC cathode layer comprising crystalline cathodic EC nanostructures; an electrically conductive layer; and an outer substrate, wherein the multi-layer stack is incorporated into an EC device, and wherein the EC cathode layer does not comprise a binder.

In some embodiments, the crystalline cathodic EC nanostructures comprise an alkali metal oxide material comprising one or more metals, wherein the metals are selected from the group consisting of V, W, Nb, Ta, Cr, Mo, Ti, Zr, Hf, Sb, Bi, Sn, and combinations thereof.

In some embodiments, the crystalline cathodic EC nanostructures comprise a synthesis temperature greater than the melting point of the outer substrate.

In some embodiments, the multi-layer stack is incorporated in an EC device with a clear state comprising a CIE-Lab L* in transmission from 70 to 95, b* in transmission from −8 to 8, and a* in transmission from −4 to 4, and a dark state comprising a CIE-Lab L* in transmission from 0 to 30, b* in transmission from −5 to −2, and a* in transmission from −7 to −5.

In some embodiments, the crystalline cathodic EC nanostructures contain metal with variable oxidation state in an octahedral, distorted octahedral or trigonal prismatic coordination. In some embodiments, the metal is a transition metal. Optionally, some non-transition metals may be substituted on the same crystallographic site as the transition metal. In some embodiments, the metal is a transition metal that is colorless or very lightly colored in its reduced state. In some embodiments, the metal is a transition metal that is strongly colored in its oxidized state.

In some embodiments, the crystalline cathodic EC nanostructures comprise a crystal structure that has the ability to accept and/or extrude Li reversibly without undergoing an irreversible or otherwise degradative phase transition. In some embodiments, the crystalline cathodic EC nanostructures comprise a crystal structure that has tunnels or galleries or van der Waals gaps or other structural features exist into which lithium may be inserted with little to no lattice strain as monitored by little to no change in lattice parameters in any crystallographic direction with and without inserted lithium (e.g., less than about 5% change, or less than about 1% change, or less than about 0.5 Angstroms change over about a 10 Angstrom unit cell). In some embodiments, the crystalline cathodic EC nanostructures comprise a crystal structure that has a bonding framework that is stable in the absence of the electropositive intercalant (e.g., Li), in other words the crystal structure does not change with and without inserted lithium. For example, the tungsten-oxygen framework represented in FIGS. 1C and 1D is stable in the absence of intercalated lithium (e.g., stable over a lifetime of about 20 years under typical operating conditions). The tungsten-oxygen framework represented in FIGS. 1A and 1B however is dependent upon the concentration of lithium present and is known to shift from monoclinic symmetry (FIG. 1A) to tetragonal symmetry (FIG. 1B) and eventually to cubic symmetry (not shown) depending on how much lithium is present.

BRIEF DESCRIPTION OF THE DRAWINGS

To facilitate further description of the embodiments, the following drawings are provided in which:

FIGS. 1A-1I illustrate some examples of different structure types for crystalline cathodic EC nanostructures.

Figure 1I:
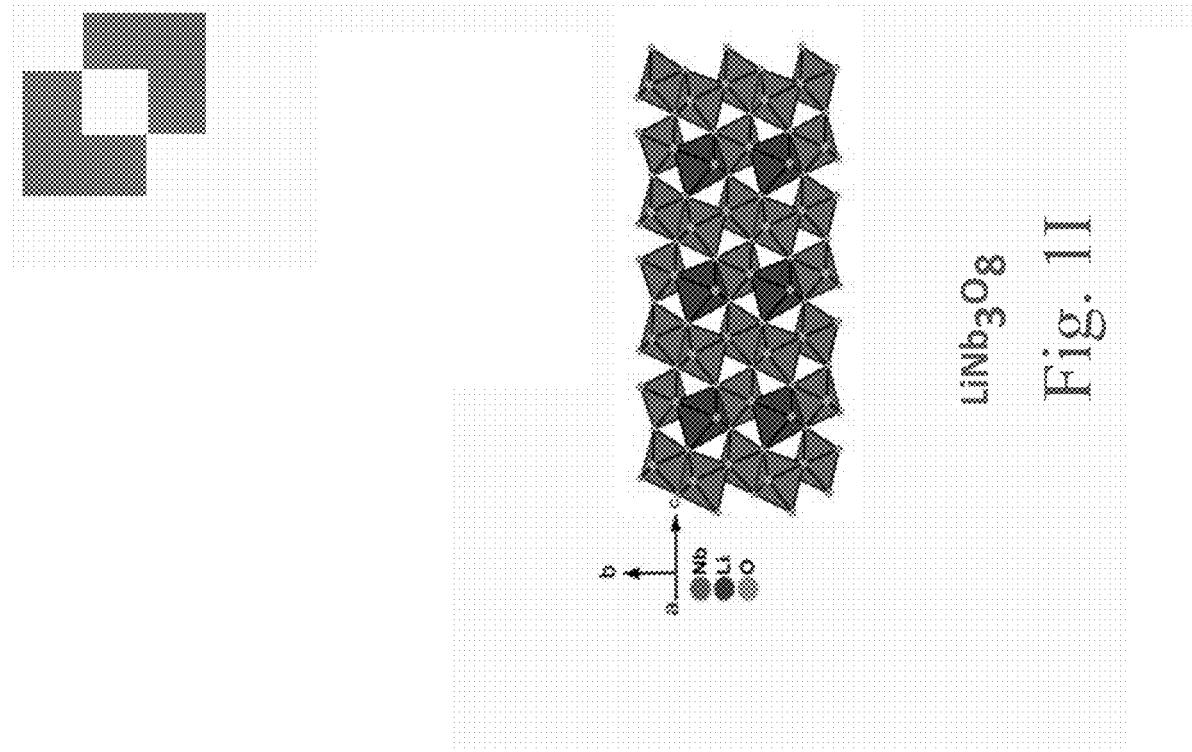
Figure 1H:
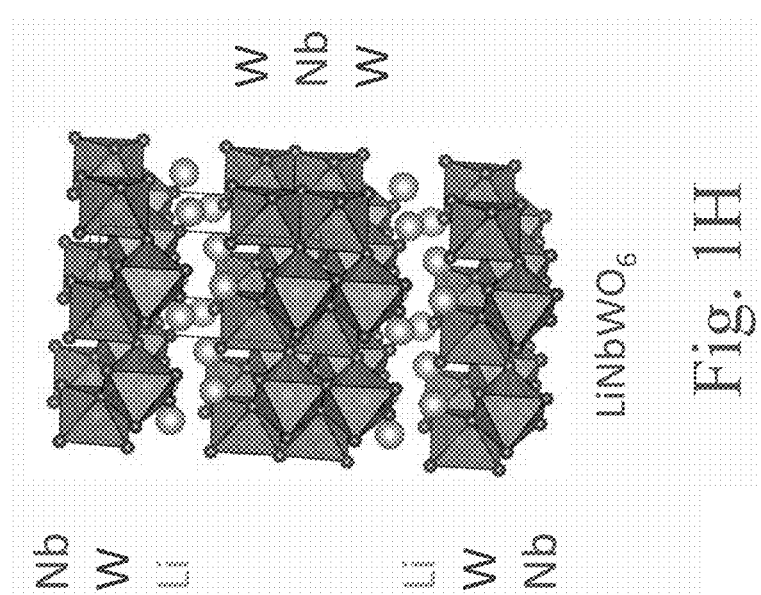

Corresponding reference characters indicate corresponding parts throughout the drawings. Additionally, relative thicknesses of the layers in the different figures do not represent the true relationship in dimensions. For example, the substrates are typically much thicker than the other layers. The figures are drawn only for the purpose to illustrate connection principles, not to give any dimensional information.

ABBREVIATIONS AND DEFINITIONS

The following definitions are provided to better define the embodiments of the present disclosure and to guide those of ordinary skill in the art in the practice of the present disclosure. Unless otherwise noted, terms are to be understood according to conventional usage by those of ordinary skill in the relevant art.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that an activity, process, method, system, article, device, or apparatus that comprises a list of elements is not necessarily limited to those elements, but may include other elements not expressly listed or inherent to such activity, process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the disclosure described herein are, for example, capable of operation in other orientations than those illustrated or otherwise described herein.

The terms "couple," "coupled," "couples," "coupling," and the like should be broadly understood and refer to connecting two or more elements or signals, electrically, ionically, mechanically and/or otherwise. Two or more electrical elements may be electrically coupled but not be mechanically or otherwise coupled; two or more mechanical elements may be mechanically coupled, but not be electrically or otherwise coupled; two or more electrical elements may be mechanically coupled, but not be electrically or otherwise coupled. Coupling may be for any length of time (e.g., permanent or semi-permanent or only for an instant).

"Electrical coupling" and the like should be broadly understood and include coupling involving any electrical signal, whether a power signal, a data signal, and/or other types or combinations of electrical signals.

"Ionic coupling" and the like should be broadly understood and include coupling involving or permitting the transfer of ions between discrete layers or compositions.

"Mechanical coupling" and the like should be broadly understood and include mechanical coupling of all types.

The absence of the word "removably," "removable," and the like near the word "coupled," and the like does not mean that the coupling, etc. in question is or is not removable.

The terms "anodic electrochromic (EC) layer" and "anodic electrochromic material" refer to an electrode layer or electrode material, respectively, that upon the removal of ions and electrons becomes less transmissive to electromagnetic radiation.

The term "bleach" refers to the transition of an electrochromic material from a first optical state to a second optical state wherein the first optical state is less transmissive than the second optical state.

The term "bleached state voltage" refers to the open circuit voltage ($V_{oc}$) of the anodic electrochromic layer versus Li/Li+ in an electrochemical cell in a propylene carbonate solution containing 1M lithium perchlorate when the transmissivity of said layer is at 95% of its "fully bleached state" transmissivity.

The terms "cathodic electrochromic layer" and "cathodic electrochromic material" refer to an electrode layer or electrode material, respectively, that upon the insertion of ions and electrons becomes less transmissive to electromagnetic radiation.

The term "coloration efficiency" or "CE" refers to a property of an electrochromic layer that quantifies how a layer's optical density changes as a function of its state of charge. CE can vary significantly depending on layer preparation due to differences in structure, material phases, and/or composition. These differences affect the probability of electronic transitions that are manifest as color. As such, CE is a sensitive and quantitative descriptor of an electrochromic layer encompassing the ensemble of the identity of the redox centers, their local environments, and their relative ratios. CE is calculated from the ratio of the change in optical absorbance to the amount of charge density passed. In the absence of significant changes in reflectivity, this wavelength dependent property can be measured over a transition of interest using the following equation:

$$CE_\lambda = \frac{\log_{10}\left(\frac{T_{ini}}{T_{final}}\right)}{Q_A}$$

where $Q_A$ is the charge per area passed, $T_{ini}$ is the initial transmission, and $T_{final}$ is the final transmission. For anodically coloring layers this value is negative, and may also be stated in absolute (non-negative) values. A simple electro-optical setup that simultaneously measures transmission and charge can be used to calculate CE. Alternatively, the end transmission states can be measured ex situ before and after electrical switching. CE is sometimes alternatively reported on a natural log basis, in which case the reported values are approximately 2.3 times larger.

The term "darken" refers to the transition of an electrochromic material from a first optical state to a second optical state wherein the first optical state is more transmissive than the second optical state.

The term "electrochromic material" refers to materials that change in transmissivity to electromagnetic radiation, reversibly, as a result of the insertion or extraction of ions and electrons. For example, an electrochromic material may change between a colored, translucent state and a transparent state.

The term "electrochromic layer" refers to a layer comprising an electrochromic material.

The term "electrode layer" refers to a layer capable of conducting ions as well as electrons. The electrode layer contains a species that can be reduced when ions are inserted into the material and contains a species that can be oxidized when ions are extracted from the layer. This change in oxidation state of a species in the electrode layer is responsible for the change in optical properties in the device.

The term "electrical potential," or simply "potential," refers to the voltage occurring across a device comprising an electrode/ion conductor/electrode assembly.

The term "electrochemically matched" refers to a set of cathode and anode electrochromic films or materials with similar charge capacities and complementary oxidation states such that when joined together by a suitable ion-conducting and electrically insulating layer, a functional electrochromic device is formed that shows reversible switching behavior over a substantial range of the theoretical charge capacities of the films or materials, respectively.

The term "fully bleached state" as used in connection with an anodic electrochromic material refers to the state of maximum transmissivity of an anodic electrochromic layer in an electrochemical cell at or above 1.5V versus Li/Li+ in a propylene carbonate solution containing 1 M lithium perchlorate at 25° C. (under anhydrous conditions and in an Ar atmosphere).

The color of the EC material, layer or device in the bleached or colored state can also be described by the L*a*b* color space. In this color space L* indicates the lightness with the darkest black at L*=0 and the brightest white at L*=100, a* indicates the red/green component of color with green at negative a* and red at positive a* values, and b* indicates the yellow/blue component of color with blue at negative b* and yellow at positive b* values. The color channels, a* and b*, will represent true neutral gray values at a*=0 and b*=0.

For convenience of description herein, change of these one or more optical properties of EC devices (i.e., switching or cycling of the EC devices) is primarily discussed as occurring between a pair of optical states (i.e., an optically less transmissive state and an optically more transmissive state), but it should be understood that these are merely examples and relative terms. For example, the optically less and more transmissive states can be a pair of optical states between a pair of more extreme optically less and more transmissive states that are attainable by a specific EC device. Further, there could be any number of optical states between the optically less and more transmissive states.

The term $T_{ini}$ is defined as the % transmission measured at 550 nm through the as-synthesized film before any electrochemical switching has been performed. The term $T_{clear}$ or $T_{bleached}$ is defined as the % transmission measured at 550 nm at the first cycle reduction, when the absolute current reaches less than 25 µA at the lowest applied voltage. The term $T_{dark}$ is defined as the % transmission measured at 550 nm at the first cycle oxidation, when the absolute current reaches less than 25 µA at the highest applied voltage.

The terms "halide," "halogen" or "halo" as used herein alone or as part of another group refer to chlorine, bromine, fluorine, and iodine.

The term "inorganic electrochromic film" or "inorganic electrochromic material" as used herein describes comprise a film or material, respectively, comprising metals that undergo reversible oxidation and reduction reactions during the cycling of an electrochromic device. Inorganic electrochromic materials and films lack solubility in common organic and neutral aqueous solvents, and typically possess 3-dimensional framework structure where the metal ions are bridged to and share counter anions such as oxide, sulfide, nitride and halide, or complex molecular inorganic anions such as phosphate or sulfate. Inorganic electrochromic films comprising metal ions and carbon-containing counter anions in the 3-demensional lattice are also known. These may be particle-based electrochromic materials. Examples include Prussian Blue, Prussian Blue Analogs, Nitroprusside compounds and other framework compounds comprising metal ions and cyanide anions or other anions similar to cyanide. These systems may also be referred to as organometallic electrochromic materials.

The term "transmissivity" refers to the fraction of light transmitted through an electrochromic film. Unless otherwise stated, the transmissivity of an electrochromic film is represented by the number $T_{vis}$. $T_{vis}$ is calculated/obtained by integrating the transmission spectrum in the wavelength range of 400-730 nm using the spectral photopic efficiency I_p(lambda) (CIE, 1924) as a weighting factor. (Ref: ASTM E1423).

The term "transparent" is used to denote substantial transmission of electromagnetic radiation through a material such that, for example, bodies situated beyond or behind the material can be distinctly seen or imaged using appropriate image sensing technology.

The terms "amine" or "amino," as used herein alone or as part of another group, represents a group of formula —N(R8)(R9), wherein R are independently hydrogen, hydrocarbyl, substituted hydrocarbyl, silyl, or R8 and R9 taken together form a substituted or unsubstituted cyclic or polycyclic moiety, each as defined in connection with such terms, typically having from 3 to 8 atoms in the ring. "Substituted amine," for example, refers to a group of formula —N(R8)(R9), wherein at least one of R8 and R9 are other than hydrogen. "Unsubstituted amine," for example, refers to a group of formula —N(R8)(R9), wherein R8 and R9 are both hydrogen.

The term "aryl" as used herein alone or as part of another group denotes optionally substituted homocyclic aromatic groups, preferably monocyclic or bicyclic groups containing from 6 to 12 carbons in the ring portion, such as phenyl, biphenyl, naphthyl, substituted phenyl, substituted biphenyl or substituted naphthyl. Phenyl and substituted phenyl are the more preferred aryl.

The terms "halide," "halogen" or "halo" as used herein alone or as part of another group refer to chlorine, bromine, fluorine, and iodine.

The term "nanostructure" or "nanostructures" as used herein refers to nanowires, nanoparticles, nanofoams, nanoporous films, or any structure with dimensions between microscopic and molecular scale structures. In some embodiments, nanostructures possess features in the submicron size regime. Such features may be of a nanometer scale, or may be of 10s of nanometers in scale, or may be of 100s of nanometers in scale.

The term "ink" as used herein refers to a mixture containing a liquid and suspended particles that is used for coating a film. For an ink to be usable for coating it must be stable and not significantly precipitate in the time required between the preparation of the particles in a liquid and coating. The term dispersion may also be used to express the same meaning.

The term "grinding" as used herein refers to size-reduction of particles by mechanical means. Some examples of grinding apparatuses are a mortar and pestle, various types of ball mills (e.g., planetary ball mill, agitator ball mill, etc.), various types of mills not using balls as the milling media (e.g., rod mill, vibrating mill, etc.), machines using an abrasive wheel as the cutting tool (e.g., a belt grinder or a bench grinder), or other methods using mechanical force to size-reduce particles. Additionally, size-reducing particles can refer to reducing the size of the primary particles, or reducing the size of hard or soft agglomerates comprising primary particles.

The term "mixed metal oxide" refers to a metal- and oxygen-containing material in which at least two metals are present (e.g., M1 and M2). In certain embodiments, these metals include a metal that may become mobile under the application of voltage and a metal that may undergo oxidation and/or reduction (redox) under the application of voltage. In certain embodiments, the mobile metal, M1, may be an alkali metal, and the redox metal, M2, may be a transition metal. The term "oxide" comprises materials in which oxygen is an anion and may include complex anions like phosphate, $[PO_4]^{3-}$, or sulfate, $[SO_4]^{2-}$, for example, as well as others commonly known in the art.

The term "hexagonal tungsten trioxide" as used herein refers to a material with the formula $A_yW_{1-x}M_xO_{3\pm z}\cdot kH_2O$), where A is situated within the hexagonal or hexagonal-like channels depicted in FIG. 1C and where M is substituted within the W—O lattice. As such, A is often a monovalent species such as a proton, an ammonium ion, and/or an alkali metal and may sometimes be an alkaline earth metal. M is a transition metal, other metal, lanthanide, actinide, electrochromic metal or non-electrochromic metal in octahedral coordination. As such, x is from about 0 to about 1, y is from about 0 to about 0.5, and where z can be from about −0.5 to about 0.5. The crystal structure may be hexagonal or have hexagonal-like channels (for example, as depicted in the hexagonal $WO_3$ structure in FIG. 1C). The W(M)-O layers are stacked in the [001] direction resulting in 1-dimensional channels. A and/or M also comprise more than one element and be expressed as $A'_a+A''_b+A'''_c$ and/or $M'_d+M''_e+M'''_f$ where A', A" and A'" and/or M', M" and M'" are different elements, where a+b+c=y and d+e+f=x. "Hexagonal tungsten trioxide" can refer to materials including atoms other than tungsten and oxygen, including but not limited to, substituted hexagonal tungsten oxide, hexagonal tungsten bronze and hexagonal tungsten bronze-like materials. The term "hexagonal tungsten oxide" as used herein refers to "hexagonal tungsten trioxide" as defined above.

The term "pyrochlore" as used herein refers to a material with the formula $A_yW_{1-x}M_xO_{3\pm z}\cdot kH_2O$), where A is situated within the hexagonal or hexagonal-like channels depicted in FIG. 1D and where M is substituted within the W—O lattice. As such, A is often a monovalent species such as a proton, an ammonium ion, and/or an alkali metal and may sometimes be an alkaline earth metal. M is a transition metal, other metal, lanthanide, actinide, electrochromic metal or non-electrochromic metal in octahedral coordination. Under these conditions, x is from about 0 to about 1, y is from above 0 to about 0.5, and where z can be from about −0.5 to about 0.5. The crystal structure may be hexagonal or have hexagonal-like channels (for example, as depicted in the pyrochlore $WO_3$ structure in FIG. 1D). Unlike in the hexagonal $WO_3$ structure, the W—O layers are stacked in the [111] direction forming an interconnected network of 3-dimensional channels. A and/or M also comprise more than one element and be expressed as $A'_a+A''_b+A'''_c$ and/or $M'_d+M''_e+M'''_f$ where A', A" and A'" and/or M', M" and M'" are different elements, where a+b+c=y and d+e+f=x. "Pyrochlore" can refer to materials comprising atoms other than tungsten and oxygen, including but not limited to, pyrochlore-like, defected pyrochlore, defected pyrochlore-like, substituted pyrochlore, substituted pyrochlore-like, and substituted, defected pyrochlore-like materials.

The term "tungsten trioxide" as used herein refers to a material with the formula $A_yW_{1-x}M_xO_{3\pm z}\cdot kH_2O$) and has any crystal structure where A is situated within interstitial spaces and where M is substituted within the W—O lattice. As such, A is often a monovalent species such as a proton, an ammonium ion, and/or an alkali metal and may sometimes be an alkaline earth metal. M is a transition metal, other metal, lanthanide, actinide, electrochromic metal or non-electrochromic metal in octahedral coordination. Under these conditions, x is from about 0 to about 1, y is from above 0 to about 0.5, and where z can be from about −0.5 to about 0.5. A and/or M also comprise more than one element and be expressed as $A'_a+A''_b+A'''_c$ and/or $M'_d+M''_e+M'''_f$ where A', A" and A'" and/or M', M" and M'" are different elements, where a+b+c=y and d+e+f=x. "Tungsten trioxide" can refer to materials comprising atoms other than tungsten and oxygen, including but not limited to, substituted tungsten oxide, substituted triclinic tungsten oxide, substituted monoclinic tungsten oxide, substituted orthorhombic tungsten oxide, substituted tetragonal tungsten oxide, substituted hexagonal tungsten oxide, or substituted cubic tungsten oxide. Furthermore, "tungsten trioxide" can refer to structures comprising hexagonal tungsten bronze, hexagonal tungsten bronze-like materials, tetragonal tungsten bronze, tetragonal tungsten bronze-like materials, pyrochlore materials, pyrochlore-like materials, defected pyrochlore materials, defected pyrochlore-like materials, substituted pyrochlore materials or substituted pyrochlore-like materials.

In FIGS. 1E-1G, polymorphs of $Nb_2O_5$ are represented (Catal. Sci. Technol. 2014, 4, 4250-4257). FIG. 1E shows orthorhombic $Nb_2O_5$ (the T polymorph) in which structural similarities to the hexagonal $WO_3$ structure (FIG. 1C) are obvious. FIG. 1G shows the pyrochlore type of $Nb_2O_5$ which is structurally similar to "$WO_3$" pyrochlore represented in FIG. 1D. Each of these polymorphs may be prepared as single phase crystalline materials so long as the appropriate syntheses are performed.

The term "thermal treatment" refers to calcination, annealing, sintering, hydrothermal methods and many others known in the art. Thermal treatment may imply a series of heating steps such as calcination followed by annealing, for example, and is not intended to be limiting.

As used herein, the term "amorphous" implies a general lack of ordering within the crystal lattice of a powder or plurality of particles such that common laboratory techniques including powder x-ray diffraction (PXRD) do not result in the presence of peaks. Amorphous as used herein does not necessarily imply the complete lack of atomic ordering or even a complete lack of peaks as seen by PXRD. In this regard, the term "partially crystalline" refers to a state of order that is higher than amorphous but lower than crystalline while the term "crystalline" comprises a well-ordered material that is readily measured by PXRD and in such an experiment may be described as showing a series of sharp peaks. In this discussion, the terms amorphous, partially crystalline or crystalline imply nothing about particle size.

DETAILED DESCRIPTION

Figure 2:
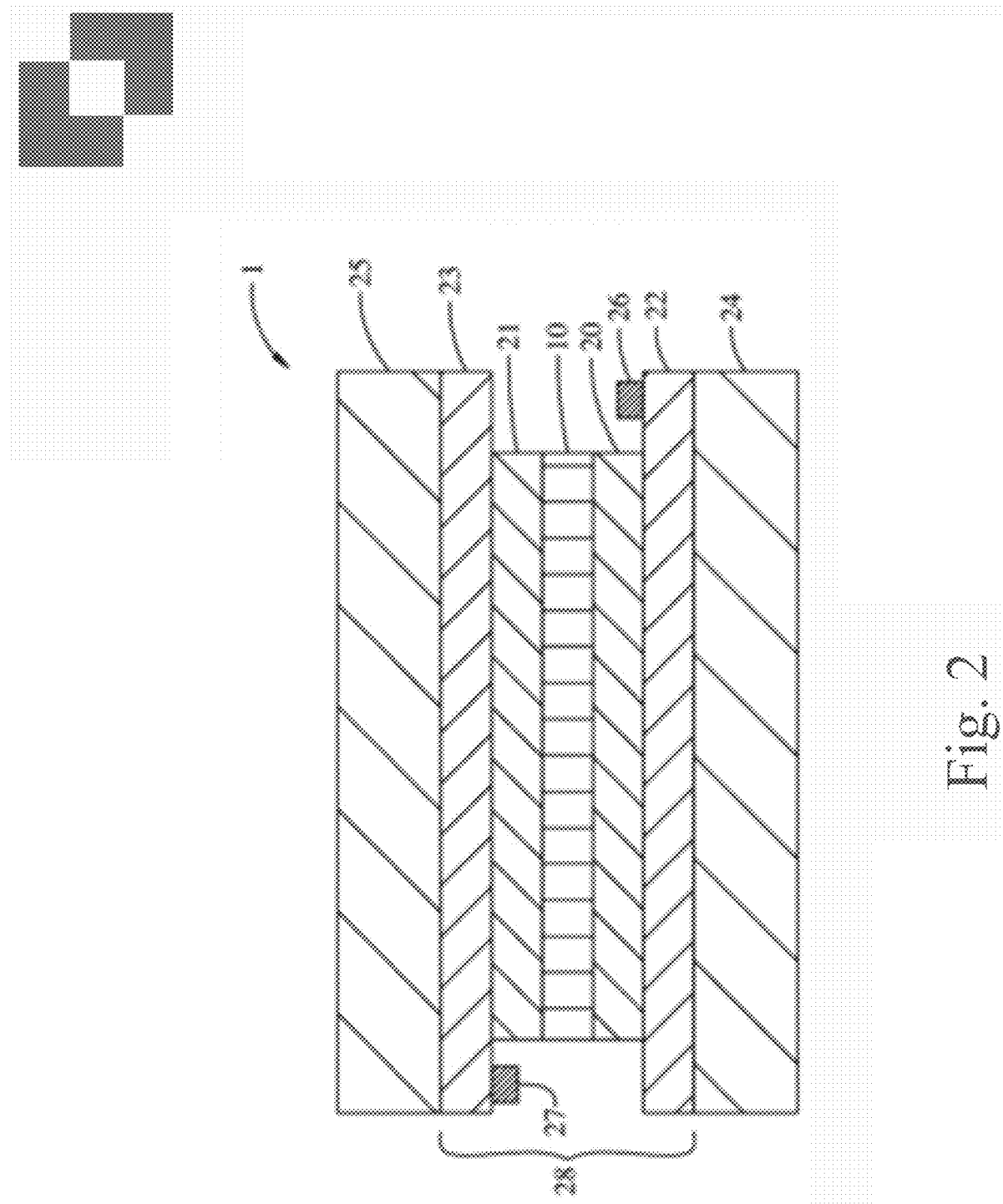
FIG. 2 depicts a cross-sectional structural diagram of electrochromic (EC) device.

Electrochromic Nanostructured Cathodic Thin Films, Multilayer Stacks, and Devices FIG. 2 depicts a cross-sectional structural diagram of electrochromic (EC) device 1 according to a first embodiment of the present disclosure. Moving outward from the center, EC device 1 comprises an ion conductor layer 10. First electrode layer 20 is on one side of and in contact with a first surface of ion conductor layer 10, and second electrode layer 21 is on the other side of and in contact with a second surface of ion conductor layer 10. In addition, at least one of first and second electrode layers 20, 21 comprises EC material; in one embodiment, first and second electrode layers 20, 21 each comprise EC material. The central structure, that is, layers 20, 10, 21, is positioned between first and second electrically conductive layers 22 and 23 which, in turn, are arranged against "outer substrates" 24, 25. Elements 20, 21, 10, and optionally elements 22, 23, 24 and/or 25 are collectively referred to as an EC stack 28.

Electrically conductive layer 22 is in electrical contact with one terminal of a power supply (not shown) via bus bar 26 and electrically conductive layer 23 is in electrical contact with the other terminal of a power supply (not shown) via bus bar 27 whereby the transmissivity of the EC stack 28 may be changed by applying a voltage pulse to electrically conductive layers 22 and 23. The pulse causes electrons and ions to move between first and second electrode layers 20 and 21 and, as a result, EC material in the first and/or second electrode layer(s) change(s) optical states, thereby switching EC stack 28 from a more transmissive state to a less transmissive state, or from a less transmissive state to a more transmissive state. In one embodiment, EC stack 28 is transparent before the voltage pulse and less transmissive (e.g., more reflective or colored) after the voltage pulse or vice versa.

It should be understood that the reference to a transition between a less transmissive and a more transmissive state is non-limiting and is intended to describe the entire range of transitions attainable by EC materials to the transmissivity of electromagnetic radiation. For example, the change in transmissivity may be a change from a first optical state to a second optical state that is (i) relatively more absorptive (i.e., less transmissive) than the first state, (ii) relatively less absorptive (i.e., more transmissive) than the first state, (iii) relatively more reflective (i.e., less transmissive) than the first state, (iv) relatively less reflective (i.e., more transmissive) than the first state, (v) relatively more reflective and more absorptive (i.e., less transmissive) than the first state or (vi) relatively less reflective and less absorptive (i.e., more transmissive) than the first state. Additionally, the change may be between the two extreme optical states attainable by an EC device, e.g., between a first transparent state and a second state, the second state being opaque or reflective (mirror). Alternatively, the change may be between two optical states, at least one of which is intermediate along the spectrum between the two extreme states (e.g., transparent and opaque or transparent and mirror) attainable for a specific EC device. Unless otherwise specified herein, whenever reference is made to a less transmissive and a more transmissive, or even a bleached-colored transition, the corresponding device or process encompasses other optical state transitions such as non-reflective-reflective, transparent-opaque, etc. Further, the term "bleached" may refer to an optically neutral state, e.g., uncolored, transparent or translucent. Still further, unless specified otherwise herein, the "color" of an EC transition is not limited to any particular wavelength or range of wavelengths. As understood by those of skill in the art, the choice of appropriate EC and counter electrode materials governs the relevant optical transition.

In general, the change in transmissivity preferably comprises a change in transmissivity to electromagnetic radiation having a wavelength in the range of infrared to ultraviolet radiation. For example, in one embodiment the change in transmissivity is predominately a change in transmissivity to electromagnetic radiation in the infrared spectrum. In a second embodiment, the change in transmissivity is to electromagnetic radiation having wavelengths predominately in the visible spectrum. In a third embodiment, the change in transmissivity is to electromagnetic radiation having wavelengths predominately in the ultraviolet spectrum. In a fourth embodiment, the change in transmissivity is to electromagnetic radiation having wavelengths predominately in the ultraviolet and visible spectra. In a fifth embodiment, the change in transmissivity is to electromagnetic radiation having wavelengths predominately in the infrared and visible spectra. In a sixth embodiment, the change in transmissivity is to electromagnetic radiation having wavelengths predominately in the ultraviolet, visible and infrared spectra.

In one embodiment, the EC materials comprised by the anode electrode (i.e., the first or second electrode 20, 21; see FIG. 2) of a multi-layer stack of the present disclosure are inorganic or organometallic and the EC materials comprised by the cathode (i.e., the other of the first or second electrode 20, 21; see FIG. 2) are independently inorganic or organometallic. More specifically, the EC materials comprised by the anode and/or the cathode are inorganic or organometallic solid state materials with 3-D framework structures comprising metals bridged or separated by anionic atoms or ligands such as oxide, hydroxide, phosphate, cyanide, halide, that further comprise mobile ions such as protons, lithium, sodium, potassium that can intercalate and de-intercalate as the material is reduced or oxidized during the EC cycle.

Oxides of W, Nb, Ta, Ti, V, and Mo color under charge insertion (reduction) and are referred to as cathodic EC materials. Oxides of Ni, Cr, Mn and Ir color upon charge extraction (oxidation) and are anodic EC materials. In one embodiment, cathodically coloring films include oxides based on tungsten, molybdenum, niobium, and titanium.

In some embodiments, the anode of the multi-layer stacks described herein are crystalline anodic EC nanostructures. In some embodiments, the crystalline anodic EC nanostructures comprise an alkali metal oxide material. In some embodiments, the alkali metal oxide material comprises one or more metals, wherein the metals are selected from the group consisting of Ni, Fe, W, Zn, Y, Ti, Zr, Hf, V, Nb, Ta, Mo, B, Al, Ga, In, Si, Ge, Sn, P, Sb, Te, Mn, Co, and combinations thereof. The anode layers can be prepared by a number of deposition processes including vapor deposition processes, wet-coating processes, spray coating processes, dip coating, and electrodeposition.

In some embodiments, the anode layers contain nano-structures. In some embodiments, the anode layers contain crystalline anodic EC nanostructures. In some embodiments the crystalline anodic EC nanostructures comprise an alkali metal oxide material comprising one or more metals, wherein the metals are selected from the group consisting of Ni, Fe, W, Zn, Y, Ti, Zr, Hf, V, Nb, Ta, Mo, B, Al, Ga, In, Si, Ge, Sn, P, Sb, Te, Mn, Co, and combinations thereof. In some embodiments, the crystalline anodic EC nanostructures comprise a synthesis temperature greater than the melting point of the outer substrate. In some embodiments, the crystalline anodic EC nanostructures contain metal with variable oxidation state in an octahedral, distorted octahedral or trigonal prismatic coordination geometry. In some embodiments, the metal is a transition metal. Optionally, some non-transition metals may be substituted on the same crystallographic site as the transition metal. In some embodiments, the metal is a transition metal that is colorless or very lightly colored in its reduced state. In some embodiments, the metal is a transition metal that is strongly colored in its oxidized state. In some embodiments, the crystalline anodic EC nanostructures comprise a crystal structure that has the ability to accept and/or extrude Li reversibly without undergoing an irreversible phase transition. In some embodiments, the crystalline anodic EC nanostructures comprise a crystal structure that has tunnels or galleries or van der Waals gaps or other structural features exist into which lithium may be inserted with little to no lattice strain in any crystallographic direction (e.g., less than about 5% change, or less than about 1% change, or less than about 0.5 Angstroms change over about a 10 Angstrom unit cell, or less than about 0.1 Angstroms change over about a 10 Angstrom unit cell). In some embodiments, the crystalline anodic EC nanostructures comprise a crystal structure that has a bonding framework that is stable in the presence and in the absence of the electropositive intercalant (e.g., Li). In some embodiments, the crystalline anodic EC nanostructures comprise a crystal structure that has a bonding framework that is stable in the presence and in the absence of the electropositive intercalant (e.g., Li) under typical operating conditions (e.g., over about a 20 year lifetime, over about a 10 year lifetime, in a temperature range from about −30° C. to about 50° C., and/or under exposure to direct sunlight).

The cathode layers of the EC multi-layer stacks and EC devices described herein contain crystalline cathodic EC nanostructures. In some embodiments, the crystalline cathodic nanostructures contain metal oxides including of V, W, Nb, Ta, Cr, Mo, Ti, Zr, Hf, Sb, Bi, Sn, and combinations thereof. The crystalline cathodic EC nanostructures are described more completely herein.

The thickness of anode layer 20 and cathode layer 21 will depend upon the EC material selected for the EC layer and the application. In some embodiments, anode layer 20 will have a thickness in the range of about 25 nm to about 2000 nm. For example, in one embodiment anode layer 20 has a thickness of about 50 nm to about 2000 nm. By way of further example, in one embodiment anode layer 20 has a thickness of about 25 nm to about 1000 nm. By way of further example, in one such embodiment, anode layer 20 has an average thickness between about 100 nm and about 700 nm. In some embodiments, anode layer 20 has a thickness of about 250 nm to about 500 nm. Cathode layer 21 will typically have thicknesses in the same ranges as those stated for anode layer 20. One of skill in the art will appreciate that certain relationships exist between the thickness of the anode or cathode layer, and the materials deposited to comprise the anode or cathode layer. For example, if the average thickness of the anode or cathode layer is between about 250 nm to about 500 nm, then anode or cathode precursor materials that comprise the liquid mixtures used to deposit the anode or cathode layers will likely be composed of species that are smaller than 250 nm to 500 nm.

Ion conductor layer 10 serves as a medium through which ions are transported (in the manner of an electrolyte) when the EC device switches between an optically less transmissive ("colored") state and an optically more transmissive ("bleached") state. Stated differently, the ion conducting layer permits sufficient ionic conduction between the first and second electrode layers 20, 21 upon the application of a voltage across EC stack 28. Depending on the choice of materials, such ions include lithium ions (Li+) and hydrogen ions (H+) (i.e., protons). Other ions may also be employed in certain embodiments. These include deuterium ions (D+), sodium ions (Na+), potassium ions (K+), rubidium ions (Rb+), cesium ions (Cs+), ammonium ions (NH4+), calcium ions (Ca++), barium ions (Ba++), strontium ions (Sr++), magnesium ions (Mg++) or others. In one embodiment, ion conductor layer 10 has a lithium ion conductivity of at least about $10^{-5}$ S/cm at room temperature (i.e., 25° C.). For example, in one such embodiment, ion conductor layer 10 has a lithium ion conductivity of at least about $10^{-4}$ S/cm at room temperature. By way of further example, in one such embodiment ion conductor layer 10 has a lithium ion conductivity of at least about $10^{-3}$ S/cm at room temperature. By way of further example, in one such embodiment ion conductor layer 10 has a lithium ion conductivity of at least about $10^{-2}$ S/cm at room temperature. Preferably, ion conductor layer 10 has sufficiently low electron conductivity that negligible electron transfer takes place during normal operation.

Ion conductor layer 10 is also preferably sufficiently durable so as to withstand repeated cycling of the EC device between an optically less transmissive state and an optically more transmissive state. For example, in one such embodiment, lithium ion conductivity of ion conductor layer 10 varies less than about 5% upon cycling of the EC device between a less transmissive state (e.g. about 5% transmissive) and a more transmissive state (e.g. about 70% transmissive) for at least 100 hours at 85° C. By way of further example, in one such embodiment lithium ion conductivity of ion conductor layer 10 varies less than about 4% upon cycling of the EC device between a less transmissive state and a more transmissive state for at least 100 hours at 85° C. By way of further example, in one such embodiment lithium ion conductivity of ion conductor layer 10 varies less than about 3% upon cycling of the EC device between a less transmissive state and a more transmissive state for at least 100 hours at 85° C. By way of further example, in one such embodiment lithium ion conductivity of ion conductor layer 10 varies less than about 2% upon cycling of the EC device between a less transmissive state and a more transmissive state for at least 100 hours at 85° C. By way of further example, in one such embodiment lithium ion conductivity of ion conductor layer 10 varies less than about 1% upon cycling of the EC device between a less transmissive state and a more transmissive state for at least 100 hours at 85° C. By way of further example, in one such embodiment lithium ion conductivity of ion conductor layer 10 varies less than about 0.5% upon cycling of the EC device between a less transmissive state and a more transmissive state for at least 100 hours at 85° C.

Additionally, to enable EC stack 28 to endure a range of physical stresses to which it may be exposed during the manufacture of EC device 1, its incorporation into a structure (e.g., an automobile, aircraft, or building), and/or its intended end-use environment (e.g., as an architectural window, sunroof, skylight, mirror, etc., in such a structure), ion conductor layer 10 also possesses sufficient cohesion and adhesion to the first and second electrode layers 20, 21. For example, in one embodiment, ion conductor layer 10 has a lap shear strength of at least 100 kPa, as measured at 1.27 mm/min, at room temperature, in accordance with ASTM International standard D1002 or D3163. For example, in one embodiment ion conductor layer 10 has a lap shear strength of at least 200 kPa. By way of further example, in one such embodiment ion conductor layer 10 has a lap shear strength of at least 300 kPa. By way of further example, in one such embodiment ion conductor layer 10 has a lap shear strength of at least 400 kPa. By way of further example, in one such embodiment ion conductor layer 10 has a lap shear strength of at least 500 kPa. By way of further example, in one such embodiment ion conductor layer 10 has a lap shear strength of at least 600 kPa. Preferably, ion conductor layer 10 is elastically deformable. In one exemplary embodiment, ion conductor layer 10 has an elongation to failure of at least 1 mm.

Some non-exclusive examples of electrolytes typically incorporated into ion conductor layer 10 are: solid polymer electrolytes (SPE), such as poly(ethylene oxide) with a dissolved lithium salt; gel polymer electrolytes (GPE), such as mixtures of poly(methyl methacrylate) and propylene carbonate with a lithium salt; composite gel polymer electrolytes (CGPE) that are similar to GPE's but with an addition of a second polymer such a poly(ethylene oxide), and liquid electrolytes (LE) such as a solvent mixture of ethylene carbonate/diethyl carbonate with a lithium salt; and composite organic-inorganic electrolytes (CE), comprising an LE with an addition of titania, silica or other oxides. Some non-exclusive examples of lithium salts used are LiTFSl-$CF_3SO_2NLiSO_2CF_3$ (lithium bis(trifluoromethane) sulfonimide), $LiBF_4$ (lithium tetra fluoroborate), $LiAsF_6$ (lithium hexafluoro arsenate), $LiCF_3SO_3$ (lithium trifluoromethane sulfonate), and $LiClO_4$ (lithium perchlorate). Additional examples of suitable ion conducting layers include silicates, silicon oxides, tungsten oxides, tantalum oxides, niobium oxides, and borates. The silicon oxides include silicon-aluminum-oxide. These materials may be doped with different dopants, including lithium. Lithium doped silicon oxides include lithium silicon aluminum-oxide. In some embodiments, the ion conducting layer comprises a silicate based structure. In other embodiments, suitable ion conductors particularly adapted for lithium ion transport include, but are not limited to, lithium silicate, lithium aluminum silicate, lithium aluminum borate, lithium aluminum fluoride, lithium borate, lithium nitride, lithium zirconium silicate, lithium niobate, lithium borosilicate, lithium phosphosilicate, and other such lithium-based ceramic materials, silicas, or silicon oxides, including lithium silicon-oxide.

The thickness of the ion conductor layer 10 will vary depending on the material. In some embodiments using an inorganic ion conductor, the ion conductor layer 10 is about 250 nm to 1 nm thick, preferably about 50 nm to 5 nm thick. In some embodiments using an organic ion conductor, the ion conductor layer is about 1000000 nm to 1000 nm thick or about 250000 nm to 10000 nm thick. The thickness of the ion conductor layer is also substantially uniform. In one embodiment, a substantially uniform ion conductor layer varies by not more than about +/−10% in each of the aforementioned thickness ranges. In another embodiment, a substantially uniform ion conductor layer varies by not more than about +/−5% in each of the aforementioned thickness ranges. In another embodiment, a substantially uniform ion conductor layer varies by not more than about +/−3% in each of the aforementioned thickness ranges.

In one embodiment, the ion-conducting film is produced from the ion conducting formulation by depositing the liquid formulation with the anode film, cathode film, or both films in a sufficient quantity to form a continuous pre-crosslinked film having a uniform thickness between 50 and 500 microns between the anode and cathode plates. This assembly may then be placed in a vacuum laminator and heated under vacuum to form a sealed assembly. Polymerization of the monomer/co-monomer may be initiated either thermally or photochemically. In one embodiment, any thermal processing of the device, particularly one where the substrate is plastic, is below the temperature of 200° C., and more particularly 150° C., and even more particularly 100° C.

Alternatively, free standing, fully formulated ion-conducting films may be used in place of the crosslinking IC formulation or the liquid IC formulation may be used in a "cast in place" process where a pre-formed cavity between the anode and cathode is produced (edge sealed) and the formulation is forced into this cavity through fill ports.

In some embodiments, the electrically conductive layers are selected from a group consisting of: transparent conductive oxides, thin metallic coatings, networks of conductive nanoparticles (e.g., rods, tubes, dots), conductive metal nitrides, and composite conductors.

At least one of the two electrically conductive layers 22, 23 is also preferably transparent in order to reveal the EC properties of the stack 28 to the surroundings. In one embodiment, electrically conductive layer 23 is transparent. In another embodiment, electrically conductive layer 22 is transparent. In another embodiment, electrically conductive layers 22, 23 are each transparent. In certain embodiments, one or both of the electrically conductive layers 22, 23 is inorganic and/or solid. Electrically conductive layers 22 and 23 may be made from a number of different transparent materials, including transparent conductive oxides, thin metallic coatings, networks of conductive nanoparticles (e.g., rods, tubes, and dots), conductive metal nitrides, and composite conductors. Transparent conductive oxides include metal oxides and metal oxides doped with one or more metals. Examples of such metal oxides and doped metal oxides include indium oxide, indium tin oxide, doped indium oxide, tin oxide, doped tin oxide, zinc oxide, aluminum zinc oxide, doped zinc oxide, ruthenium oxide, doped ruthenium oxide and the like. Transparent conductive oxides are sometimes referred to as (TCO) layers. Thin metallic coatings that are substantially transparent may also be used. Examples of metals used for such thin metallic coatings include gold, platinum, silver, aluminum, nickel, and alloys of these. Examples of transparent conductive nitrides include titanium nitrides, tantalum nitrides, titanium oxynitrides, and tantalum oxynitrides. Electrically conducting layers 22 and 23 may also be transparent composite conductors. Such composite conductors may be fabricated by placing highly conductive ceramic and metal wires or conductive layer patterns on one of the faces of the substrate and then over-coating with transparent conductive materials such as doped tin oxides or indium tin oxide. Ideally, such wires should be thin enough as to be invisible to the naked eye (e.g., about 100 μm or thinner). Non-exclusive examples of electron conductors 22 and 23 transparent to visible light are thin films of indium tin oxide (ITO), tin oxide, zinc oxide, titanium oxide, n- or p-doped zinc oxide and zinc oxyfluoride. Metal-based layers, such as ZnS/Ag/ZnS and carbon nanotube layers have been recently explored as well. Depending on the particular application, one or both electrically conductive layers 22 and 23 may be made of or include a metal grid.

The thickness of the electrically conductive layer may be influenced by the composition of the material comprised within the layer and its transparent character. In some embodiments, electrically conductive layers 22 and 23 are transparent and each have a thickness that is between about 1000 nm and about 50 nm. In some embodiments, the thickness of electrically conductive layers 22 and 23 is between about 500 nm and about 100 nm. In other embodiments, the electrically conductive layers 22 and 23 each have a thickness that is between about 400 nm and about 200 nm. In general, thicker or thinner layers may be employed so long as they provide the necessary electrical properties (e.g., conductivity) and optical properties (e.g., transmittance). For certain applications it will generally be preferred that electrically conductive layers 22 and 23 be as thin as possible to increase transparency and to reduce cost.

Referring again to FIG. 2, the function of the electrically conductive layers is to apply the electric potential provided by a power supply over the entire surface of the EC stack 28 to interior regions of the stack. The electric potential is transferred to the conductive layers though electrical connections to the conductive layers. In some embodiments, bus bars, one in contact with first electrically conductive layer 22 and one in contact with second electrically conductive layer 23 provide the electrical connection between the voltage source and the electrically conductive layers 22 and 23.

In one embodiment, the sheet resistance, $R_s$, of the first and second electrically conductive layers 22 and 23 is about 500Ω/□ to 1Ω/□. In some embodiments, the sheet resistance of first and second electrically conductive layers 22 and 23 is about 100Ω/□ to 5Ω/□. In general, it is desirable that the sheet resistance of each of the first and second electrically conductive layers 22 and 23 be about the same. In one embodiment, first and second electrically conductive layers 22 and 23 each have a sheet resistance of about 20Ω/□ to about 8 Ω/□.

In some embodiments, one or both of the electrically conducting layers are gradient electrically conductive layers. An electrically conductive layer with a "gradient", as defined herein, refers to an electrically conducting layer with spatially varying sheet resistance, or resistance to current flow substantially parallel to a major surface of the layer that varies as a function of position within the electrically conductive layer. Other embodiments include, a "gradient ECL", or a "gradient TCO", or a "gradient transparent conducting layer", all of which are electrically conducting layers with gradients as defined above. In some embodiments, the electrically conducting layers are a gradient based on thickness of the transparent conductive oxide (TCO) material and have an inverse symmetry. In other embodiments, the resistance gradient in the transparent conductive layer may be formed by different techniques such as by creating a gradient in the composition of the transparent conductive layer, or by patterning the materials with a scribe or etchant to effectively create an "electron maze." Regardless of the technique used, the gradients may have an inverse symmetry to one another. The gradient transparent conductive layer allows for the use of EC devices in panels used for large scale applications such as architectural windows or in transportation applications such as buses and trains or automobiles. This is because with a gradient transparent conductive layer there is not a drop in effective voltage across an EC panel or device once the voltage is applied to the EC panel or device at the bus bars, which provides for a uniform transition between tint states across all dimensions of the EC panel. More details on gradient transparent conductive layers and different embodiments applicable to the EC devices described in this specification can be found in U.S. Pat. No. 8,717,658 entitled EC Multi-Layer Devices With Spatially Coordinated Switching (incorporated herein by reference), U.S. Pat. No. 9,091,895 EC Multi-Layer Devices With Composite Electrically Conductive Layers (incorporated herein by reference), U.S. Pat. No. 9,091,868 EC Multi-Layer Devices With Composite Current Modulating Structure (incorporated herein by reference), and patent application number US 2014/0043668 EC Multi-Layer Devices With Current Modulating Structure (incorporated herein by reference.) The gradient transparent conductive layers can not only remove the "iris effect" problem that larger scale EC devices have by enabling the uniform transition between states across the entire surface of the EC panel, but also enable the fast transition between tint states (i.e., a short switching time, or a fast switching speed) and in particular from the clear state to the dark state and vice versa.

In some embodiments, the outer substrates are selected from a group consisting of: glass (e.g. soda lime glass or borosilicate glass), and plastic (e.g. polycarbonates, polyacrylics, polyurethanes, urethane carbonate copolymers, polysulfones, polyimides, polyacrylates, polyethers, polyester, polyethylenes, polyalkenes, polyimides, polysulfides, polyvinylacetates and cellulose-based polymers).

In some embodiments, the substrate has a melting point less than 800° C., or less than 700° C., or less than 600° C., or less than 500° C., or less than 400° C., or less than 300° C., or less than 250° C., or less than 200° C., or less than 150° C., or less than 100° C., or from 100° C. to 200° C., or from 200° C. to 300° C., or from 300° C. to 400° C., or from 400° C. to 500° C., or from 500° C. to 600° C., or from 600° C. to 700° C., or from 700° C. to 800° C., or from 800° C. to 900° C., or from 900° C. to 1000° C., or from 1000° C. to 1100° C., or from 1100° C. to 1200° C., or from 120° C. to 1300° C., or from 1300° C. to 1400° C., or from 1400° C. to 1500° C., or from 1500° C. to 1600° C.

In some embodiments, the substrate is thicker than 50 microns, or thicker than 10 microns, or thicker than 100 microns, or from 10 microns to 10 mm, or from 10 microns to 6 mm, or from 1 mm to 10 mm, or from 10 to 1000 microns, or from 50 to 1000 microns.

Referring again to FIG. 2, the power supply (not shown) connected to bus bars 26, 27 is typically a voltage source with optional current limits or current control features and may be configured to operate in conjunction with local thermal, photosensitive or other environmental sensors. The voltage source may also be configured to interface with an energy management system, such as a computer system that controls the EC device according to factors such as the time of year, time of day, and measured environmental conditions. Such an energy management system, in conjunction with large area EC devices (e.g., an EC architectural window), can dramatically lower the energy consumption of a building.

In some embodiments, the EC multilayer stacks and EC multilayers stacks including crystalline anodic EC nanostructures can be incorporated into EC panels and/or EC devices. Independent of application, the EC structures and devices of the present disclosure may have a wide range of sizes. In general, it is preferred that the EC device comprise a substrate having a surface with a surface area of at least 0.001 meter². For example, in certain embodiments, the EC device comprises a substrate having a surface with a surface area of at least 0.01 meter², or at least 0.1 meter², or at least 1 meter², or at least 5 meter², or at least 10 meter².

In some cases, the EC panels and/or EC devices have desirable optical properties. Some examples of desirable optical properties are uniform transitioning from one optical state to another across the entire device or panel (e.g., where all tinted states have a delta E less than 10 across the area of the panel), a clearer clear state with no perceptible color (e.g., where the clear state has an average CIE-Lab b* from 3 to 6, an average CIE-Lab a* from −4 to 2, and an average CIE-Lab L* from 85 to 90), and a more black colored dark state (e.g., where the dark state has an average CIE-Lab b* from −5 to −2, an average CIE-Lab a* from −7 to −5, and an average CIE-Lab L* from 10 to 30).

In some embodiments, the EC panels and/or EC devices have a low transmission dark state (e.g., with $T_{vis}$ less than 5%) and a high transparency clear state (e.g., with $T_{vis}$ greater than 70%), and a continuum of tinted states with varying transmission between these two end states. In some embodiments, the EC device or panel can be used as privacy glass with a low transmission dark state (e.g., with $T_{vis}$ less than 0.1%) and a high transparency clear state (e.g., with $T_{vis}$ greater than 55%), and a continuum of tinted states with varying transmission between the clear and dark states. In some embodiments, the EC panel or also comprises a continuum of tinted states with varying transmission between these two end states, and the dark state, the clear state and the tinted states all have colors that are close to neutral (e.g., with a* from −4 to 4, and b* from −6 to 6). In some embodiments, the EC panel or device may also have very fast switching speed (e.g., less than 5 minutes, or less than 10 minutes) as well as uniform transitions between states (e.g., where the clear state, dark state and all tinted states have delta E across the area of the panel less than 10) by including one or more gradient transparent conductive layers in each EC device or panel. The EC device or panels described herein may be used in many applications such as architectural or transportation. The architectural applications may include glass used on the exterior of the building such as windows or doors having insulated glass units (IGUs.) The architectural applications may also include interior applications such as partitions, windows, or doors.

Description of Functional Devices with Crystalline Cathodic Electrochromic Nanostructures The EC multi-layer stacks and/or devices incorporating the nanostructures described in this disclosure may also be particle-based EC multi-layer stacks and/or devices. A particle-based EC device is an EC structure where one or more of the functional layers is formed of nanoparticles or nanostructures, such as those described above. The functional layers include the transparent conductive layers, the electrodes (anode and or cathode), and the ion conductor. In one embodiment, an EC particle-based system is one where the particles or nanoparticles in such a system are crystalline, semi-crystalline or amorphous solid state materials with an extended solid state crystal structure and have substitutable atoms such as metals and ligands that can be modified to tune the EC properties. A unit cell of the crystal structure is the smallest repeatable unit within that structure and can be used both to describe the contents of the crystal and to estimate the number of atoms and/or unit cells in a particle of a given size. The number of atoms/unit cells in a particle can be estimated based on known bond lengths between different atoms and the positions of the atoms in the unit cells. The EC particles may range from 1-200 nm at the largest and 10-50 nm as a more preferred range.

Although a range of EC materials could be used in particle-based EC systems, cathode or anode films that can be prepared by simple low temperature single-step deposition processes to produce EC electrodes (i.e., EC cathodes, EC anodes or EC anodes and cathodes) with improved thermal stability, high optical clarity in their as-deposited states, and that can be tuned via composition and film thickness to adopt a wide variety of area charge capacities and optical switching properties may be useful in the field.

In general, the particle-based systems may be tuned to obtain EC materials (EC systems) that reversibly change from a transparent state having a desirable $T_{vis}$ to a dark color having a high coloration efficiency. In various embodiments of this invention, the EC properties that may be tuned are:

a. Bleached state of material: Transparent, clear color
b. Dark state of material: The desired color can vary based on the different purposes, but for EC windows the color may be anything pleasing to the human eye in the dark state (e.g. "night sky" grey-blue). Both of the electrodes (anode and cathode) can contribute to the color of the dark state or only one of the electrodes can be coloring. In the instance where both anode and cathode are contribute to the color of the final EC device, then the color tuning may be performed to match one to the other to create an overall color for the dark state. The color may be based on a standard such as a CIE L*a*b* value. In particular, b* should be less than 10.
c. Coloration efficiency: A deep dark color is desired in the dark state, as opaque as possible. Therefore, a high coloration efficiency is desired.
d. Switching speed: A fast switching speed between oxidized and reduced states, where the transparent state is 5% or less in the transparent state when switched and the dark state is at least 65% darkened.
e. Voltage matching of the anode and cathode in the final EC device.
f. Anode: Want dark colored oxidized state and a clear/transparent reduced state
g. Cathode: Want clear/transparent oxidized state and dark colored reduced state Both anodic and cathodic EC particle-based materials may be tuned for any of the above properties using methods of substituting metals and ligands. Of particular interest is tuning the color of the EC particle-based materials. The particle-based anode material may be any of crystalline anodic EC nanostructures described in this disclosure. The particle-based cathode materials may be any material compatible with the other materials selected as part of the EC device, from a chemical compatibility standpoint as well as from a device functionality standpoint. Chemically the materials should be compatible in that they do not detrimentally interact with one another. From a device functionality standpoint the device materials can be selected to provide a device that performs within parameters determined to be optimal for the various products into which it may be integrated. For example the anode and cathode may be selected to have dark-state colors that combine to provide a desired color. In another example the materials may be selected to provide a particular switching speed or coloration efficiency.

The ion conductor material used in particle-based EC devices in one embodiment may be produced from a liquid formulation that comprises an electrolyte solvent or plasticizer, a polymerizable monomer or set of monomers, an optional polymerization initiator, and a salt such as a lithium salt or an acid. The formulation may also comprise other additives to promote device performance such as pH buffers, UV stabilizers, and the like. In another embodiment, the ion-conducting film is produced from the ion conducting formulation by depositing the liquid formulation with the anode film, cathode film, or both films in a sufficient quantity to form a continuous pre-crosslinked film having a uniform thickness between 50 and 500 microns between the anode and cathode plates. This assembly may then be placed in a vacuum laminator and heated under vacuum to form a sealed assembly. Polymerization of the monomer/co-monomer may be initiated either thermally or photochemically. In one embodiment, any thermal processing of the device, particularly one where plastic is the substrate, is below the temperature of 200° C., and m ore particularly 150° C., and even more particularly 100° C.

Alternatively, free standing fully formulated ion-conducting films may be used in place of the crosslinking IC formulation or the liquid IC formulation may be used in a "cast in place" process where a pre-formed cavity between the anode and cathode is produced (edge sealed) and the formulation is forced into this cavity through fill ports. Typical monomers used in these formulations are polar organic olefins such as acrylates, or other well-known polymerization systems such as silicones, urethanes and the like.

In an alternative embodiment, the structure of the EC device may employ a symmetric electrode assembly, where each of the electrode layers include a mixture of both anode and cathode EC particles.

In another embodiment, the EC device may be formed by a combination of both anodic and cathodic particles dispersed in a single layer between two conductive layers where at least one of the anodic or cathodic particles are transparent in both oxidized and reduced states so that the color is created by only one of the anodic or cathodic particles.

Particle-based formulations for the different components in EC devices allows for alternative techniques for making EC devices having the components described above including the anode, cathode, ion conductor, and the transparent conductive layers. A particle-based coating technology may also enable novel device architectures to exploit the potential for greatly reduced device complexity, growing EC films post-deposition (of particular value for curved applications), and post-device completion defect repair.

In one embodiment the particle-based devices and techniques may be mixed-particle films, such as anode materials mixed with cathode materials to produce a film that functions as both. In another embodiment the mixed particle films may be formed of non-EC particles mixed with EC particles in a binder material to enhance specific properties, where the non-EC particles may be charge sequestration particles or additives to increase the ionic or electronic conductivity of the device. The binder may be an organic material that is both adhesive and ion-conducting. The transparent conductive layer (TCL) may also be particle-based and be incorporated into an adhesive film. The TCL particles may be approximately 2 microns and create a resulting TCL film having a sheet resistance of about 50Ω/□ to about 100Ω/□. A particle based TCL with high transparency and low haze but with low conductivity can also be used in these types of systems due to the thinness of the TCL's. This is because any total conductivity can be achieved by layering the TCL layers. For example, 10 stacked 5 layer devices with TCL films having 250Ω/□ would have net 25Ω/□ resistance resulting in exceptional film performance with relatively low volumetric charge capacity—and thus less need for a high conductivity TCL. This is valuable because the high conductivity TCL's are more expensive.

An example of a mixed-particle device may have the TCL adhesive film sandwiching an adhesive ion conducting film which incorporates both anode and cathode particles. Alternatively there may be two adhesive ion conducting films sandwiched between the TCL adhesive film, where one of the adhesive ion conducting films incorporates the anode material and the other adhesive ion conducting film incorporates the cathode material. There may be more than two of the electrode and ion conducting adhesive films present in these types of devices in order to provide multiple discrete EC layers. Roll-to-roll processing using flexible films would enable efficient processing of such devices.

In some embodiments, crystalline cathodic EC nanostructures, and/or films and/or devices containing crystalline cathodic EC nanostructures possess one or more of the following characteristics:
1. Ability to be synthesized in a structurally and compositionally pure state
2. Stable under ambient conditions
3. Stable under temperatures amenable to low temperature and/or high temperature substrates
   Low=flexible, polymeric, e.g. Polyethylene terephthalate (PET) thus approximately 150° C. or less
   High=e.g. glass thus approximately 500° C. or less
4. Stable in the presence of light, oxygen, and humidity at 85° C. or less
5. Ability to intercalate and deintercalate lithium
   i.e. some location exists in the structure for Li to intercalate into and from
6. Ability to intercalate and deintercalate lithium with concomitant reduction/oxidation of a metal in the material—often a transition metal
   If a cathode, will intercalate and deintercalate lithium with metal being reduced then re-oxidized
   If an anode will deintercalate and intercalate lithium with metal being oxidized then reduced
7. Ability to intercalate and deintercalate lithium reversibly with reversible metal redox
   Low lattice strain upon intercalation/deintercalation 8. Ability to intercalate and deintercalate lithium reversibly with reversible metal redox without irreversible structural changes and preferably with no structural changes
9. Ability to intercalate and deintercalate lithium reversibly with reversible metal redox without irreversible structural changes and preferably with no structural changes in a voltage range of approximately 2.5-4.2V vs. Li
10. Undergoes optical modulation upon metal redox
11. Undergoes optical modulation in the visible region upon metal redox
12. Has high $T_{vis}$ in the most reduced state if an anode and in the most oxidized state if a cathode
    i.e is transparent; $T_{vis}$ as close to 100% as possible
13. Has low $T_{vis}$ in the most oxidized state if an anode and in the most reduced state if a cathode
    i.e is opaque; $T_{vis}$ as close to 0 as possible
14. Structurally and electrochemically stable upon size reduction such as grinding, milling or the like
15. The size-reduced material may be formulated into a stable dispersion or ink that comprises the size-reduced material, a solvent and possibly various additives that (a) improve dispersion of the size-reduced material, (b) improve the properties of the solvent, (c) improve the drying characteristics of the wet film, (d) improve the optical characteristics of the dried film, or other characteristics.
    Stable implies a dispersion or ink that will remain dispersed for a period of time sufficient to perform a coating experiment
    In some embodiments, stable implies >8 hr and in some embodiments, stable implies >days or weeks
16. May be formed into a stable dispersion or ink and coated onto a substrate in using conventional coating methods
17. May be formed into a stable dispersion or ink and coated onto a substrate and dried such that the optical characteristics of the resulting film are pleasing to the eye
    Important optical characteristics include at least low haze and high clarity, neutral color and high $T_{vis}$
18. May be formed into a stable dispersion or ink containing only small particles of the active material and dispersion, drying or other additives that can be removed at a temperature and under conditions that are compatible with the substrate chosen
    i.e. additives and solvent must be such that they can be removed without damaging the substrate or the quality of the resulting film or the active material itself
19. The resulting dry film is stable under at least the conditions described in (2)-(4)
20. The resulting dry film displays the properties of the original powder
21. The resulting film (cathode or anode) can be fabricated into an optical device
22. The optical device comprises an electrolyte separating the anode and cathode particles
23. The optical device is stable under at least the conditions described in (2)-(4)
24. The optical device displays characteristics including at least low haze and high clarity, neutral color and high $T_{vis}$ when the device is in the state where the cathode is oxidized and the anode is reduced
25. The optical device displays characteristics including at least low haze and high clarity, neutral color and low $T_{vis}$ when the device is in the state where the cathode is reduced and the anode is oxidized
26. The device can be cycled with an acceptable rate per cycle
27. The device can be cycled without degradative losses
28. The device can be cycled without degradative losses in the presence of light, oxygen, and humidity at 85° C. or less
29. The device can be cycled with limited degradative losses (e.g. <2%) in the presence of light, oxygen, and humidity at 85° C. or less for at least 5000 cycles
30. The device can be cycled with limited degradative losses under conditions consistent with ASTM method 2141.

Methods for EC Nanostructured Cathodes

This section describes methods of manufacturing a thin film, in some embodiments, comprising: providing a plurality of crystalline cathodic electrochromic (EC) particles; size-reducing the crystalline cathodic EC particles by grinding to produce crystalline cathodic EC nanostructures; and coating the crystalline cathodic EC nanostructures onto a substrate to produce an EC thin film.

Embodiments of the current invention describe methods of producing EC thin films, multi-layer stacks, and devices containing crystalline cathodic EC nanostructures using methods that are amenable to high volume, low cost manufacturing. Additionally, embodiments of the current invention also describe films having robust mechanical properties and deposition methods that are compatible with substrates requiring low maximum processing temperatures.

The method provides a low temperature process for the formation of a film on a substrate by preparing the deposited material in an earlier higher temperature process. In many embodiments of the current invention, the process of making the particles includes both preparing the particles using a thermal treatment, and then grinding the particles using a process such as milling to form nanostructures of the particles. The term "thermal treatment" refers to calcination, annealing, sintering, hydrothermal methods and many others known in the art. The nanostructures may then be dispersed into an ink and deposited onto a substrate for form a thin film. In some embodiments, these films are also incorporated into multi-layer stacks, and EC devices. The methods described herein enable high temperature processing (e.g., that is required to create crystalline EC material) to be performed before the EC material is deposited on the substrate, which then enables EC materials requiring high temperature processing to be deposited on a substrate in a low temperature process. A benefit of this type of a process is that high quality EC films can be deposited on substrates that have relatively low melting points relative to the temperatures required to form the EC materials. Some examples of the properties of high quality EC films are good optical properties (e.g., high optical transmission and b* near zero), good electrical properties (e.g., high capacity), and good durability (e.g., low fade).

In some embodiments, a method of producing the cathode of an EC multi-layer stack comprises synthesizing crystalline cathodic EC particles; size-reducing the crystalline cathodic EC particles by grinding to produce crystalline cathodic EC nanostructures; and coating the crystalline cathodic EC nanostructures on a substrate.

This disclosure also describes a method to produce an EC mixed metal oxide thin film. In some embodiments the substrate may be stable under high temperature conditions of 300° C. or higher or 600° C. or higher. These stable substrates may be glass, quartz or sapphire. In other embodiments, the substrate may be unstable under high temperature conditions (300° C. or higher or 600° C. or higher), for example plastics (e.g. polycarbonates, polyacrylics, polyurethanes, urethane carbonate copolymers, polysulfones, polyimides, polyacrylates, polyethers, polyester, polyethylenes, polyalkenes, polyimides, polysulfides, polyvinylacetates and cellulose-based polymers).

There are a number of advantages of this approach to create these types of EC thin films on a substrate, such as enabling the use of liquid coating precursors, performing synthesis before depositing on a substrate, eliminating the requirement to remove materials from the substrate except for drying, eliminating the exposure of the substrate to high temperatures, and reducing the equipment and materials costs compared to other state of the art methods such as hydrothermal synthesis directly on a substrate, sol-gel followed by calcination and annealing, and physical vapor deposition onto a heated or unheated substrate followed by annealing.

The methodology for forming EC films described in this disclosure enables the use of any synthetic method and any temperature that may be necessary because synthesis is partially or entirely removed from the substrate and performed in advance of the deposition of the EC material on the substrate. Furthermore, the method also allows for a significantly greater opportunity for purification and characterization of the active species since the material is prepared before deposition to the substrate. Regarding durability, rate and coloration efficiency considerations, EC behavior can vary widely depending on the composition, crystal structure (and polymorph) of the material in the device. Not being held to any particular theory, the fact that the materials described herein are structurally stable upon insertion and de-insertion of lithium, sodium and other ions is believed to be beneficial.

In some embodiments the reagents of inorganic metal precursors, such as metal salts, oxides, hydroxides, carbonates, or bicarbonates were used for the synthesis of a powder of crystalline cathodic EC particles. In some cases, the mixtures of reagents are finely ground to mix well, and then calcined at high temperature.

In some embodiments, materials may be produced via conventional solid state reactions comprising repetitive heating and grinding cycles, hydrothermal synthesis, sol-gel synthesis methods where reactive species are hydrolyzed to form colloids, inert atmosphere reactions, flux reactions, nanosynthesis reactions, microwave synthesis reactions, laser pyrolysis reactions, spray drying, or the like. In some embodiments, different characteristics of the previously listed synthesis methods are combined in a step-by-step manner. In some embodiments, variable heat treatment steps are required while in others, only a single heat treatment step is necessary. Heat treatment may comprise precursor decomposition, calcination, sintering and even melting. In some embodiments, the temperature range of the thermal treatment is from 150° C. to 300° C., or from 100° C. to 400° C., or from 100° C. to 100° C., or from 100° C. to 800° C., or from 100° C. to 600° C., or it may be b roader.

In some embodiments, the mixture of reagents is ball-milled prior to thermal treatment (e.g., calcination) for intimate mixing between the solid-state precursors. The reagent mixtures can be ball-milled at 300 rpm for from 45 to 90 cycles with a 3 minute run and 5 minute break at each cycle in a solvent (e.g., acetone). In some embodiments, the reagent mixtures can be ball-milled at from 100 rpm to 500 rpm, for from 20 to 200 cycles, with run times from 1 min to 10 min, and with break times from 1 min to 10 min, before thermal treatment. After milling the milled slurry can be filtered to remove milling media and can be washed with a solvent (e.g., acetone). The filtrate slurry may be dried in the oven (e.g., at 150° C. for 2 h). After cooling, the powder may be pressed into a pellet, and thermally treated (e.g., calcined at 800° C. for 12 h in air).

In some embodiments the heat treated crystalline cathodic EC particles are washed on a filter. In some embodiments the heat treated particles are washed using a centrifuge washing method. In some embodiments, DI water is used to wash the heat treated particles. In some embodiments, DI water followed by isopropyl alcohol is used to wash the heat treated particles. In other embodiments, any solvent in which the additive reagents are soluble followed by water can be used in the washing process, such as 1 M LiOH followed by DI water.

In some embodiments, the heat treated crystalline cathodic EC particles are washed, and separated from the washing fluid by centrifuging at 3000 rpm, or at 3500 rpm, or at 4000 rpm, or at 4500 rpm, or at 5000 rpm, or at 5500 rpm, or at 6000 rpm. In some embodiments, the heat treated particles are washed, and separated from the washed contaminants by washing and centrifuging once, or by washing and centrifuging twice, by washing and centrifuging three times, by washing and centrifuging four times, by washing and centrifuging five times, by washing and centrifuging six times, by washing and centrifuging using a continuous flow centrifuge process. In some embodiments, the washing fluid can be removed from the heat treated particles using a membrane filtering method.

Size-Reduction of Crystalline Cathodic EC Particles

In some embodiments, the crystalline cathodic EC particles could be size-reduced by grinding. In some embodiments the particles could be size-reduced using a mortar and pestle, or using an agitator bead mill, or using a planetary mill, or using a linear impact mill, or any method which reduces particle size through mechanical means.

In some embodiments an agitator bead mill, or a planetary mill is used to reduce the size of the crystalline cathodic EC particles, using milling media that is 0.03 mm in diameter, or 0.05 mm in diameter, or 0.1 mm in diameter, or 0.2 mm in diameter, or 0.3 mm in diameter, or 0.4 mm in diameter, or 0.5 mm in diameter. In some embodiments an agitator bead mill, or a planetary mill is used to reduce the size of the particles, using milling media that comprises a hard ceramic material, such as a hard ceramic material containing $ZrO_2$, or $HfO_2$, or $Y_2O_3$, or an alloy of $ZrO_2$ and $HfO_2$, or an alloy of $ZrO_2$ and $Y_2O_3$, or an alloy of $ZrO_2$ and $HfO_2$ and $Y_2O_3$, or $CeO_2$, or an alloy of $ZrO_2$ and $CeO_2$, or $SiO_2$, or an alloy of $ZrO_2$ and $SiO_2$, or even steel.

In some embodiments an agitator bead mill, or a planetary mill is used to reduce the size of the particles, using water, isopropyl alcohol (IPA), propylene glycol propyl ether (PGPE), or heptanol as the solvent. In some embodiments, low molecular weight alcohols (e.g., propanol or butanol), or organic solvents with viscosity less than 5 cP are used as a solvent. In some embodiments an agitator bead mill, or a planetary mill is used to reduce the size of the particles, using multiple milling cycles, wherein each cycle has an active milling period and an inactive period wherein the mill is allowed to cool. In some embodiments an agitator bead mill, or a planetary mill is used to reduce the size of the particles, using a milling speed of 200 rpm, or 300 rpm, or 400 rpm, or 500 rpm, or 600 rpm, or 700 rpm, or 800 rpm, or 900 rpm, or 1000 rpm. In some embodiments an agitator bead mill, or a planetary mill is used to reduce the size of the particles, wherein the active milling period has a duration of from 1 to 10 min, and an inactive duration of from 1 to 10 min, and a total of from 5 to 50 cycles. In some embodiments an agitator bead mill, or a planetary mill is used to reduce the size of the particles, wherein the active milling period has a duration of 1 min, or 2 min, or 3 min, or 4 min, or 5 min, or 6 min, or 7 min, or 8 min, or 9 min, or 10 min, or from 1 to 10 min, or from 2 to 5 min, or from 3 to 6 min, and an inactive duration of 1 min, or 2 min, or 3 min, or 4 min, or 5 min, or 6 min, or 7 min, or 8 min, or 9 min, or 10 min, or from 1 to 10 min, or from 2 to 7 min, or from 2 to 6 min, and a total of from 5 cycles, or 10 cycles, or 15 cycles, or 20 cycles, or 25 cycles, or 30 cycles, or 35 cycles, or 40 cycles, or 45 cycles, or 50 cycles, or from 5 to 50 cycles, or from 10 to 30 cycles, or from 10 to 20 cycles, or from 20 to 30 cycles. In some embodiments an agitator bead mill, or a planetary mill is used to reduce the size of the particles, wherein the mill is cooled and milling is performed for a duration of 10 min to 10 hours, or 20 min, or 30 min, or 40 min, or 50 min, or 1 hour, or 1.5 hours, or 2 hours, or 3 hours, or 5 hours, or 7.5 hours, or 10 hours, or from 1 to 2 hours, or from 1 to 3 hours, or from 1 to 5 hours. In some embodiments an agitator bead mill, or a planetary mill is used to reduce the size of the particles, wherein the milling is performed until the average particle size is less than 500 nm in diameter, or less than 300 nm in diameter, or less than 250 nm diameter, or less than 200 nm diameter, or less than 150 nm diameter, or less than 100 nm diameter.

In some embodiments, milling is performed in a continuous manner. In some embodiments, milling is performed in a continuous manner with fractions of the total milling volume. In some embodiments, milling is performed in a continuous manner with fractions of the total milling volume where the remainder of the total milling volume is stored in a storage vessel allowing cooling. In some embodiments, milling is performed in a continuous manner such that the active milling period and the inactive milling period are the same as milling performed in a batch manner. In some embodiments, milling is performed using a mill with continuous circulation of the slurry from a holding tank to the milling chamber and/or a cooled milling chamber, which optionally enables milling processes without cooling periods.

In some embodiments, there is a first grinding step and a second grinding step using different methods to reduce the size of the crystalline cathodic EC particles. In some embodiments, the first grinding step to reduce the size of particles comprises a mortar and pestle, and the second grinding step to reduce the size of the particles comprises an agitator bead mill, or a planetary mill. In some embodiments the first grinding step comprises an agitator bead mill, or a planetary mill with a larger media size and the second grinding step comprises an agitator bead mill, or a planetary mill with a smaller media size.

In some embodiments the mean particle size of the size-reduced crystalline cathodic EC nanostructures after grinding is from 50 to 300 nm, or from 100 to 300 nm, or from 150 to 300 nm, or from 200 to 300 nm, or from 250 to 300 nm, or from 100 to 250 nm, or from 50 to 250 nm, or from 50 to 200 nm, or from 50 to 150 nm, or from 50 to 100, or less than 300 nm, or less than 250 nm, or less than 200 nm, or less than 150 nm, or less than 100 nm. In some embodiments the median particle size of the size-reduced crystalline cathodic EC nanostructures after grinding is from 50 to 300 nm, or from 100 to 300 nm, or from 150 to 300 nm, or from 200 to 300 nm, or from 250 to 300 nm, or from 100 to 250 nm, or from 50 to 250 nm, or from 50 to 200 nm, or from 50 to 150 nm, or from 50 to 100, or less than 300 nm, or less than 250 nm, or less than 200 nm, or less than 150 nm, or less than 100 nm.

In some embodiments the polydispersity index (as defined in the ISO standard document 13321:1996 E and ISO 22412:2008) of the particle size distribution of the crystalline cathodic EC nanostructures after grinding is less than 0.4, or less than 0.35 or less than 0.3, or less than 0.25, or less than 0.2, or less than 0.15, or less than 0.1, or from 0.1 to 0.2, or from 0.1 to 0.3. In some embodiments the coefficient of variation of the size-reduced crystalline cathodic EC nanostructures after grinding is less than 0.6, or less than 0.55 or less than 0.5, or less than 0.45, or less than 0.4, or less than 0.35, or less than 0.3, or from 0.3 to 0.45, or from 0.3 to 0.55.

In some embodiments the mean particle size of the size-reduced crystalline cathodic EC nanostructures after grinding, washing, and separating from the washing fluid, is from 50 to 300 nm, or from 100 to 300 nm, or from 150 to 300 nm, or from 200 to 300 nm, or from 250 to 300 nm, or from 100 to 250 nm, or from 50 to 250 nm, or from 50 to 200 nm, or from 50 to 150 nm, or from 50 to 100, or less than 300 nm, or less than 250 nm, or less than 200 nm, or less than 150 nm, or less than 100 nm. In some embodiments the median particle size of the size-reduced crystalline cathodic EC nanostructures after grinding, washing, and separating from the washing fluid, is from 50 to 300 nm, or from 100 to 300 nm, or from 150 to 300 nm, or from 200 to 300 nm, or from 250 to 300 nm, or from 100 to 250 nm, or from 50 to 250 nm, or from 50 to 200 nm, or from 50 to 150 nm, or from 50 to 100, or less than 300 nm, or less than 250 nm, or less than 200 nm, or less than 150 nm, or less than 100 nm.

In some embodiments the polydispersity index (as defined in the ISO standard document 13321:1996 E and ISO 22412:2008) of the particle size distribution of the size-reduced crystalline cathodic EC nanostructures after grinding, washing, and separating from the washing fluid, is less than 0.4, or less than 0.35 or less than 0.3, or less than 0.25, or less than 0.2, or less than 0.15, or less than 0.1, or from 0.1 to 0.2, or from 0.1 to 0.3. In some embodiments the coefficient of variation of the particle size distribution of the size-reduced crystalline cathodic EC nanostructures after grinding, washing, and separating from the washing fluid, is less than 0.6, or less than 0.55 or less than 0.5, or less than 0.45, or less than 0.4, or less than 0.35, or less than 0.3, or from 0.3 to 0.45, or from 0.3 to 0.55.

In some embodiments the mean particle size of the crystalline cathodic EC nanostructures after a first grinding step is from 50 to 300 nm, or from 100 to 300 nm, or from 150 to 300 nm, or from 200 to 300 nm, or from 250 to 300 nm, or from 100 to 250 nm, or from 50 to 250 nm, or from 50 to 200 nm, or from 50 to 150 nm, or from 50 to 100, or less than 300 nm, or less than 250 nm, or less than 200 nm, or less than 150 nm, or less than 100 nm. In some embodiments the polydispersity index (as defined in the ISO standard document 13321:1996 E and ISO 22412:2008) of the particle size distribution of the size-reduced crystalline cathodic EC nanostructures after a first grinding step, is less than 0.4, or less than 0.35 or less than 0.3, or less than 0.25, or less than 0.2, or less than 0.15, or less than 0.1, or from 0.1 to 0.2, or from 0.1 to 0.3. In some embodiments the coefficient of variation of the particle size distribution of the size-reduced crystalline cathodic EC nanostructures after a first grinding step, is less than 0.6, or less than 0.55 or less than 0.5, or less than 0.45, or less than 0.4, or less than 0.35, or less than 0.3, or from 0.3 to 0.45, or from 0.3 to 0.55.

In some embodiments the mean particle size of the heat treated crystalline cathodic EC nanostructures after a first grinding step, and a second grinding step is from 50 to 300 nm, or from 100 to 300 nm, or from 150 to 300 nm, or from 200 to 300 nm, or from 250 to 300 nm, or from 100 to 250 nm, or from 50 to 250 nm, or from 50 to 200 nm, or from 50 to 150 nm, or from 50 to 100, or less than 300 nm, or less than 250 nm, or less than 200 nm, or less than 150 nm, or less than 100 nm. In some embodiments the polydispersity index (as defined in the ISO standard document 13321:1996 E and ISO 22412:2008) of the particle size distribution of the crystalline cathodic EC nanostructures after a first grinding step, and a second grinding step is less than 0.4, or less than 0.35 or less than 0.3, or less than 0.25, or less than 0.2, or less than 0.15, or less than 0.1, or from 0.1 to 0.2, or from 0.1 to 0.3. In some embodiments the coefficient of variation of the particle size distribution of the crystalline cathodic EC nanostructures after a first grinding step, and a second grinding step is less than 0.6, or less than 0.55 or less than 0.5, or less than 0.45, or less than 0.4, or less than 0.35, or less than 0.3, or from 0.3 to 0.45, or from 0.3 to 0.55.

To those of ordinary skill in the relevant art, the methodology of size-reduction of particles by mechanical means is an exercise that must be optimized. For example, if the materials are insufficiently size-reduced, the average particle size may be too large for the application. In an application where the size-reduced particles will be formulated with a liquid and suspended as a dispersion, insufficiently size-reduced particles may be unstable as a dispersion or may be stable as a dispersion but not usable because the insufficiently size-reduced particles may precipitate in a time less than the time required between the preparation of the dispersion and the coating of the dispersion. Sometimes it is also possible to overly size-reduce the particles. In some circumstances, overly size-reduced particles may agglomerate into larger particles. In other circumstances, overly size-reduced particles may become less crystalline than desired, alter crystal structure, or even decompose. To those of skill in the art, the required degree of size-reduction may be modified by the use of additives that support increased dispersion stability and/or decreased agglomeration. Certain measurements such as the determination of zeta potential may guide the operator to the appropriate degree of size-reduction for a given material and in a given solvent.

In some embodiments, after crystalline cathodic EC particles are size-reduced by grinding, the resulting nanostructures are filtered to remove the grinding media and any other large diameter solids. In some embodiments the filter pore diameter is 0.7 micron or less. In some embodiments the filter pore diameter is 0.45 micron or less. In some embodiments the filter pore diameter is 0.18 micron or less.

Coating Crystalline Cathodic EC Nanostructures

In some embodiments, the crystalline cathodic EC nanostructures are coated onto a substrate using slot die coating, and the wet coating thickness is from 25 to 40 microns, or from 30 to 50 microns, or from 50 to 80 microns. The concentration by mass of the solid nanostructures determines what wet coating thickness is required to achieve a target dry film thickness. In some embodiments, the dry film thickness is approximately 1 micron, or from 0.1 to 10 microns, or from 0.5 to 1.5 microns, or from 0.2 to 2 microns.

In some embodiments, a dry film of crystalline cathodic EC nanostructures is targeted, which has an approximate thickness of 0.5 microns, or 1 microns, or 1.5 microns, or 2 microns, or from 0.2 to 2 microns, and an approximate capacity of 10 mC/cm$^2$, or 20 mC/cm$^2$, or 30 mC/cm$^2$, or 40 mC/cm$^2$, or 50 mC/cm$^2$, or from 10 mC/cm$^2$ to 50 mC/cm$^2$, or from 20 mC/cm$^2$ to 40 mC/cm$^2$. In order to obtain the targeted dry films, an ink can be coated with a solids loading greater than 4 wt %, or greater than 6 wt %, or greater than 8 wt %, or greater than 10 wt %, or greater than 15 wt %, or greater than 20 wt %, or from 2 to 50 wt %, or from 2 to 20 wt %, or from 5 to 15 wt %, or from 2 to 10 wt %, and have a wet coating thickness of greater than 2 microns, or greater than 5 microns, or greater than 10 microns, or greater than 20 microns, or greater than 30 microns, or greater than 40 microns, or greater than 50 microns, or from 2 to 60 microns.

In one example, a dry film of hexagonal tungsten trioxide or pyrochlore nanostructures is targeted, which has an approximate thickness of 1 micron, and an approximate capacity of 30 mC/cm$^2$. In this example, the formula used to relate the solids loading in wt % (i.e. concentration by mass) of the tungsten trioxide nanostructures ink to the target wet coating thickness in microns is:

$$\text{Wet Thickness}=[0.10/(\text{weight \% solids loading})]*37.5$$

Therefore, an 8 wt % solids loading ink would be coated at a wet thickness of 46.9 microns, a 10 wt % solids loading ink would be coated at a wet thickness of 37.5 microns, and a 12 wt % solids loading ink would be coated at a wet thickness of 31.25 microns.

In some embodiments, the crystalline cathodic EC nanostructures are coated onto a substrate using slot die coating, and the coating speed is from 400 to 600 cm/min, or from 200 to 500 cm/min. Different solvents can be used for coating, such as water, 1-propanol, 2-propanol, propylene glycol propyl ether (PGPE), di(propylene glycol) methyl ether (diPGME), di(propylene glycol) propyl ether (diPGPE) and/or di(ethylene glycol) ethyl ether (diEGEE), and the optimal coating speed will be different for different types of solvents. For example, crystalline cathodic EC nanostructures dispersed in isopropyl alcohol (IPA) has an optimal coating speed of approximately 50 cm/min, or approximately 100 cm/min, or approximately 200 cm/min, or approximately 400 cm/min, and a process window of approximately 50 to 500 cm/min. In another example, the nanostructures dispersed in PGPE has an optimal coating speed of approximately 50 cm/min, or approximately 100 cm/min, or approximately 200 cm/min, or approximately 400 cm/min, and a process window of approximately 50 to 500 cm/min.

In some embodiments, crystalline cathodic EC nanostructures are coated onto a substrate using slot die coating, and the die lip to substrate gap is from 60 to 160 microns. The die lip to substrate gap is larger for thicker desired wet coating thicknesses. In some embodiments, the die lip to substrate gap is twice as large as the desired wet coating thickness.

In some embodiments, the crystalline cathodic EC nanostructures are coated onto a substrate using slot die coating, and the gap between the die halves is approximately 100 microns.

In some embodiments, the crystalline cathodic EC nanostructures are coated onto a substrate using wet coating techniques, and subsequently dried at 25° C., or 50° C., or 100° C., or 200° C., or 300° C., or 400° C., or 500° C., or from 25° C. to 50° C., or from 25° C. to 100° C., or from 50° C. to 100° C., or from 100° C. to 150° C., or from 100° C. to 200° C., or from 100° C. to 300° C., or from 100° C. to 500° C. for 1 min, or 10 min, or 20 min, or 100 min, or 2 hours, or 4 hours, or 10 hours, or from 1 min to 10 hours, or from 10 to 20 min, or from 1 hour to 10 hours, or from 20 min to 2 hours.

In some embodiments the crystalline cathodic EC nanostructures are coated onto a substrate using wet coating techniques, and subsequently dried in a vacuum. If a low vapor pressure solvent is used to coat the nanostructures, then a vacuum dry can improve the uniformity and process time required to remove the solvent. In some embodiments, di(propylene glycol) methyl ether (diPGME), and/or di(ethylene glycol) ethyl ether (diEGEE) are used as the coating solvent and vacuum dried at from approximately 150 to 200 mTorr for from approximately 1 to 2 min per approximately 235 cm² area of wet coated substrate.

In some embodiments the crystalline cathodic EC nanostructures are coated onto a substrate using wet coating techniques, and leveling agents are used to improve the coated film uniformity. In some embodiments, a low vapor pressure solvent (e.g., PGPE) is used with a leveling agent with a low surface tension (e.g., 2,3-butane diol).

In some embodiments, a thin film containing the crystalline cathodic EC nanostructures does not comprise a binder material. In some embodiments, crystalline cathodic EC particles are produced via heat treatment, a colloidal dispersion of crystalline cathodic EC nanostructures is produced, and then the ink is coated on a substrate to produce a thin film of crystalline cathodic EC nanostructures, wherein the thin film does not comprise a binder material. Many thin films formed from pluralities of nanostructures utilize a binder material to improve the mechanical properties of the resulting films. Silver nanoparticles or nanowires, used for conducting lines on electronic devices use binder materials (such as urethane acrylate, polyvinyl alcohol, gelatin, polypyrrolidone, epoxies, phenolic resins, acrylics, urethanes, silicones, styrene allyl alcohols, polyalkylene carbonates, and/or polyvinyl acetals) to improve the electrical and/or mechanical properties of the films. [U.S. Patent Application Publication 2009/0130433 A1] [WO 2013036519 A1] In some embodiments, the nanostructures described in this disclosure do not require binder materials to achieve good adhesion to the substrates.

In some embodiments, the thin film of crystalline cathodic EC nanostructures is arranged on a substrate that comprises a material with a low melting point, and/or a low glass transition temperature, and/or a low softening point. One advantage of the methods described in some embodiments in this disclosure is that crystalline, partially crystalline or amorphous crystalline cathodic EC nanostructures can be synthesized, and subsequently deposited on a substrate using low temperature deposition processes. This enables high temperature materials synthesis to impart certain properties to the produced materials, without the need to expose the substrate to high temperatures. In some embodiments, the substrate is exposed to a maximum temperature of 50° C., or a maximum temperature of 100° C., or a maximum temperature of 150° C., or a maximum temperature of 200° C., or a maximum temperature of 250° C., or a maximum temperature of 300° C., or a maximum temperature of 350° C., or a maximum temperature of 400° C., or a maximum temperature of 450° C., or a maximum temperature of 500° C. In some embodiments, the substrate comprises a material with a melting point less than 800° C., or less than 700° C., or less than 600° C., or less than 500° C., or less than 400° C., or less than 300° C., or less than 250° C., or less than 200° C., or less than 150° C., or less than 100° C., or from 100° C. to 200° C., or from 200° C. to 300° C., or from 300° C. to 400° C., or from 400° C. to 500° C., or from 500° C. to 600° C., or from 600° C. to 700° C., or from 700° C. to 800° C., or from 800° C. to 900° C., or from 900° C. to 1000° C., or from 1000° C. to 1100° C., or from 1100° C. to 1200° C., or from 1200° C. to 1300° C., or from 1300° C. to 1400° C., or from 1400° C. to 1500° C., or from 1500° C. to 1600° C., or a glass transition temperature less than 1000° C., or less than 900° C., or less than 800° C., or less than 700° C., or less than 600° C., or less than 500° C., or less than 400° C., or less than 300° C., or less than 250° C., or less than 200° C., or less than 150° C., or less than 100° C., or from 75° C. to 125° C., or from 125° C. to 175° C., or from 175° C. to 225° C., or from 225° C. to 275° C., or from 275° C. to 325° C., or from 325° C. to 375° C., or from 375° C. to 425° C., or from 425° C. to 500° C., or from 500° C. to 600° C., or from 600° C. to 700° C., or from 700° C. to 800° C., or from 800° C. to 900° C., or a softening point less than 1000° C., or less than 900° C., or less than 800° C., or less than 700° C., or less than 600° C., or less than 500° C., or less than 400° C., or less than 300° C., or less than 250° C., or less than 200° C., or less than 150° C., or less than 100° C., or from 75° C. to 125° C., or from 125° C. to 175° C., or from 175° C. to 225° C., or from 225° C. to 275° C., or from 275° C. to 325° C., or from 325° C. to 375° C., or from 375° C. to 425° C., or from 425° C. to 500° C., or from 500° C. to 600° C., or from 600° C. to 700° C., or from 700° C. to 800° C., or from 800° C. to 900° C.

The crystalline cathodic EC nanostructures described in this disclosure can be deposited onto substrates using many different low temperature deposition methods. For example, crystalline cathodic EC nanostructures can be deposited by wet coating techniques, such as spin, dip, spray, gravure, slot, roll, and ink-jet coating. In some embodiments, these methods can be used to deposit the films onto individual substrates. In some embodiments, these methods can be used to deposit the films in a continuous roll-to-roll process. In some embodiments, the films are deposited in a low-particle clean room environment. In some embodiments, the solvent for the crystalline cathodic EC nanostructures can be evaporated in air at room temperature, or the coating solvent can be removed using applied heat, or vacuum, or both applied heat and vacuum. In some embodiments, a post deposition heat treatment can be used, in an air, or inert, or reactive environment. The temperatures used in the post-deposition processes are generally much lower than the temperatures used during particle synthesis. In some cases, the temperature of the post-deposition processes are less than 600° C., or less than 500° C., or less than 400° C., or less than 300° C., or less than 250° C., or less than 200° C., or less than 150° C., or less than 100° C., or from 75° C. to 125° C., or from 125° C. to 175° C., or from 175° C. to 225° C., or from 225° C. to 275° C., or from 275° C. to 325° C., or from 325° C. to 375° C., or from 375° C. to 425° C., or from 425° C. to 500° C., or from 500° C. to 600° C. In some embodiments, the deposited crystalline cathodic EC nanostructures film is unreactive with oxygen and/or moisture. In some embodiments, the deposited crystalline cathodic EC nanostructures film is maintained in an inert environment (e.g., humidity controlled air or nitrogen) to avoid undesirable reactions with oxygen and/or moisture.

EC Nanostructured Cathode Materials and Crystal Structures

This section describes, in some embodiments, an electrochromic (EC) multi-layer stack is described comprising: an EC cathode layer comprising crystalline cathodic EC nanostructures; an electrically conductive layer; and an outer substrate, wherein the multi-layer stack is incorporated into an EC device, and wherein the EC cathode layer does not comprise a binder.

In some embodiments, the crystalline cathodic EC nanostructures comprise an alkali metal oxide material selected from the group consisting of tungsten trioxide, monoclinic tungsten trioxide, orthorhombic tungsten trioxide, tetragonal tungsten trioxide, cubic tungsten trioxide, pyrochlore-structured tungsten oxide, niobium pentoxide, monoclinic niobium pentoxide, orthorhombic niobium pentoxide, pseudo-hexagonal niobium pentoxide and pyrochlore-structured niobium pentoxide. In some embodiments, mixed metal oxide materials are selected from the group consisting of lithium niobium tungsten oxides, α- and β-LiNbWO$_6$ and LiNb$_3$O$_8$. Additionally, any of the alkali metal oxide materials described herein can include other elements (e.g., dopants). Some non-limiting examples of other elements that can be included in alkali metal oxide materials are V, W, Nb, Ta, Cr, Mo, Ti, Zr, Hf, Sb, Bi, Sn, Li, K, Na, and combinations thereof.

In some embodiments, the cathodic EC nanostructures are crystalline, semi-crystalline or amorphous. As used herein, the term "amorphous" implies a general lack of ordering within the crystal lattice of a powder or plurality of particles such that common laboratory techniques including powder x-ray diffraction (PXRD) do not result in the presence of peaks. Amorphous as used herein does not necessarily imply the complete lack of atomic ordering or even a complete lack of peaks as seen by PXRD. In this regard, the term "partially crystalline" refers to a state of order that is higher than amorphous but lower than crystalline while the term "crystalline" comprises a well-ordered material that is readily measured by PXRD and in such an experiment may be described as showing a series of sharp peaks. In this discussion, the terms amorphous, partially crystalline or crystalline imply nothing about particle size. Crystalline does not necessarily imply that the material is completely crystalline, however, and a crystalline material can contain some fraction of amorphous or partially crystalline materials. Additionally, crystalline materials can contain more than one crystal structure (i.e., there can be some degree of phase separation).

In some embodiments, the crystalline cathodic EC nanostructures comprise a crystal structure selected from the group consisting of monoclinic, tetragonal, monoclinic perovskite, tetragonal perovskite, hexagonal, pyrochlore, orthorhombic, and pseudo-hexagonal.

In some cases, the crystalline cathodic EC nanostructures contain tungsten oxide and tungsten trioxide nanostructures and the substituted versions of each. Tungsten oxide nanostructures in cathodes can also include different dopant materials, as well as different phases of tungsten oxide or trioxide nanostructures including monoclinic, triclinic, orthorhombic, tetragonal, and hexagonal structure types. More specifically, tungsten oxide nanostructure cathodes can be a material with the formula $A_yW_{1-x}M_xO_{3\pm z}\cdot kH_2O$ and have any crystal structure where A is situated within interstitial spaces and where M is substituted within the W—O lattice. As such, A is often a monovalent species such as a proton, an ammonium ion, and/or an alkali metal and may sometimes be an alkaline earth metal. M is a transition metal, other metal, lanthanide, actinide, EC metal or non-EC metal in octahedral coordination. Under these conditions, x is from about 0 to about 1, y is from above 0 to about 0.5, and where z can be from about −0.5 to about 0.5. A and/or M also comprise more than one element and be expressed as $A'_a+A''_b+A'''_c$ and/or $M'_d+M''_e+M'''_f$ where A', A" and A'" and/or M', M" and M'" are different elements, where a+b+c=y and d+e+f=x. In some cases tungsten oxide nanostructure cathodes can contain atoms other than tungsten and oxygen and may display alternative structures, including but not limited to, substituted tungsten oxide, substituted triclinic tungsten oxide, substituted monoclinic tungsten oxide, substituted orthorhombic tungsten oxide, substituted tetragonal tungsten oxide, substituted hexagonal tungsten oxide, or substituted cubic tungsten oxide. Furthermore, "tungsten trioxide" can refer to structures comprising hexagonal tungsten bronze materials, hexagonal tungsten bronze-like materials, tetragonal tungsten bronze materials, tetragonal tungsten bronze-like materials, pyrochlore materials, pyrochlore-like materials, defected pyrochlore materials, defected pyrochlore-like materials, substituted pyrochlore materials or substituted pyrochlore-like materials.

In some cases, the crystalline cathodic EC nanostructures contain niobium oxide and niobium oxide nanostructures and the substituted versions of each. Niobium pentoxide nanostructures in cathodes can also include different dopant materials, as well as different phases of niobium oxide or niobium oxide nanostructures including monoclinic, orthorhombic, pseudo-hexagonal and pyrochlore structure types. More specifically, niobium oxide nanostructure cathodes can be a material with the formula $A_yNb_{2-x}M_xO_{5\pm z}$ and have any crystal structure where A is situated within interstitial spaces and where M is substituted within the Nb—O lattice. As such, A is often a monovalent species such as a proton, an ammonium ion, and/or an alkali metal and may sometimes be an alkaline earth metal. M is a transition metal, other metal, lanthanide, actinide, EC metal or non-EC metal in octahedral coordination. Under these conditions, x is from about 0 to about 1, y is from above 0 to about 0.5, and where z can be from about −0.5 to about 0.5. A and/or M also comprise more than one element and be expressed as $A'_a+A''_b+A'''_c$ and/or $M'_d+M''_e+M'''_f$ where A', A" and A'" and/or M', M" and M'" are different elements, where a+b+c=y and d+e+f=x. In some cases niobium oxide nanostructure cathodes can contain atoms other than niobium and oxygen and may display alternative structures, including but not limited to, substituted niobium oxide, substituted monoclinic niobium oxide, substituted orthorhombic niobium oxide, substituted pseudo-hexagonal niobium oxide, or substituted pyrochlore structured niobium oxide. Furthermore, "niobium pentoxide" can refer to structures comprising niobium bronze materials, niobium pyrochlore materials, niobium pyrochlore-like materials, defected niobium pyrochlore materials, defected niobium pyrochlore-like materials, substituted niobium pyrochlore materials or substituted niobium pyrochlore-like materials.

In some cases, the crystalline cathodic EC nanostructures contain mixed metal oxide materials and substituted versions thereof. Mixed metal oxide materials comprise lithium niobium tungsten oxides, α- and β-LiNbWO$_6$ and substituted versions where Nb and W may be partially or entirely replaced by other metals. Mixed metal oxide materials also comprise LiNb$_3$O$_8$ and substituted versions.

In some embodiments, crystalline, semi-crystalline or crystalline cathodic EC nanostructures may be nano-scale in two dimensions (nanowires) or nano-scale in 3 dimensions (nanoparticles).

In some cases, a nanostructure ink and/or thin film containing crystalline cathodic EC nanostructures do not contain additives, such as dispersants to prevent the nanostructures from agglomerating, or binders to improve the mechanical properties of the films. In some embodiments, the crystalline, semi-crystalline or amorphous cathodic EC particles are produced by heat treatment, then size-reduced by grinding to produce crystalline, semi-crystalline or amorphous cathodic EC nanostructures, then the nanostructures are formulated into an ink, then the ink is coated onto a substrate. In an embodiment, the ink is made without the addition of a binder which simplifies the formulation of the material and improves the manufacturability of EC films deposited using methods described herein.

Electrochromic Devices with EC Nanostructure Cathodes

In some embodiments, the cathode of an EC multi-layer stack comprises crystalline cathodic EC nanostructures and has desirable optical and electrical characteristics.

EC panels with crystalline cathodic EC nanostructures described herein can contain one EC multi-layer stack (or, one device), or more than one EC multi-layer stack (or, more than one device). In some embodiments, EC panels described herein contain more than one EC device arranged such that incident light passes through both devices. An example is a panel with two EC devices laminated together, which has a very low $T_{vis}$ in the dark state because the absorption of both devices is compounded. In some embodiments, the EC devices and panels are formed within an insulated glass unit (IGU). In some embodiments, more than one EC device is integrated into a single EC panel and electrically connected in series or in parallel.

This section describes the incorporation of the thin films and multi-layer stacks described herein into an EC device. In some embodiments, the cathode of an EC device comprises crystalline cathodic EC nanostructures. The crystalline cathodic EC nanostructure cathodes in EC devices can be synthesized with crystal structures containing large channels and/or layered crystal structures. In some embodiments, the cathode of an EC device comprises crystalline cathodic EC nanostructures synthesized by heat treatment that were subsequently size-reduced by grinding, and then coated on a substrate.

In some embodiments, the cathode of an EC multi-layer stack comprises crystalline cathodic EC nanostructures, and the cathode film has a charge capacity (Q) greater than 1 mC/cm$^2$, or greater than 2 mC/cm$^2$, or greater than 5 mC/cm$^2$, or greater than 10 mC/cm$^2$, or greater than 15 mC/cm$^2$, or greater than 20 mC/cm$^2$, or greater than 25 mC/cm$^2$, or greater than 30 mC/cm$^2$, or greater than 35 mC/cm$^2$, or greater than 40 mC/cm$^2$, or greater than 45 mC/cm$^2$, or greater than 50 mC/cm$^2$, or greater than 60 mC/cm$^2$, or greater than 80 mC/cm$^2$, or from 1 to 100 mC/cm$^2$, or from 10 to 100 mC/cm$^2$, or from 20 to 100 mC/cm$^2$, or from 20 to 60 mC/cm$^2$.

In some embodiments, EC devices comprising crystalline cathodic EC nanostructures have fast switching speeds. In some cases the rate, defined as the percent loss of the charge capacity when the constant current is applied for the materials to switch within 2 minutes, is greater than −5%, or greater than −10%, or greater than −15%, or greater than −20%, or greater than −25%, or greater than −30%, or from 0 to −5%, or from 0 to −10%, or from 0 to −15%, or from 0 to −20%, or from 0 to −25%, or from 0 to −30%. Not to be limited by theory, the crystal structure of lithium nickel oxide or alkali transition metal tellurate enables a high ionic mobility for the intercalated ions (e.g. Li+).

In some embodiments, the cathode of an EC multi-layer stack comprises crystalline cathodic EC nanostructures, and the cathode or the multi-layer stack has a transmission at 550 nm in the clear state ($T_{clear}$) or bleached state ($T_{bleached}$) greater than 30%, or greater than 40%, or greater than 50%, or greater than 60%, or greater than 65%, or greater than 70%, or greater than 75%, or greater than 80%, or greater than 85%, or greater than 90%, or greater than 95%, or from 30% to 99%, or from 40% to 99%, or from 50% to 99%, or from 60% to 99%, or from 70% to 99%.

In some embodiments, the cathode of an EC multi-layer stack comprises crystalline cathodic EC nanostructures, and the cathode or the multi-layer stack has a transmission at 550 nm in the dark state ($T_{dark}$) less than 30%, or less than 25%, or less than 20%, or less than 15%, or less than 10%, or less than 5%, or from 30% to 0.01%, or from 25% to 0.01%, or from 20% to 0.01%, or from 15% to 0.01%, or from 10% to 0.01%.

In some embodiments, the cathode of an EC multi-layer stack comprises crystalline cathodic EC nanostructures, and the cathode film has a coloration efficiency at 550 nm greater than 10 cm$^2$/C, or greater than 15 cm$^2$/C, or greater than 20 cm$^2$/C, or greater than 25 cm$^2$/C, or greater than 30 cm$^2$/C, or greater than 35 cm$^2$/C, or greater than 40 cm$^2$/C, or greater than 45 cm$^2$/C, or greater than 50 cm$^2$/C, or from 10 cm$^2$/C to 60 cm$^2$/C, or from 15 cm$^2$/C to 60 cm$^2$/C, or from 20 cm$^2$/C to 60 cm$^2$/C, or from 25 cm$^2$/C to 60 cm$^2$/C, or from 30 cm$^2$/C to 60 cm$^2$/C, or from 20 cm$^2$/C to 50 cm$^2$/C, or from 30 cm$^2$/C to 50 cm$^2$/C.

In some embodiments, the cathode of an EC multi-layer stack comprises crystalline cathodic EC nanostructures, and the cathode or the multi-layer stack has a b* in the clear state ($T_{clear}$) or bleached state ($T_{bleached}$) from −20 to 20, or from −15 to 15, or from −10 to 10, or from −20 to 10, or from 0 to 10, or from 0 to 20, or from −5 to 5, or from −2 to 2, or from −2 to 5, or from −5 to 2, or from −5 to 10, or from −10 to 5, or from −10 to 2, or from −2 to 10.

In some embodiments, the EC panels with crystalline cathodic EC nanostructures described herein have a clear state CIE-Lab b* in transmission from −10 to 10, or from −8 to 8, or from −6 to 6, or from −5 to 5, or from 0 to 10, or from 2 to 8, or from 3 to 6, or from 4 to 5, or approximately 5, or approximately 4.5, or approximately 4, or approximately 2, or approximately −5, or approximately −4, or approximately −2, or approximately 0. In some embodiments, the EC panels described herein have a clear state CIE-Lab a* in transmission from −10 to 10, or from −8 to 8, or from −5 to 5, or from −4 to 4, or from −4 to 2, or from −2 to 4, or from −2 to 2, or from −1 to 1, or approximately −1, or approximately −0.5, or approximately 0, or approximately 0.5, or approximately 1. In some embodiments, the EC panels described herein have a clear state CIE-Lab L* in transmission from 80 to 100, or from 85 to 100, or from 85 to 95, or from 85 to 90, or from 70 to 95, or approximately 90, or approximately 87.5, or approximately 85.

In some embodiments, the EC panels with crystalline cathodic EC nanostructures described herein have a clear state CIE-Lab b* in transmission from −10 to 10, or from −8 to 8, or from −6 to 6, or from −5 to 5, or from 0 to 10, or from 2 to 8, or from 3 to 6, or from 4 to 5, or approximately 5, or approximately 4.5, or approximately 4, or approximately 2, or approximately −5, or approximately −4, or approximately −2, or approximately 0; and CIE-Lab a* in transmission from −10 to 10, or from −8 to 8, or from −5 to 5, or from −4 to 4, or from −4 to 2, or from −2 to 4, or from −2 to 2, or from −1 to 1, or approximately −1, or approximately −0.5, or approximately 0, or approximately 0.5, or approximately 1; and a CIE-Lab L* in transmission from 80 to 100, or from 85 to 100, or from 85 to 95, or from 85 to 90, or from 70 to 95, or approximately 90, or approximately 87.5, or approximately 85.

In some embodiments, the EC panels with crystalline cathodic EC nanostructures described herein have a clear state $T_{vis}$ greater than 50%, or greater than 55%, or greater than 60%, or greater than 65%, or greater than 70%, or greater than 75%, or greater than 80%, or greater than 85%, or greater than 90%, or greater than 95%, or from 60% to 99%, or from 60% to 95%, or from 60% to 90%, or from 70% to 90%, or from 70% to 85%, or from 70% to 80%.

In some embodiments, the EC panels with crystalline cathodic EC nanostructures described herein have a clear state color uniformity (deltaE) in transmission less than 15, or less than 10, or less than 8, or less than 5, or from 0 to 15, or from 0 to 10, or from 0 to 5.

In some embodiments, the EC panels with crystalline cathodic EC nanostructures described herein have a dark state CIE-Lab b* in transmission from −10 to 10, or from −8 to 8, or from −6 to 6, or from −5 to 5, or from 0 to 10, or from 2 to 8, or from 3 to 6, or from 4 to 5, or from −10 to 0, or from −8 to 0, or from −6 to −1, or from −5 to −2, or approximately −4, or approximately −3.5, or approximately −3, or approximately 5, or approximately 4.5, or approximately 4, or approximately 2, or approximately −5, or approximately −2, or approximately 0. In some embodiments, the EC panels described herein have a dark state CIE-Lab a* in transmission from −10 to 0, or from −8 to 2, or from −8 to 4, or from −8 to 8, or from −7 to −5, or from −6.5 to −5.5, or approximately −6.5, or approximately −6, or approximately −5.5. In some embodiments, the EC panels described herein have a dark state CIE-Lab L* in transmission from 0 to 40, or from 0 to 30, or from 0 to 20, or from 10 to 30, or from 15 to 25, or approximately 10, or approximately 15, or approximately 20.

In some embodiments, the EC panels with crystalline cathodic EC nanostructures described herein have a dark state CIE-Lab b* in transmission from −10 to 10, or from −8 to 8, or from −6 to 6, or from −5 to 5, or from 0 to 10, or from 2 to 8, or from 3 to 6, or from 4 to 5, or from −10 to 0, or from −8 to 0, or from −6 to −1, or from −5 to −2, or approximately −4, or approximately −3.5, or approximately −3, or approximately 5, or approximately 4.5, or approximately 4, or approximately 2, or approximately −5, or approximately −2, or approximately 0; and a CIE-Lab a* in transmission from −10 to 0, or from −8 to 2, or from −8 to 4, or from −8 to 8, or from −7 to −5, or from −6.5 to −5.5, or approximately −6.5, or approximately −6, or approximately −5.5; and a CIE-Lab L* in transmission from 0 to 40, or from 0 to 30, or from 0 to 20, or from 10 to 30, or from 15 to 25, or approximately 10, or approximately 15, or approximately 20.

In some embodiments, the EC panels with crystalline cathodic EC nanostructures described herein have a dark state $T_{vis}$ less than 35%, or less than 30%, or less that 25%, or less than 20%, or less than 15%, or less than 10%, or less than 5%, or less than 4%, or less than 3%, or less than 2%, or less than 1%, or less than 0.1%, or less than 0.01%, or less than 0.001%, or from 0.001% to 20%, or from 0.001% to 15%, or from 0.001% to 10%, or from 0.001% to 5%, or from 0.01% to 5%, or from 0.1% to 5%.

In some embodiments, the EC panels with crystalline cathodic EC nanostructures described herein have a dark state color uniformity (delta E) in transmission less than 15, or less than 10, or less than 8, or less than 5, or from 0 to 15, or from 0 to 10, or from 0 to 5.

In some embodiments, the EC panels with crystalline cathodic EC nanostructures described herein have a tinted state CIE-Lab b* in transmission from 0 to 10, or from 2 to 8, or from 3 to 6, or from 4 to 5, or from −10 to 0, or from −8 to 0, or from −6 to −1, or from −5 to −2, or from −10 to 10, or from −8 to 8, or from −6 to 6, or from −4 to 4, or from −2 to 2, or approximately 5, or approximately 4.5, or approximately 4, or approximately 2, or approximately 0, or approximately −2, or approximately −4, or approximately −3.5, or approximately −3. In some embodiments, the EC panels described herein have a tinted state CIE-Lab a* in transmission from −10 to 10, or from −8 to 8, or from −5 to 5, or from −4 to 4, or from −4 to 2, or from −2 to 4, or from −2 to 2, or from −1 to 1, or from −10 to 0, or from −8 to 2, or from −8 to 4, or from −7 to −5, or from −6.5 to −5.5, or approximately −6.5, or approximately −6, or approximately −5.5, or approximately −4, or approximately −2, or approximately 2, or approximately 4, or approximately −1, or approximately −0.5, or approximately 0, or approximately 0.5, or approximately 1. In some embodiments, the EC panels described herein have a tinted state CIE-Lab L* in transmission from 0 to 90, or from 20 to 90, or from 40 to 90, or from 60 to 90, or approximately 90, or approximately 87.5, or approximately 85, or from 80 to 100, or from 85 to 100, or from 85 to 95, or from 85 to 90, or approximately 90, or approximately 87.5, or approximately 85, or from 0 to 40, or from 0 to 30, or from 0 to 20, or from 10 to 30, or from 15 to 25, or approximately 90, or approximately 87.5, or approximately 85, or approximately 70, or approximately 60, or approximately 50, or approximately 40, or approximately 30, or approximately 20, or approximately 10, or approximately 15.

In some embodiments, the EC panels with crystalline cathodic EC nanostructures described herein have a tinted state CIE-Lab b* in transmission from 0 to 10, or from 2 to 8, or from 3 to 6, or from 4 to 5, or from −10 to 0, or from −8 to 0, or from −6 to −1, or from −5 to −2, or from −10 to 10, or from −8 to 8, or from −6 to 6, or from −4 to 4, or from −2 to 2, or approximately 5, or approximately 4.5, or approximately 4, or approximately 2, or approximately 0, or approximately −2, or approximately −4, or approximately −3.5, or approximately −3; and -Lab a* in transmission from −10 to 10, or from −8 to 8, or from −5 to 5, or from −4 to 4, or from −4 to 2, or from −2 to 4, or from −2 to 2, or from −1 to 1, or from −10 to 0, or from −8 to 2, or from −8 to 4, or from −7 to −5, or from −6.5 to −5.5, or approximately −6.5, or approximately −6, or approximately −5.5, or approximately −4, or approximately −2, or approximately 2, or approximately 4, or approximately −1, or approximately −0.5, or approximately 0, or approximately 0.5, or approximately 1; and a CIE-Lab L* in transmission from 0 to 90, or from 20 to 90, or from 40 to 90, or from 60 to 90, or approximately 90, or approximately 87.5, or approximately 85, or from 80 to 100, or from 85 to 100, or from 85 to 95, or from 85 to 90, or approximately 90, or approximately 87.5, or approximately 85, or from 0 to 40, or from 0 to 30, or from 0 to 20, or from 10 to 30, or from 15 to 25, or approximately 90, or approximately 87.5, or approximately 85, or approximately 70, or approximately 60, or approximately 50, or approximately 40, or approximately 30, or approximately 20, or approximately 10, or approximately 15.

In some embodiments, the EC panels with crystalline cathodic EC nanostructures described herein have a tinted state $T_{vis}$ greater than 50%, or greater than 55%, or greater than 60%, or greater than 65%, or greater than 70%, or greater than 75%, or greater than 80%, or greater than 85%, or greater than 90%, or greater than 95%%, or less than 20%, or less than 15%, or less than 10%, or less than 5%, or less than 4%, or less than 3%, or less than 2%, or less than 1%, or less than 0.1%, or less than 0.01%, or less than 0.001%, or from 0.001% to 99%, or from 0.01% to 99%, or from 0.1% to 99%, or from 10% to 90%, or from 10% to 80%, or from 10% to 70%, or from 20% to 70%, or from 50% to 70%, or from 20% to 50%, or from 40% to 60%, or from 20% to 40%, or from 60% to 70%.

In some embodiments, the EC panels with crystalline cathodic EC nanostructures described herein have a tinted state color uniformity (delta E) in transmission less than 15, or less than 10, or less than 8, or less than 5, or from 0 to 15, or from 0 to 10, or from 0 to 5.

In some embodiments, the cathode of an EC multi-layer stack comprises crystalline cathodic EC nanostructures, and the cathode or the multi-layer stack has a % fade (percent change in capacity between cycle 2 and cycle 23) less than 20%, or less than 15%, or less than 10%, or less than 5%, or less than 1%, or from 0.01% to 20%, or from 0.01% to 15%, or from 0.01% to 10%, or from 0.01% to 5%, or from 0.01% to 1%.

EXAMPLES

The following non-limiting examples are provided to further illustrate the present disclosure. It should be appreciated by those of skill in the art that the techniques disclosed in the examples that follow represent approaches the inventors have found function well in the practice of the disclosure, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the disclosure.

Example 1

Electrochromic Cathodic Tungsten Oxide Nanostructures

This Example describes tungsten oxide cathodic electrochromic (EC) nanostructures that were synthesized, size-reduced, and coated onto substrates. The materials were characterized for crystal structure using x-ray diffraction (XRD), particle size distribution, and electrochromic properties such as transmission in the bleached and dark states. Three different tungsten oxide materials are described in this example: hexagonal tungsten trioxide with Na, hexagonal tungsten trioxide with K, and pyrochlore tungsten trioxide. More details on the tungsten oxide EC nanostructures embodiments applicable to the EC multi-layer stacks and devices described in this specification can be found in U.S. patent application Ser. No. 15/009,465 (incorporated herein by reference).

Hexagonal Tungsten Trioxide with Na

Figure 3:
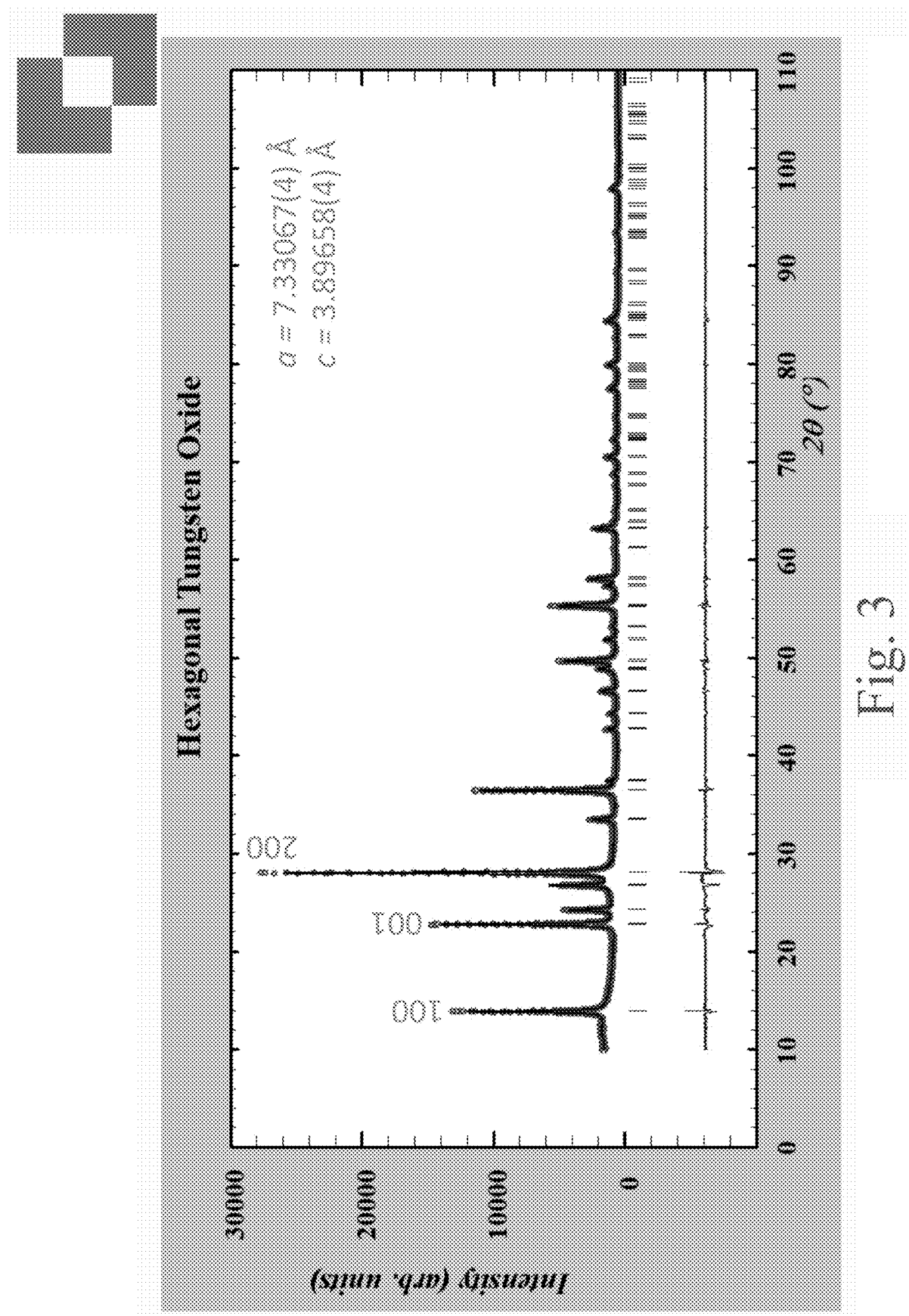
FIG. 3 is an x-ray diffraction (XRD) pattern of hexagonal tungsten trioxide particles.

FIG. 3 shows an example XRD pattern of hexagonal tungsten trioxide with Na particles prepared using hydrothermal synthesis. This XRD pattern of the as-synthesized product may be fit to a crystal structure of the space group P6/mmm (#191), where the lattice parameters are a=b=approximately 7.3 (Angstroms), and c=approximately 3.9 (Angstroms). The hexagonal tungsten trioxide particles were prepared according to the following procedure.

A 125 mL steel autoclave vessel with a Teflon insert is used. 5.0 g of $Na_2WO_4*2H_2O$ and 1 g of NaCl is added to 45 ml of DI $H_2O$. The pH is monitored, and the starting pH is typically 9.1 to 9.3. 3M HCl is rapidly added, until the pH is equal to 1.5, and the solution turns a light green color. The reaction mixture is then loaded into the autoclave vessel, and heated to 180° C. for 6 hours.

After the reaction products cool to room temperature, the supernatant liquid is discarded, and the precipitate product is collected into a centrifuge tube using DI water. DI water is used to dilute the product to a total of about 45 mL, and then centrifuged at 4500 RPM for 4 min. The supernatant is again discarded, and DI $H_2O$ is added to the precipitate to get 25 mL total volume. A second centrifuge procedure is performed at 4500 RPM for 4 min. The supernatant is again discarded, and the centrifuge procedure is repeated two more times, diluting each time with isopropanol. After decanting the isopropanol, the centrifuge tubes are dried in a vacuum environment. After drying, the powder is ground with a mortar and pestle and is further dried before the XRD pattern in FIG. 3 was taken. The yield of the hexagonal tungsten trioxide from this process is typically 3.2 (+/−0.1) g.

The x-ray diffraction (XRD) pattern in FIG. 3 shows narrow peaks, indicating a high degree of crystallinity. Samples were analyzed using a Bruker D8 Advance diffractometer employing CuKα radiation. Scans were made in Bragg-Brentano geometry using a Ni filter between 5-110° 2Θ with a step size of 0.01°. Intensities of the (100), (001) and (200) peaks indicate that the crystallinity does not have a preferred orientation. In contrast, nanowires would typically show a preferred orientation, indicating that the material formed does not have the crystalline structure of nanowires.

Figure 4:
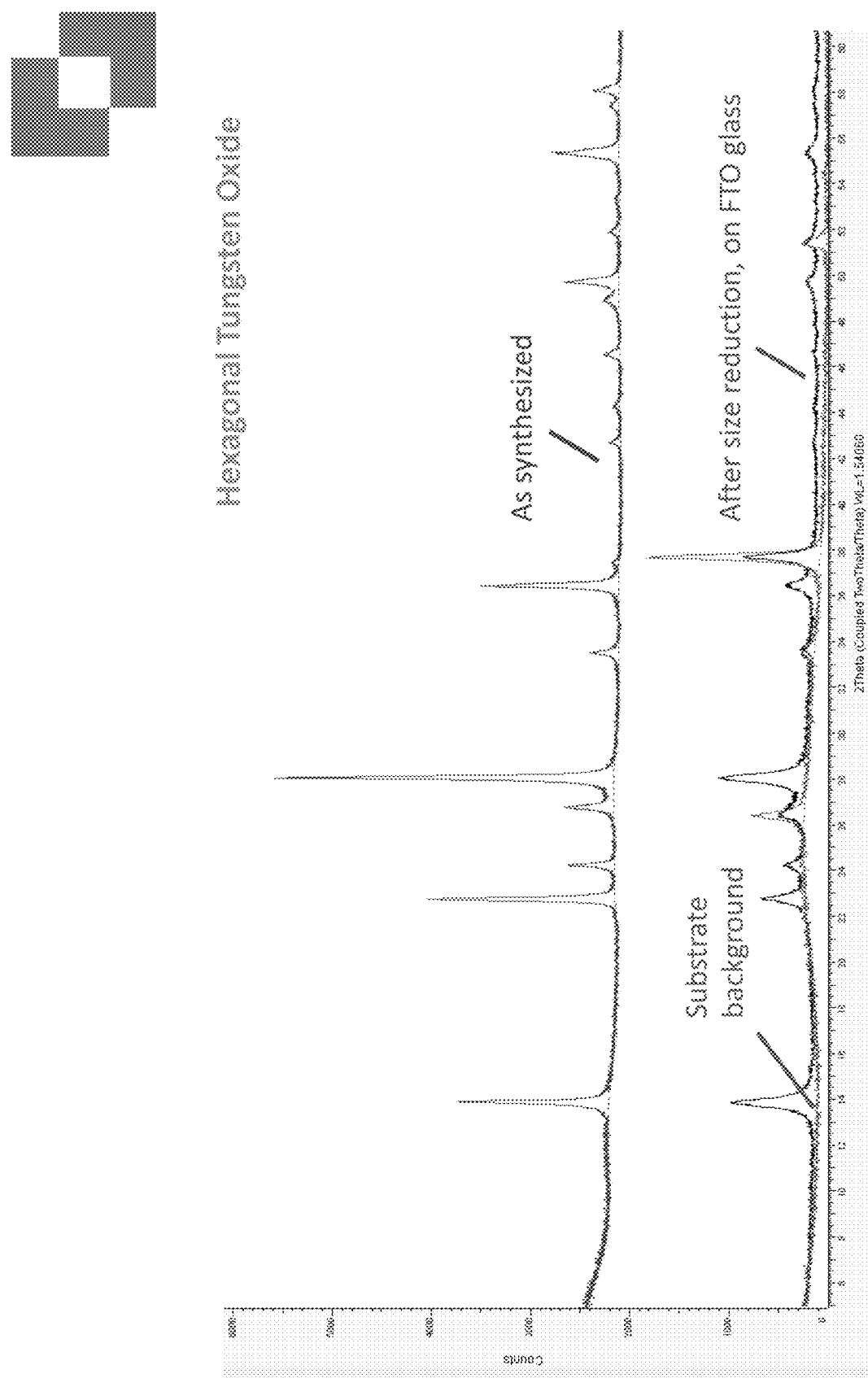
FIG. 4 is an XRD pattern of hexagonal tungsten trioxide as-synthesized material, and after size-reduction and coating on a substrate.

FIG. 4 shows an XRD pattern of the hexagonal tungsten trioxide with Na "starting material" (i.e. the as-synthesized material as described in Example 1), and the materials after size reducing and coating on a substrate. Samples were analyzed using a Bruker D8 Advance diffractometer employing CuKα radiation. Scans were made in Bragg-Brentano geometry using a Ni filter between 5-110° 2Θ with a step size of 0.01°. In this example, the dried powder (as described in Example 1) is size-reduced by grinding using an agitator bead mill. The mill has 80 mL bowls with $ZrO_2$ liners. The milling media are 0.1 mm diameter $ZrO_2$ balls. The primary particle size of the starting material is approximately between 5 and 500 nm, however, agglomerates from 1 to 20 microns are also observed.

6.4 (+/−0.1) g of hexagonal tungsten trioxide material to be size-reduced by milling (e.g., product from 2 reaction batches using the synthetic procedure described in Example 1) is added to 30 mL of IPA (isopropanol) and 100 (+/−1) g of 0.1 mm $ZrO_2$ balls, in the bowl of the mill. The milling cycle parameters are 500 RPM for 3 min, followed by 5-9 min of rest time (to allow the mill bowls to cool). The cycle is repeated 20 times, for a total of 1 hour active milling time. The formulation is then extracted from milling bowls and filtered to separate the milling media from the formulation.

Additional IPA is then added to the milling bowls and the mixture is shaken and sonicated to remove any remaining hexagonal tungsten trioxide particles from the milling balls and bowl. This process is continued until a total formulation volume of 30-40 mL is achieved. After the final formulation volume is achieved, the slurry is characterized by TGA to determine weight %. An aliquot of the formulation is diluted and characterized by dynamic light scattering (DLS) for particle size analysis.

In this example, after milling, the hexagonal tungsten trioxide nanostructures are coated onto a substrate using slot die coating. The die lip to substrate gap is from 80 microns, and the gap between the die halves is approximately 100 microns. The wet coating thickness is 37 microns. The concentration by mass of the solid nanostructures is approximately 10%, and the dry film thickness is approximately 600 nm to 1 micron. The coating speed is approximately 300 cm/min. The film was coated and dried at room temperature and 15% relative humidity.

The XRD pattern in FIG. 4 shows the size-reduced nanoparticles coated on an FTO coated glass substrate. The background XRD pattern from the FTO coated glass substrate shows a broad background signal at low angles, and at 2Θ of around 25° from the amorphous glass substrate, and a set of sharp peaks associated with the FTO (e.g., at 2θ approximately 26.5°, 38°, 51.5°, 61.5° and 65.5°). The scan taken from the nanoparticle coated substrate shows the same broad peaks and FTO peaks from the substrate superimposed with the peaks from the hexagonal tungsten trioxide with Na. The hexagonal tungsten trioxide peak positions in the coated sample are very similar to the peak positions taken from the sample directly after hydrothermal synthesis and washing; no additional peaks are seen indicating that the crystal structure was not altered during the milling process. Peak widths however have clearly broadened indicating that the particle size has been altered in comparison to the as-synthesized particle size. Analysis of the XRD pattern after size reduction indicates that the average crystallite size is approximately 150 nm.

Figure 5:
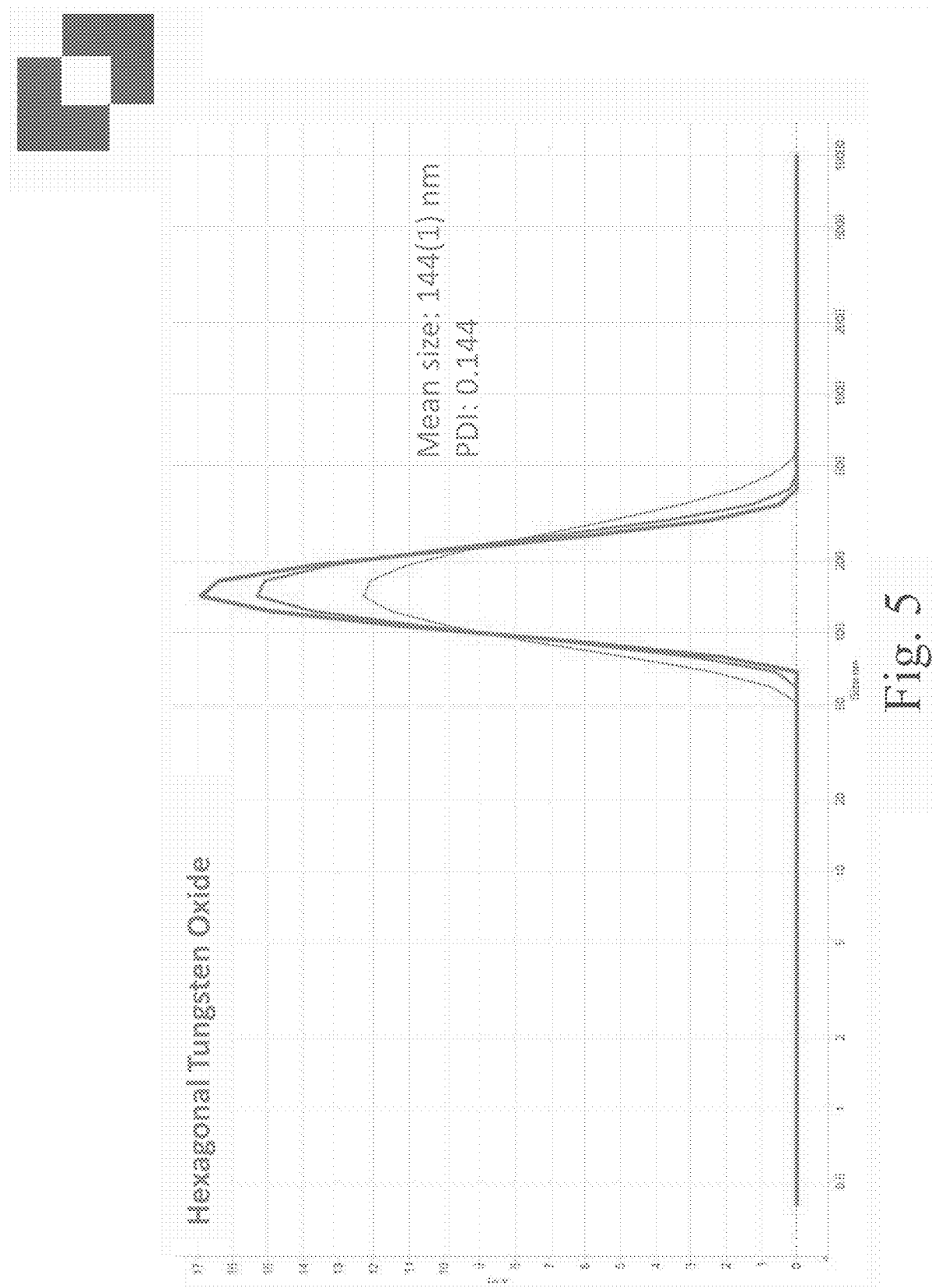
FIG. 5 is a particle size distribution of hexagonal tungsten trioxide after size-reduction.

An example of a hexagonal tungsten trioxide with Na particle size distribution after milling, washing, and separating from the washing contaminants is shown in FIG. 5. The mean particle size in this distribution is 144 nm, and the PDI is 0.144, as measured by DLS.

Figure 6:
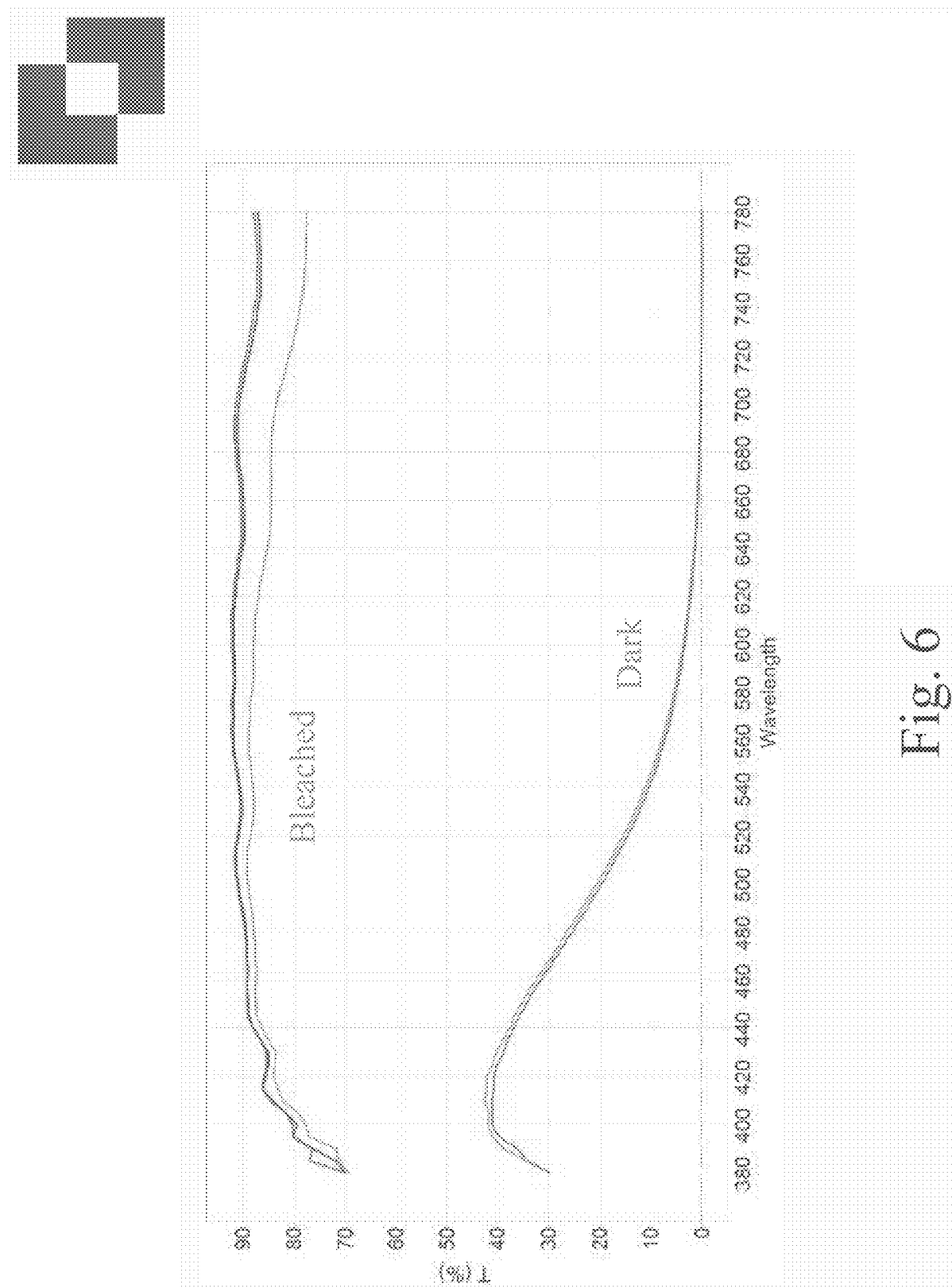
FIG. 6 shows transmission spectra of a hexagonal tungsten trioxide with Na electrochromic half-cell (or substrate) in the bleached and dark states.

Devices requiring optical characterization (i.e., devices producing the data shown in FIG. 6 were prepared by coating the tungsten trioxide particles (without carbon black or PVDF) on 20×20 mm² FTO coated glass substrates. The electrochromic testing was performed in a propylene carbonate+1 M LiTFSi (Bis(trifluoromethane)sulfonimide lithium) solution with a Li counter electrode.

FIG. 6 shows transmission spectra of a hexagonal tungsten trioxide with Na electrochromic half-cell (or substrate) in the bleached and dark states. The transmission in the bleached state at a wavelength of 633 nm is 90.5% compared to 1.85% in the dark state. The transmission at 550 nm is 91.25% in the bleached state and 8.83% in the dark state.

Hexagonal Tungsten Trioxide with K

Figure 7:
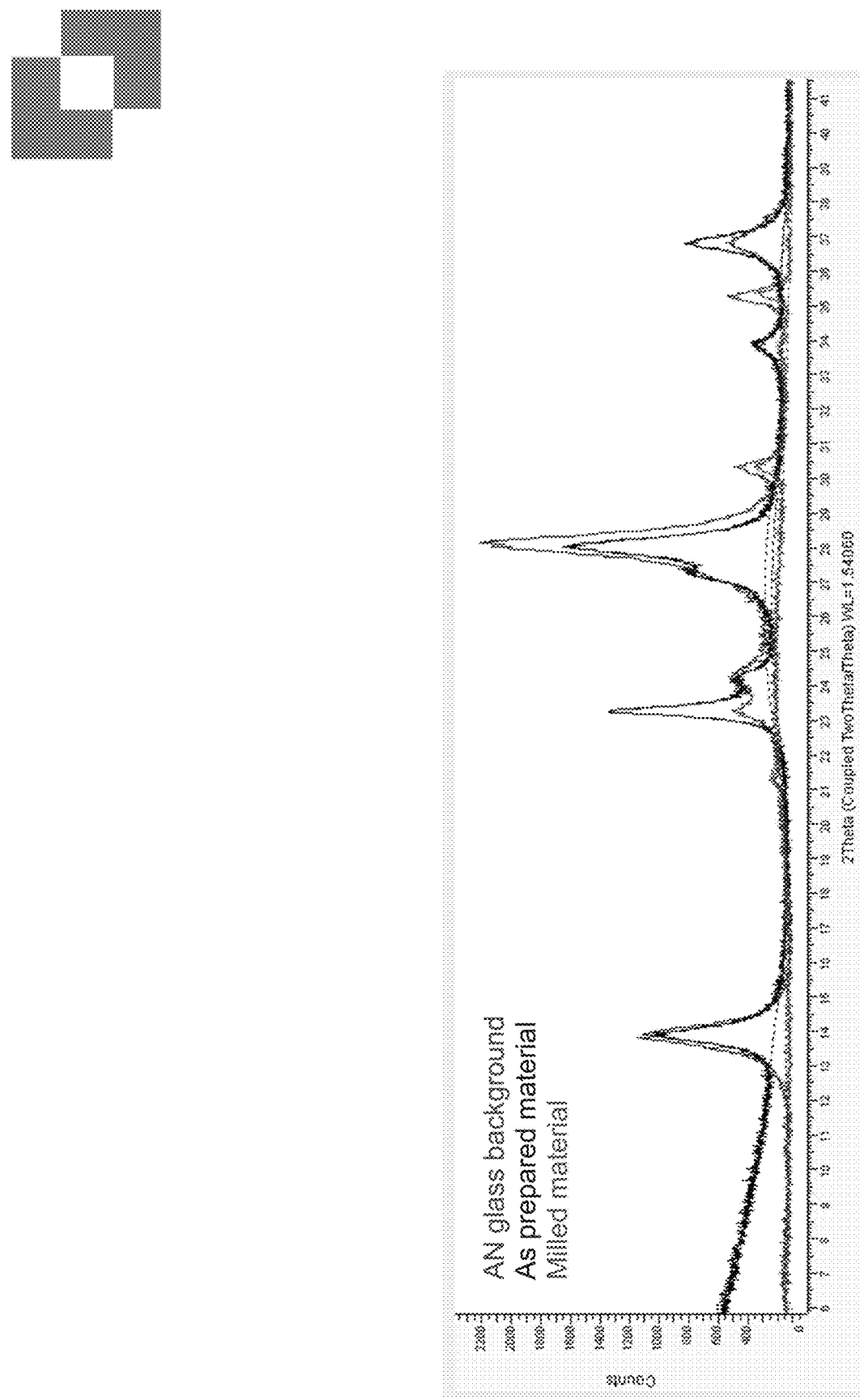
FIG. 7 shows an example x-ray diffraction (XRD) pattern of hexagonal tungsten trioxide particles with K prepared using hydrothermal synthesis.

FIG. 7 shows an example x-ray diffraction (XRD) pattern of hexagonal tungsten trioxide particles with K prepared using hydrothermal synthesis. This XRD pattern of the as-synthesized product may be fit to a crystal structure of the space group P6/mmm (#191), where the lattice parameters are a=b=approximately 7.3 (Angstroms), and c=approximately 3.8 (Angstroms). Samples were analyzed using a Bruker D8 Advance diffractometer employing CuKα radiation. Scans were made in Bragg-Brentano geometry using a Ni filter between 5-110° 2θ with a step size of 0.01°. In this example, the dried powder (as described in Example 1) is size-reduced by grinding using an agitator bead mill. The mill has 80 mL bowls with ZrO₂ liners. The milling media are 0.1 mm diameter ZrO₂ balls. The primary particle size of the starting material is approximately between 5 and 500 nm, however, agglomerates from 1 to 20 microns are also observed. The hexagonal tungsten trioxide particles were prepared according to the following procedure.

A 125 mL steel autoclave vessel with a Teflon insert is used. K₂WO₄ and K₂SO₄ is added to DI H₂O. The pH is monitored, and the starting pH is typically 9.1 to 9.3. 3M HCl is rapidly added, until the pH is equal to approximately 1. The reaction mixture is then loaded into the autoclave vessel, and heated to 200° C. for 6 hours.

After the reaction products cool to room temperature, the supernatant liquid is discarded, and the precipitate product is collected into a centrifuge tube using DI water. DI water is used to dilute the product to a total of about 45 mL, and then centrifuged at 4500 RPM for 4 min. The supernatant is again discarded, and DI H₂O is added to the precipitate to get 25 mL total volume. A second centrifuge procedure is performed at 4500 RPM for 4 min. The supernatant is again discarded, and the centrifuge procedure is repeated two more times, diluting each time with isopropanol. After decanting the isopropanol, the centrifuge tubes are dried in a vacuum environment. After drying, the powder is ground with a mortar and pestle and is further dried before the XRD pattern in FIG. 7 ("As prepared material") was taken.

The x-ray diffraction (XRD) pattern in FIG. 7 shows narrow peaks, indicating a high degree of crystallinity. Samples were analyzed using a Bruker D8 Advance diffractometer employing CuKα radiation. Scans were made in Bragg-Brentano geometry using a Ni filter between 5-110° 2θ with a step size of 0.01°. Intensities of the (100), (001) and (200) peaks indicate that the crystallinity does not have a preferred orientation. In contrast, nanowires would typically show a preferred orientation, indicating that the material formed does not have the crystalline structure of nanowires.

Figure 8:
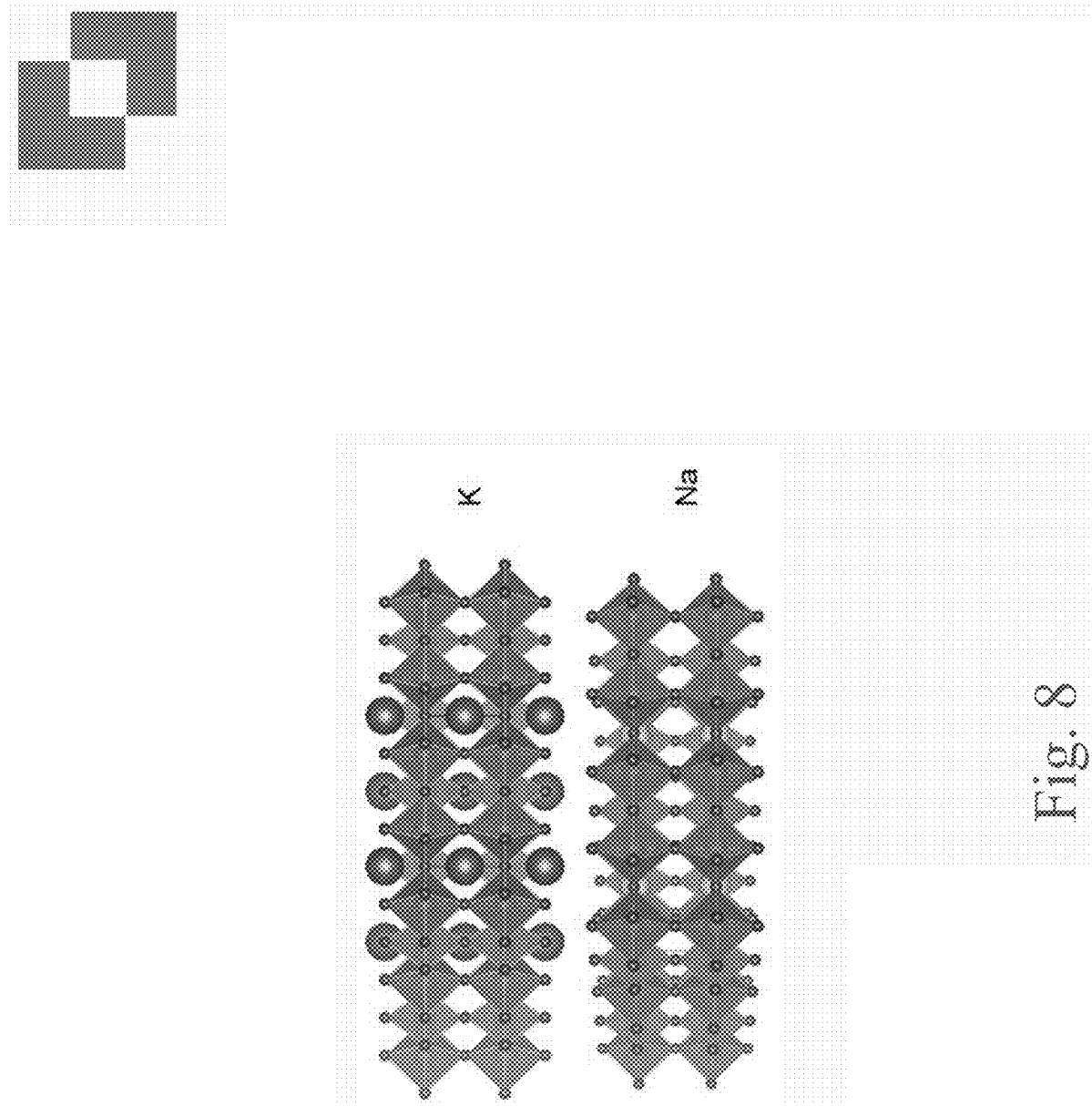
FIG. 8 shows the difference between the hexagonal tungsten trioxide with Na and with K. The Na and K atoms sit on different positions in the hexagonal tungsten trioxide lattice, which explains the slightly different lattice parameters. In contrast to the Na atoms, the K atoms sit above and below the plane of the hexagonal rings of $WO_6$.

FIG. 8 shows the difference between the hexagonal tungsten trioxide with Na and with K. The Na and K atoms sit on different positions in the hexagonal tungsten trioxide lattice, which explains the slightly different lattice parameters. In contrast to the Na atoms, the K atoms sit above and below the plane of the hexagonal rings of WO₆.

FIG. 7 also shows an XRD pattern of the hexagonal tungsten trioxide with K nanostructures after size reducing and coating on a substrate.

Hexagonal tungsten trioxide with K material to be size-reduced by milling (e.g., material produced using the synthetic procedure described above) is added to IPA (isopropanol) and 0.1 mm ZrO₂ balls, in the bowl of the mill. The milling cycle parameters are 500 RPM for 3 min, followed by 5-9 min of rest time (to allow the mill bowls to cool). The cycle is repeated 20 times, for a total of 1 hour active milling time. The formulation is then extracted from milling bowls and filtered to separate the milling media from the formulation.

Additional IPA is then added to the milling bowls and the mixture is shaken and sonicated to remove any remaining hexagonal tungsten trioxide particles from the milling balls and bowl. After the final formulation volume is achieved, the slurry is characterized by TGA to determine weight %. An aliquot of the formulation is diluted and characterized by dynamic light scattering (DLS) for particle size analysis.

In this example, after milling, the hexagonal tungsten trioxide with K nanostructures are coated onto a substrate using slot die coating. The die lip to substrate gap is approximately 80 microns, and the gap between the die halves is approximately 100 microns. The wet coating thickness is approximately 30 to 40 microns. The concentration by mass of the solid nanostructures is approximately 10%, and the dry film thickness is approximately 1 micron. The coating speed is approximately 300 cm/min. The film was coated and dried at room temperature and 15% relative humidity.

The XRD pattern in FIG. 7 shows the size-reduced nanoparticles coated on an FTO coated glass substrate (i.e., "Milled material"). The background XRD pattern from the FTO coated glass substrate shows a broad background signal at low angles, and at 2θ of around 25° from the amorphous glass substrate, and a set of sharp peaks associated with the FTO (e.g., at 2θ approximately 26.5°, 38°, 51.5°, 61.5° and 65.5°). The scan taken from the nanoparticle coated substrate shows the same broad peaks and FTO peaks from the substrate superimposed with the peaks from the hexagonal tungsten trioxide. The hexagonal tungsten trioxide with K peak positions in the coated sample are very similar to the peak positions taken from the sample directly after hydrothermal synthesis and washing; no additional peaks are seen indicating that the crystal structure was not altered during the milling process. Peak widths however have clearly broadened indicating that the particle size has been altered in comparison to the as-synthesized particle size.

Figure 9:
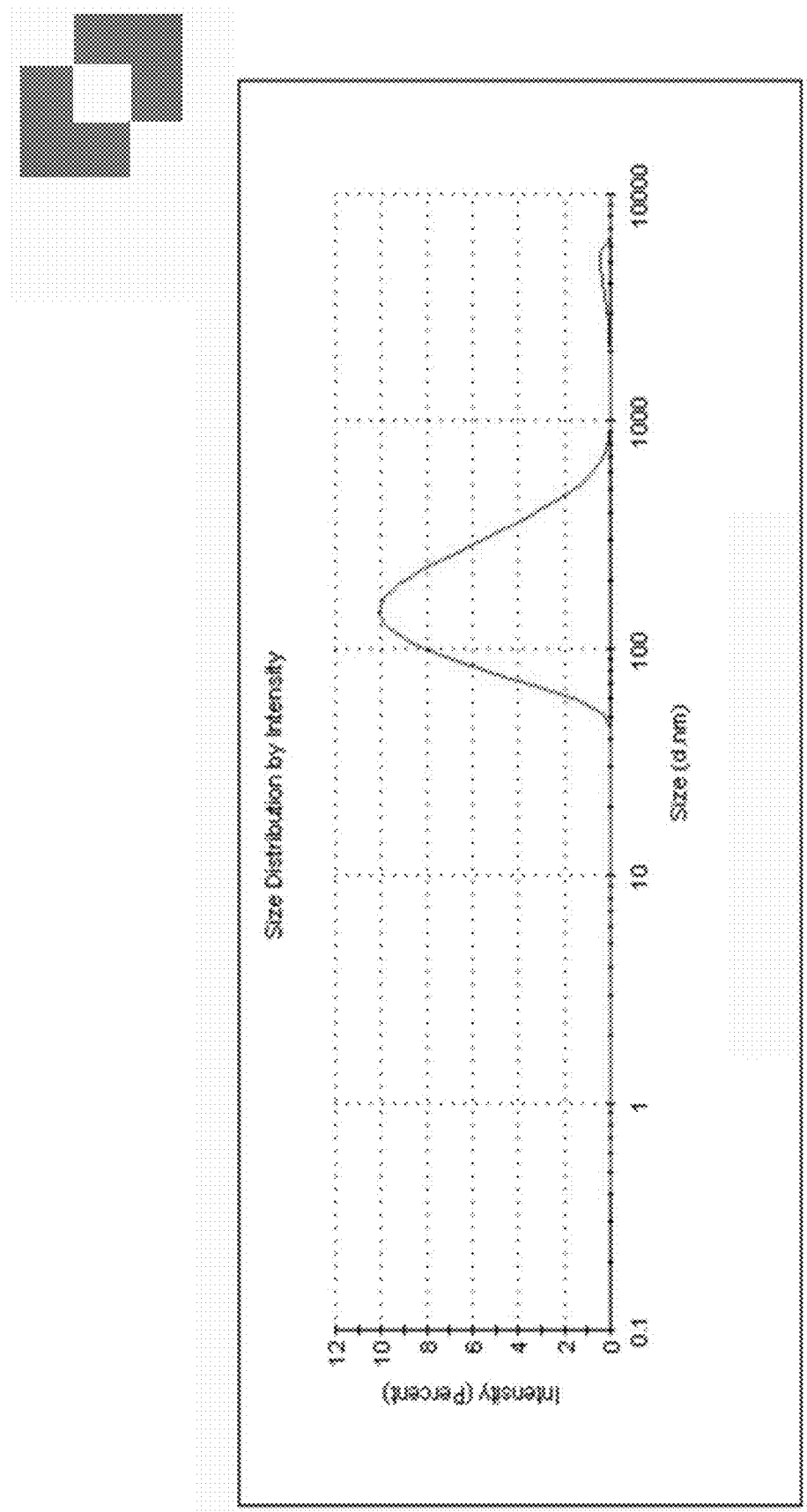
FIG. 9 is a particle size distribution of hexagonal tungsten trioxide with potassium after size-reduction.

An example of a hexagonal tungsten trioxide particle size distribution after milling, washing, and separating from the washing contaminants is shown in FIG. 9. The mean particle size in this distribution is 151 nm, and the PDI is 0.235, as measured by DLS.

Figure 10:
FIG. 10 shows transmission spectra of a hexagonal tungsten trioxide with K electrochromic half-cell (or substrate) in the bleached and dark states.

FIG. 10 shows transmission spectra of a hexagonal tungsten trioxide with K electrochromic half-cell (or substrate) in the bleached and dark states. Devices requiring optical characterization (i.e., devices producing the data shown in FIG. 10) were prepared by coating the tungsten trioxide particles (without carbon black or PVDF) on 20×20 mm2 FTO coated glass substrates. The electrochromic testing was performed in a propylene carbonate+1 M LiTFSi (Bis(trifluoromethane)sulfonimide lithium) solution with a Li counter electrode. The transmission in the bleached state at a wavelength of 633 nm is 95% compared to 3% in the dark state. The transmission at 550 nm is approximately 90% in the bleached state and approximately 10% in the dark state.

Pyrochlore Tungsten Trioxide with Na

Figure 11:
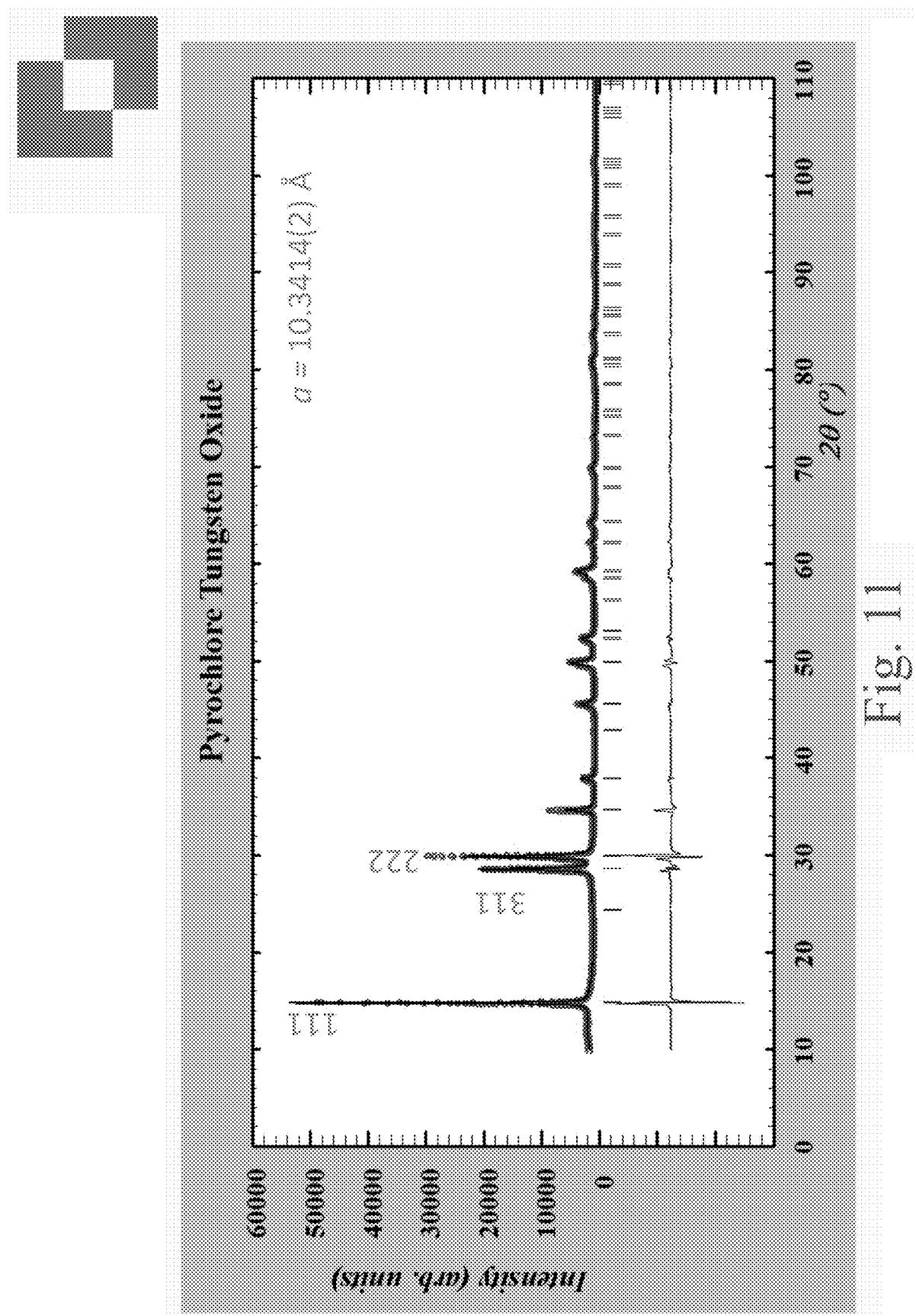
FIG. 11 shows an XRD pattern of pyrochlore tungsten trioxide particles prepared using hydrothermal synthesis.

FIG. 11 shows an example x-ray diffraction (XRD) pattern of pyrochlore particles prepared using hydrothermal synthesis. This XRD pattern of the as-synthesized product may be fit to a crystal structure of the space group Fd-3m, (#227) where the lattice parameters are a=b=c approximately 10.3 (Angstroms). The pyrochlore particles were prepared according to the following procedure.

A 2 L autoclave vessel with a Glass insert is used. 80.0 g of $Na_2WO_4 \cdot 2H_2O$ and 16 g of NaCl is added to 720 ml of DI H2O. The pH is monitored, and the starting pH is typically 10.1 to 10.3. 3M HCl is rapidly added, until the pH is equal to 3.5. The reaction mixture is then loaded into the autoclave vessel, and heated to 200° C. for 12 hours.

After the reaction products cool to room temperature, the supernatant liquid is discarded, and the precipitate product is collected into a centrifuge tube using DI water. DI water is used to dilute the product to a total of about 500 mL, and then centrifuged at 4500 RPM for 4 min. The supernatant is again discarded, and DI $H_2O$ is added to the precipitate to get about 500 mL total volume. A second centrifuge procedure is performed at 4500 RPM for 4 min. The supernatant is again discarded, and the centrifuge procedure is repeated again with isopropanol to a similar volume. After decanting the isopropanol, the centrifuge tubes are dried in a vacuum environment. After drying, the powder is ground with a mortar and pestle and is further dried before the XRD pattern in FIG. 11 was taken. The yield of the pyrochlore from this process is typically 20 (+/−0.1) g.

The x-ray diffraction (XRD) pattern in FIG. 11 shows narrow peaks, indicating a high degree of crystallinity. Samples were analyzed using a Bruker D8 Advance diffractometer employing CuKα radiation. Scans were made in Bragg-Brentano geometry using a Ni filter between 5-110° 2θ with a step size of 0.01°.

Figure 12:
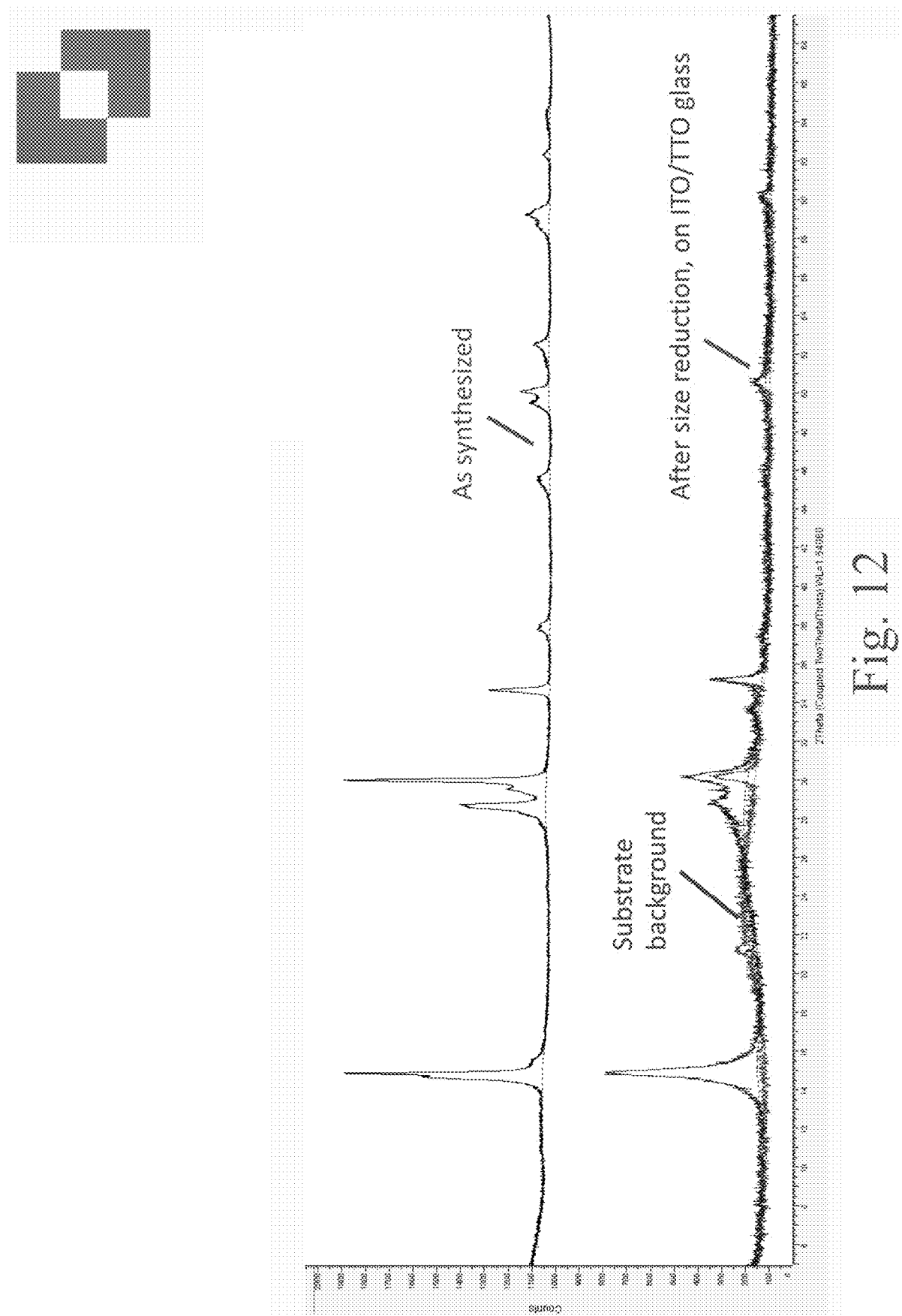
FIG. 12 shows an XRD pattern of the pyrochlore tungsten trioxide as-synthesized material, and the materials after size reducing and coating on a substrate.

FIG. 12 shows an XRD pattern of the pyrochlore "starting material" (i.e. the as-synthesized material as described in Example 2), and the materials after size reducing and coating on a substrate. Samples were analyzed using a Bruker D8 Advance diffractometer employing CuKα radiation. Scans were made in Bragg-Brentano geometry using a Ni filter between 5-110° 2θ with a step size of 0.01°. In this example, the dried powder (as described in Example 2) is size-reduced by grinding using an agitator bead mill. The mill has 80 mL bowls with $ZrO_2$ liners. The milling media are 0.1 mm diameter $ZrO_2$ balls. The primary particle size of the starting material is approximately between 5 and 500 nm, however, agglomerates from 1 to 20 microns are also observed.

6.4 (+/−0.1) g of pyrochlore material to be size-reduced by milling (e.g., product from 2 reaction batches using the synthetic procedure described in Example 2) is added to 30 mL of DI water and 100 (+/−1) g of 0.1 mm ZrO2 balls, in the bowl of the mill. The milling cycle parameters are 500 RPM for 3 min, followed by 5-9 min of rest time (to allow the mill bowls to cool). The cycle is repeated 20 times, for a total of 1 hour active milling time. The formulation is then extracted from milling bowls and filtered to separate the milling media from the formulation.

Additional DI water is then added to the milling bowls and the mixture is shaken and sonicated to remove any remaining pyrochlore particles from the milling balls and bowl. This process is continued until a total formulation volume of 30-40 mL is achieved. After the final formulation volume is achieved, the slurry is characterized by TGA to determine weight %. An aliquot of the formulation is diluted and characterized by dynamic light scattering DLS for particle size analysis.

In this example, after milling, the pyrochlore nanostructures are coated onto a substrate using slot die coating. The die lip to substrate gap is from 80 microns, and the gap between the die halves is approximately 100 microns. The wet coating thickness is 37 microns. The concentration by mass of the solid nanostructures is approximately 10%, and the dry film thickness is approximately 600 nm to 1 micron. The coating speed is approximately 300 cm/min. The film was coated and dried at room temperature and 15% relative humidity.

The XRD pattern in FIG. 12 shows the size-reduced nanoparticles coated on an ITO/TTO coated glass substrate. The background XRD pattern from the ITO/TTO coated glass substrate shows a broad background signal at low angles, and at 2θ of around 25° from the amorphous glass substrate, and a set of sharp peaks associated with the ITO/TTO (e.g., at 2θ approximately 30.2°, 35.1°, 50.5°, and 60°). The scan taken from the nanoparticle coated substrate shows the same broad peaks and ITO/TTO peaks from the substrate superimposed with the peaks from the pyrochlore. The pyrochlore peak positions in the coated sample are very similar to the peak positions taken from the sample directly after hydrothermal synthesis and washing; no additional peaks are seen indicating that the crystal structure was not altered during the milling process. Peak widths however have clearly broadened indicating that the particle size has been altered in comparison to the as-synthesized particle size. Analysis of the XRD pattern after size reduction indicates that the average crystallite size is approximately 56 nm.

Figure 13:
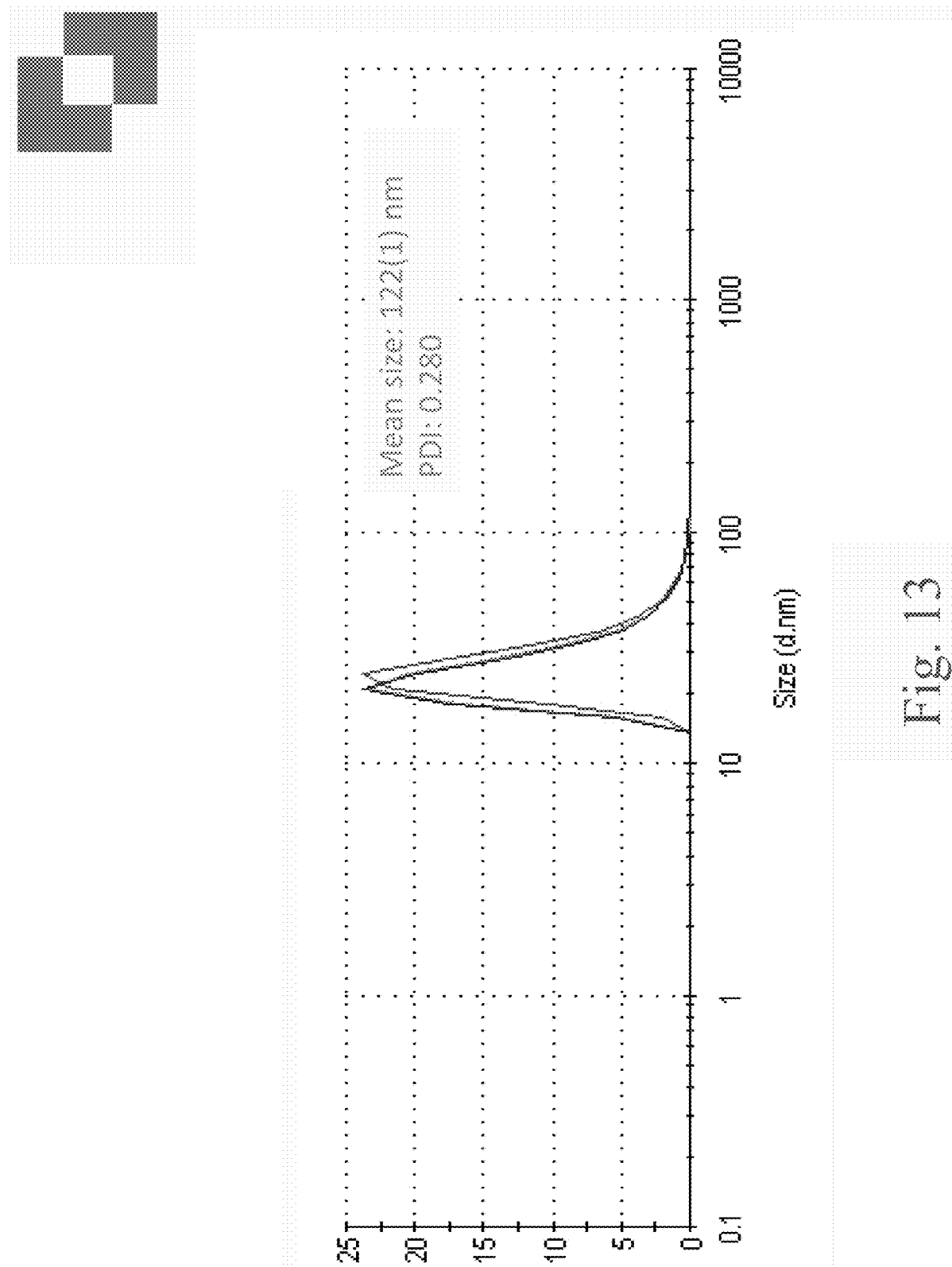
FIG. 13 shows a pyrochlore tungsten trioxide particle size distribution after milling, washing, and separating from the washing contaminants.

An example of a pyrochlore particle size distribution after milling, washing, and separating from the washing contaminants is shown in FIG. 13. The mean particle size in this distribution is 122 nm, and the PDI is 0.280, as measured by DLS.

Figure 14:
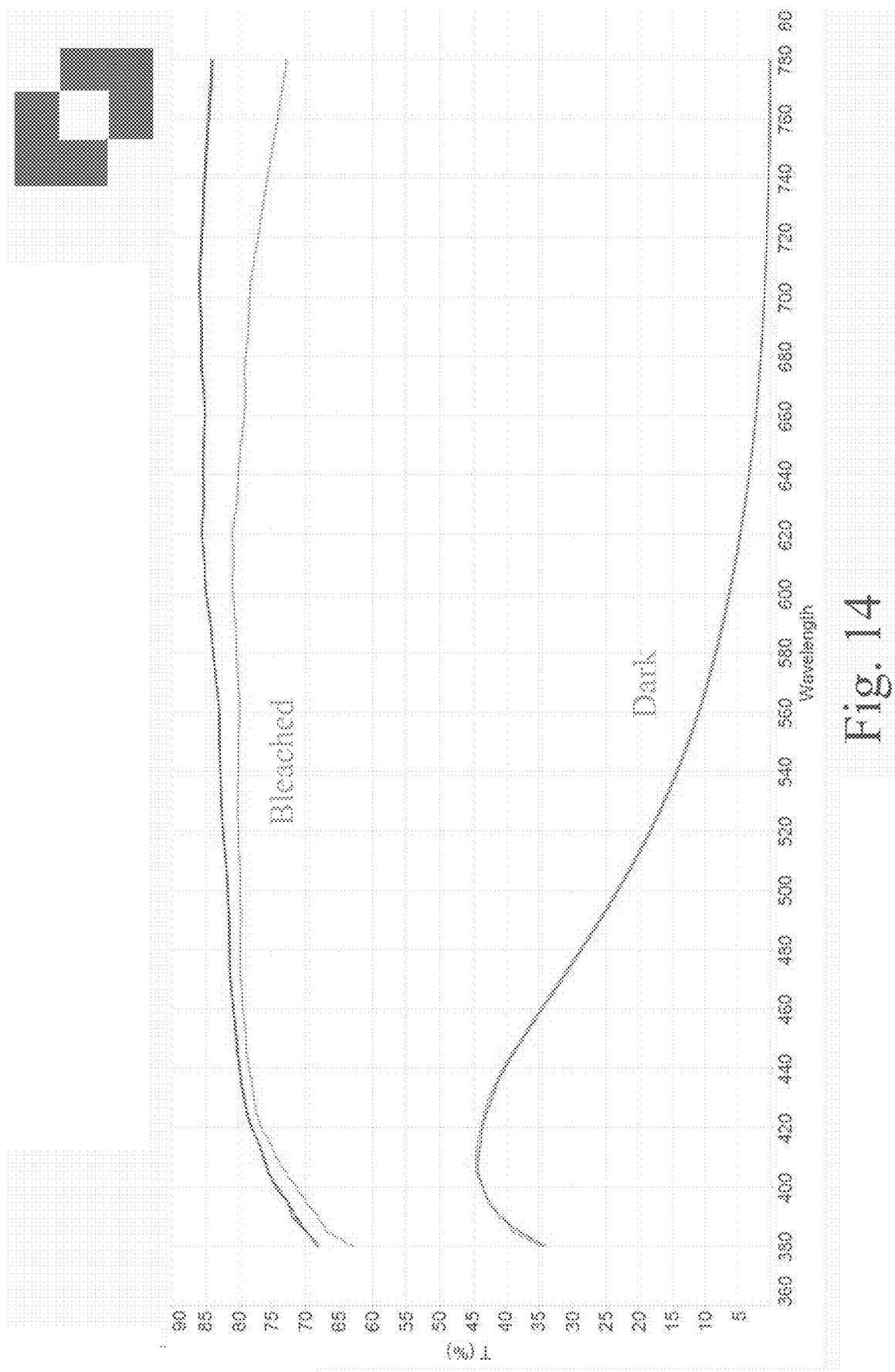
FIG. 14 shows transmission spectra of a pyrochlore tungsten trioxide electrochromic half-cell in the bleached and dark states.

FIG. 14 shows transmission spectra of a pyrochlore electrochromic half-cell (or substrate) in the bleached and dark states. Devices requiring optical characterization (i.e., devices producing the data shown in FIGS. 14-16) were prepared by coating the tungsten trioxide particles (without carbon black or PVDF) on 20×20 $mm^2$ FTO coated glass substrates. The electrochromic testing was performed in a propylene carbonate+1 M LiTFSi (Bis(trifluoromethane) sulfonimide lithium) solution with a Li counter electrode.

The transmission in the bleached state at a wavelength of 633 nm is approximately 85% compared to approximately 4% in the dark state. The transmission at 550 nm is approximately 83% in the bleached state and approximately 12.5% in the dark state.

Figure 15:
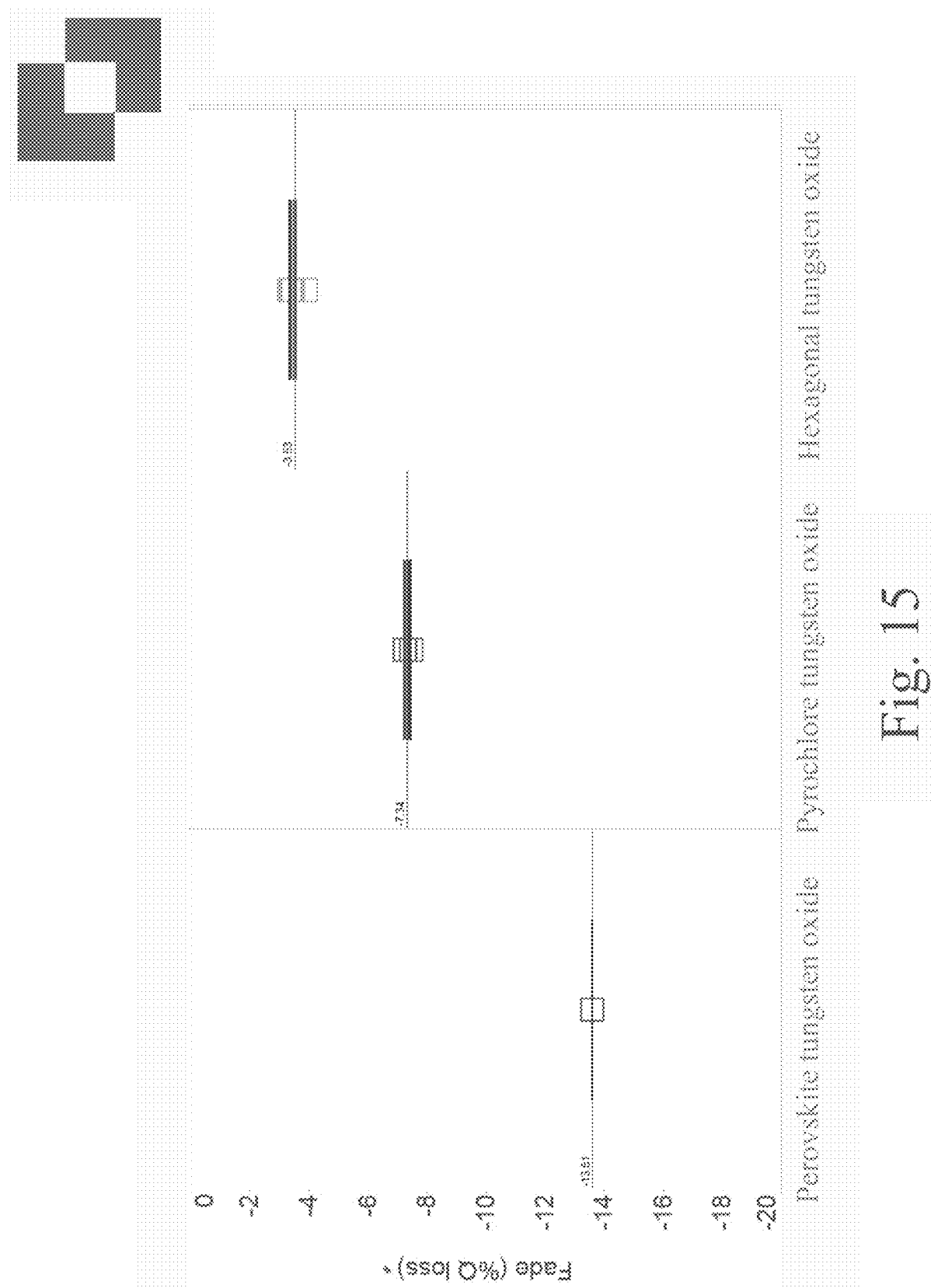
FIG. 15 shows the fade for a monoclinic perovskite $WO_3$ half-cell compared to a pyrochlore tungsten oxide half-cell and a hexagonal tungsten trioxide half-cell.

FIG. 15 shows the fade for a monoclinic perovskite $WO_3$ half-cell compared to a pyrochlore tungsten oxide half-cell and a hexagonal tungsten trioxide half-cell. The fade refers to the percent change in capacity between cycles 2 and 23. The fade for the monoclinic perovskite $WO_3$ device is about −13.6%, while the fade for the pyrochlore tungsten oxide half-cell is only −7.3% and fade for the hexagonal tungsten trioxide half-cell is only −3.5%. The fade is a measure of durability, and this data supports the improved durability of pyrochlore and hexagonal tungsten trioxide compared to monoclinic perovskite tungsten trioxide.

Figure 16:
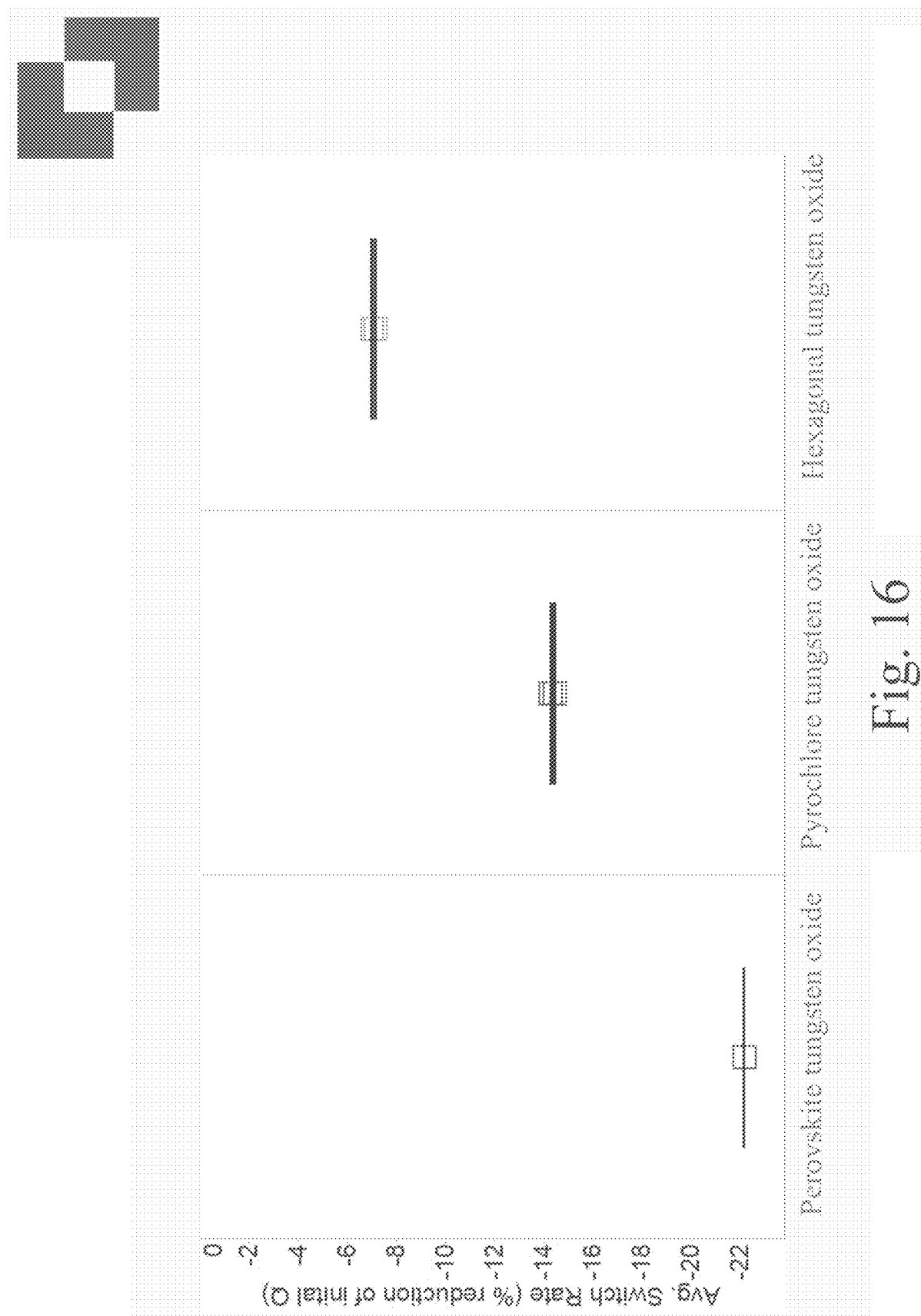
FIG. 16 shows the switching rate for a monoclinic perovskite $WO_3$ half-cell compared to a pyrochlore tungsten oxide half-cell and a hexagonal tungsten trioxide half-cell.

FIG. 16 shows the switching rate for a monoclinic perovskite $WO_3$ half-cell compared to a pyrochlore tungsten oxide half-cell and a hexagonal tungsten trioxide half-cell. The switching rate refers to the reduction in capacity observed when the material is reduced at a current I equal to the initial Q (C)/120 s rather than at $25 \times 10^{-6}$ Amp. The switching rate is similar to the C-rate commonly used for batteries. The switching rate for the monoclinic $WO_3$ half-cell is about −22%, while the switching rate for the pyrochlore tungsten oxide is −15% and the switching rate for hexagonal tungsten trioxide device is only −7%. Not to be limited by theory, the switching rate is related to the ionic mobility of Li+ in the cathode, and this data supports the improved ionic mobility of Li+ in the pyrochlore and hexagonal tungsten trioxide compared to monoclinic perovskite tungsten trioxide.

What is claimed is:

1. A method of manufacturing a thin film comprising:
    providing a plurality of crystalline alkali metal oxide particles, comprising:
        at least one alkali metal selected from the group consisting of lithium, potassium, and sodium;
        niobium;
        an orthorhombic crystal structure; and
        $A_yNb_{2-x}M_xO_{5\pm z}$, where A is the alkali metal, M is a metal other than niobium, x is from 0 to 1, y is from greater than 0 to 0.5, and z is from −0.5 to 0.5;
    size-reducing the crystalline alkali metal oxide particles by grinding to produce crystalline alkali metal oxide nanostructures;
    providing a substrate; and
    coating the crystalline alkali metal oxide nanostructures onto the substrate to produce a thin film, wherein the thin film is an electrochromic thin film.

2. The method of claim 1, wherein the crystalline alkali metal oxide particles are produced via methods selected from the group consisting of conventional solid state reactions comprising repetitive heating and grinding cycles, hydrothermal synthesis, sol-gel synthesis methods where reactive species are hydrolyzed to form colloids, inert atmosphere reactions, nanosynthesis reactions, precursor decomposition, calcination, melting, and combinations thereof.

3. The method of claim 1, wherein the crystalline alkali metal oxide particles are produced using a thermal treatment, wherein the temperature range of the thermal treatment is from 700° C. to 1000° C.

4. The method of claim 1, wherein the crystalline alkali metal oxide particles are produced using a thermal treatment, wherein the temperature range of the thermal treatment is from 100° C. to 400° C.

5. The method of claim 1, wherein the coating the crystalline alkali metal oxide nanostructures onto the substrate to produce a thin film step comprises:
    preparing an ink comprising the crystalline alkali metal oxide nanostructures and at least one solvent, wherein the ink does not comprise a binder material;
    coating the ink onto a substrate; and
    drying the coated ink at a temperature from 100° C. to 300° C. to produce the thin film.

6. The method of claim 1, wherein the providing a substrate step comprises providing a plastic substrate with a softening point less than 300° C.

7. The method of claim 1, wherein the providing a substrate step comprises providing a substrate with a softening point less than 600° C.

8. The method of claim 1, wherein the thin film is deposited to form an electrochromic cathode layer in an electrochromic device.

9. The method of claim 1, wherein M is a transition metal, a lanthanide, or an actinide.

10. The method of claim 1, wherein M is in an octahedral coordination geometry.

11. A method of manufacturing a thin film comprising:
    providing a plurality of crystalline alkali metal oxide particles, comprising:
        at least one alkali metal selected from the group consisting of lithium, potassium, and sodium;
        niobium;
        a pyrochlore crystal structure; and
        $A_yNb_{2-x}M_xO_{5\pm z}$, where A is the alkali metal, M is a metal other than niobium,
        x is from 0 to 1, y is from greater than 0 to 0.5, and z is from −0.5 to 0.5;
    size-reducing the crystalline alkali metal oxide particles by grinding to produce crystalline alkali metal oxide nanostructures;
    providing a substrate; and
    coating the crystalline alkali metal oxide nanostructures onto the substrate to produce a thin film, wherein the thin film is an electrochromic thin film.

12. The method of claim 11, wherein the crystalline alkali metal oxide particles are produced via methods selected from the group consisting of conventional solid state reactions comprising repetitive heating and grinding cycles, hydrothermal synthesis, sol-gel synthesis methods where reactive species are hydrolyzed to form colloids, inert atmosphere reactions, nanosynthesis reactions, precursor decomposition, calcination, melting, and combinations thereof.

13. The method of claim 11, wherein the crystalline alkali metal oxide particles are produced using a thermal treatment, wherein the temperature range of the thermal treatment is from 700° C. to 1000° C.

14. The method of claim 11, wherein the crystalline alkali metal oxide particles are produced using a thermal treatment, wherein the temperature range of the thermal treatment is from 100° C. to 400° C.

15. The method of claim 11, wherein the coating the crystalline alkali metal oxide nanostructures onto the substrate to produce a thin film step comprises:
    preparing an ink comprising the crystalline alkali metal oxide nanostructures and at least one solvent, wherein the ink does not comprise a binder material;
    coating the ink onto a substrate; and
    drying the coated ink at a temperature from 100° C. to 300° C. to produce the thin film.

16. The method of claim 11, wherein the providing a substrate step comprises providing a plastic substrate with a softening point less than 300° C.

17. The method of claim 11, wherein the providing a substrate step comprises providing a substrate with a softening point less than 600° C.

18. The method of claim 11, wherein the thin film is deposited to form an electrochromic cathode layer in an electrochromic device.

19. The method of claim 11, wherein M is a transition metal, a lanthanide, or an actinide.

20. The method of claim 11, wherein M is in an octahedral coordination geometry.

* * * * *